United States Patent

Kobori et al.

[11] Patent Number: 5,855,971
[45] Date of Patent: Jan. 5, 1999

[54] LIQUID CRYSTALLINE OPTICAL FILM, COMPENSATING FILM FOR LIQUID CRYSTAL DISPLAY COMPRISING THE LIQUID CRYSTALLINE OPTICAL FILM, AND LIQUID CRYSTAL DISPLAY HAVING THE COMPENSATING FILM

[75] Inventors: Yoshihiro Kobori, Kamakura; Takehiro Toyooka, Yokohama; Hitoshi Mazaki, Kawasaki; Yasushi Satoh, Yokohama, all of Japan

[73] Assignee: Nippon Oil Company, Limited, Tokyo, Japan

[21] Appl. No.: 675,326

[22] Filed: Jul. 10, 1996

[30] Foreign Application Priority Data

Jul. 11, 1995 [JP] Japan .................................. 7-206379

[51] Int. Cl.⁶ .................................................. C09K 19/00
[52] U.S. Cl. .................................... 428/1; 359/63; 359/73
[58] Field of Search ................................... 428/1; 359/73, 359/63

[56] References Cited

U.S. PATENT DOCUMENTS

| 5,362,315 | 11/1994 | Muller-Rees | 252/299.5 |
| 5,518,783 | 5/1996 | Kawata et al. | 428/1 |
| 5,528,400 | 6/1996 | Arakawa | 359/73 |

FOREIGN PATENT DOCUMENTS

| 0 646 829 A1 | 4/1995 | European Pat. Off. . |
| 0 656 559 A1 | 6/1995 | European Pat. Off. . |
| 195 19 928 A1 | 12/1995 | Germany . |

*Primary Examiner*—Nasser Ahmad
*Attorney, Agent, or Firm*—Scully, Scott, Murphy & Presser

[57] ABSTRACT

A compensating film capable of compensating both twist structure based on a liquid crystal cell and refractive index anisotropy to diminish the visual angle dependence of a liquid crystal display is provided.

The film is formed using a discotic liquid crystalline material and the orientation form of the discotic liquid crystal is a twisted orientation.

9 Claims, 20 Drawing Sheets film upper surface film lower surface structure A

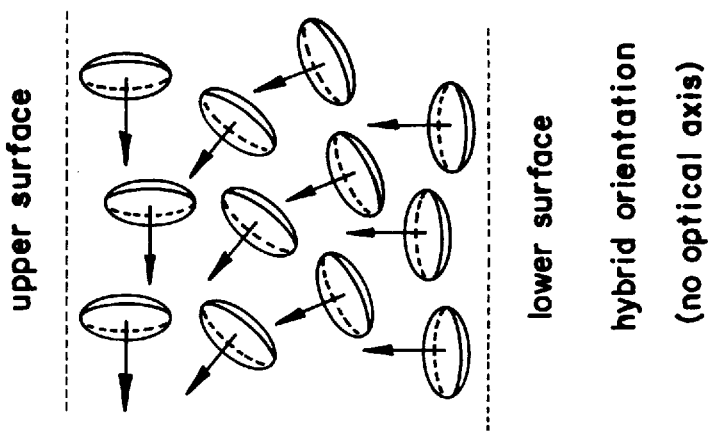
FIG.2(c) hybrid orientation (no optical axis)
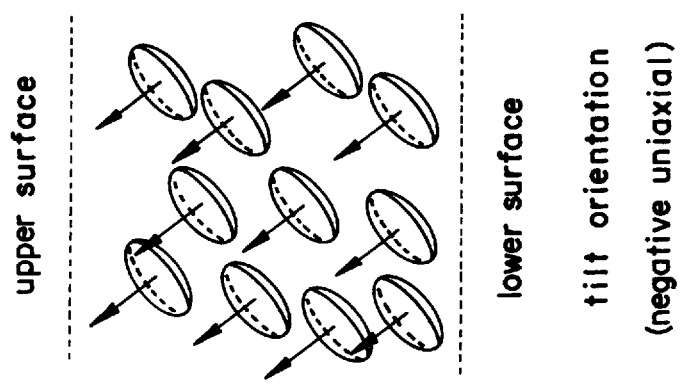
FIG.2(b) tilt orientation (negative uniaxial)
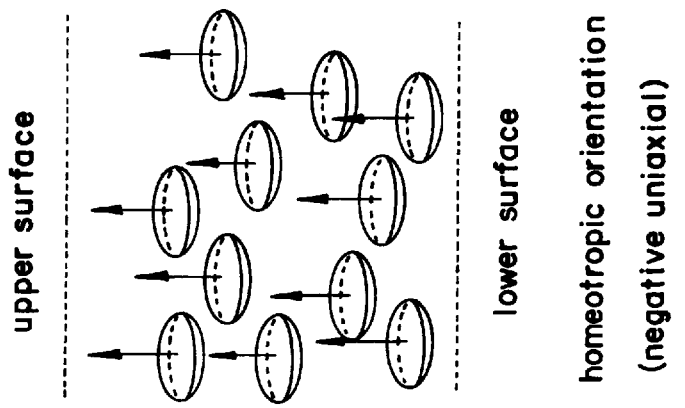
FIG.2(a) homeotropic orientation (negative uniaxial)

without compensator with compensator

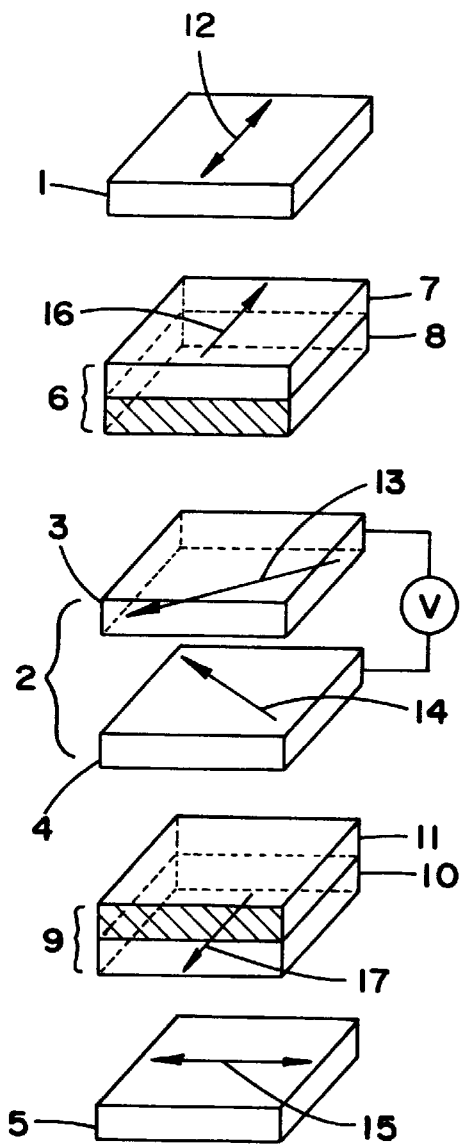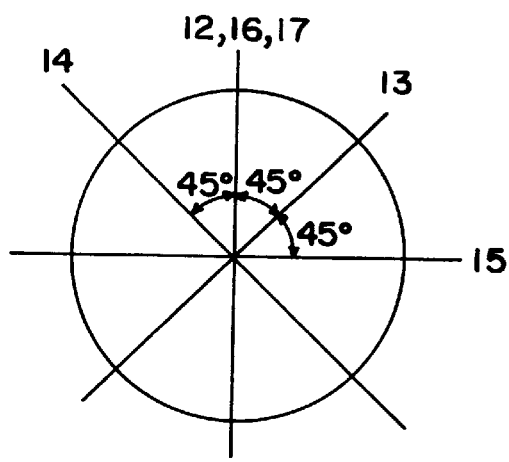
FIG.19(a)
FIG.19(b)

LIQUID CRYSTALLINE OPTICAL FILM, COMPENSATING FILM FOR LIQUID CRYSTAL DISPLAY COMPRISING THE LIQUID CRYSTALLINE OPTICAL FILM, AND LIQUID CRYSTAL DISPLAY HAVING THE COMPENSATING FILM

[BACKGROUND OF THE INVENTION]

The present invention relates to a liquid crystalline optical film useful in the fields of liquid crystal display, optoelectronics and optics.

A film having a fixed orientation form of a liquid crystal is a unique material which not only exhibits unique optical properties based on the structure of the liquid crystal but also exhibits a high resistance to environments. Generally, liquid crystals have large birefringences and various orientation forms and can display such optical performances as are unattainable by the use of a birefringent stretched film or the like.

Recently, various reports have been made with respect to properties of liquid crystals, particularly with respect to fixing oriented forms in order to utilize unique optical properties based on the oriented forms. For example, in JP64–65124A it is disclosed that a film with a twisted nematic orientation fixed is used as a constituent of a compensator for a liquid crystal display. In JP64–65124A is disclosed an optical filter comprising a smectic liquid crystalline polyester. Further, in JP6–186534 is disclosed a process for preparing a cholesteric liquid crystalline film. As is seen also from the above publications, films formed by fixing an oriented form of liquid crystal can greatly contribute to the technical development in the optical field, especially in the liquid crystal display field, by utilizing unique optical properties based on the oriented form of liquid crystal.

Because of such characteristics as low-voltage drive, light weight and low cost the liquid crystal display is occupying an important position as a substitute for the conventional cathoderay tube in the display field. The liquid crystal display makes display by utilizing an orienting behavior of a liquid crystalline substance having an optical anisotropy. This displaying method inevitably encounters the problem (hereinafter referred to as the "visual angle dependence") that on the display screen of the liquid crystal display there occur changes in color tone according to seeing directions. The visual angle dependence becomes more marked if a color compensating optical element such as, for example, a stretched film or a liquid crystal cell for compensation is attached to the liquid crystal display.

For example, the display of a personal computer or a word processor each utilizing a twisted nematic mode ("TN" hereinafter) or a supertwisted nematic mode ("STN" hereinafter) can afford a relatively good image when the display screen is seen from the front. However, when the display screen is seen from an angle other than the front, the screen may be colored or an image thereon may be difficult to see. Such visual angle dependence of the liquid crystal display is not liked by the user; besides, it gives rise to the problem that it is impossible to meet the requirement of a larger screen for a wall-mounted type large screen TV utilizing the liquid crystal display for example. More particularly, in the case of utilizing a large-screen display, even when the display screen is seen from the front, the marginal portion is seen at a certain visual angle due to the largeness of the screen, according to the prior art. Consequently, it is impossible to obtain a clear image throughout the whole screen.

As a compensating means for diminishing the aforesaid visual angle dependence of the display it has been suggested that the use of a film whose refractive index in the thickness direction is larger than that in a plane is effective [M. Akatsuka et al.: Japan display '89, 336 (1989)]. Further, compensators which satisfy such condition are disclosed, for example, in JP5–27235A and JP5–53104A.

However, the compensators described in those publications are not satisfactory in point of performance although their visual angle dependence is improved over the conventional compensators. As one of causes, mention may be made of the fact that the orientation of liquid crystal molecules in a liquid crystal cell of TN or STN, more particularly a liquid crystal drive cell, has a twist structure and that the influence of the twist structure on the visual angle is not completely compensated even by the use of compensators described in the above publications. Thus, a further improvement has been desired.

According to a display method using a birefringence mode such as STN, twisted nematic liquid crystalline polymer films or various phase contrast films obtained by stretching plastic sheets are utilized in color display to make twist compensation for the twist structure of a liquid crystal cell. However, even by the use of such films for twist compensation it is impossible to solve the problem of the visual angle dependence. Under the circumstances, there has been a keen desire for the development of a compensating element capable of compensating both twist structure based on a liquid crystal cell and refractive index anisotropy.

It is an object of the present invention to provide a liquid crystalline optical film which has overcome the above-mentioned problems. It is another object of the invention to provide a compensating film for a liquid crystal display which film comprises the said liquid crystalline optical film. More specifically, the present invention aims at providing a compensating film capable of compensating both twist structure based on a liquid crystal cell and refractive index anisotropy in order to diminish the visual angle dependence of the liquid crystal display.

[SUMMARY OF THE INVENTION]

Having made extensive studies for the development of an optical film capable of compensating both twist structure based on a liquid crystal display and refractive index anisotropy in order to diminish the visual angle dependence of the liquid crystal display, the present inventors succeeded in developing a new liquid crystalline optical film wherein a twisted orientation of a discotic liquid crystal was fixed, and found that the said liquid crystalline optical film could be an excellent compensating film capable of solving the problem of visual angle dependence of the liquid crystal display. In this way we accomplished the present invention.

The present invention, in the first aspect thereof, resides in a liquid crystalline optical film having a fixed orientation form of a liquid crystal, characterized in that the film is formed using a discotic liquid crystalline material and that the orientation form of the discotic liquid crystal is a twisted orientation.

The present invention, in the second aspect thereof, resides in a liquid crystalline optical film according to the above first aspect, wherein the discotic liquid crystalline material contains at least one optically active compound.

The present invention, in the third aspect thereof, resides in a liquid crystalline optical film according to the above first or second aspect, wherein the optically active compound is an optically active, discotic, liquid crystalline compound.

The present invention, in the fourth aspect thereof, resides in a liquid crystalline optical film according to the above first aspect, wherein the discotic liquid crystalline material comprises at least one optically active, discotic, liquid crystalline compound.

The present invention, in the fifth aspect thereof, resides in a liquid crystalline optical film according to any of the above first to fourth aspects, wherein the angle between directors of the discotic liquid crystal and the line normal to the film plane varies in the film thickness direction and the orientation is fixed in this state.

The present invention, in the sixth aspect thereof, resides in a liquid crystalline optical film according to any of the above first to fifth aspects, wherein the angle between directors of the discotic liquid crystal and the line normal to the film plane is different between the upper surface and the lower surface of the film.

The present invention, in the seventh aspect thereof, resides in a compensating film for a liquid crystal display, characterized by comprising the liquid crystalline optical film mentioned in any of the above first to sixth aspects.

Further, the present invention, in the eighth aspect thereof, resides in a liquid crystal display having one or a plural number of the compensating film mentioned in the above seventh aspect.

[BRIEF DESCRIPTION OF THE DRAWINGS]

FIG. 2 is a diagram schematically showing orientation forms which discotic liquid crystals can take, in which
(a) illustrates a negative uniaxial structure (homeotropic orientation) wherein directors are perpendicular to the film plane,
(b) illustrates a negative uniaxial structure (tilted orientation) wherein directors are tilted at a certain angle relative to the film plane, and
(c) illustrates a hybrid orientation wherein directors change in the film thickness direction;

FIG. 19(a) is a perspective view of the liquid crystal display obtained in Example 4, and (b) illustrates an axial arrangement of components of the liquid crystal display in which 1: upper polarizing plate
2: TN liquid crystal cell
3: upper electrode substrate having a rubbing-treated polyimide film
4: lower electrode substrate having a rubbing-treated polyimide film
5: lower polarizing plate
6: compensating film on a transparent substrate
7: compensating film (film 4)
8: substrate (polyether sulfone film having a pressure-sensitive adhesive layer)
9: compensating film on a transparent substrate
10: compensating film (film 4)
11: substrate (polyether sulfone film having a pressure-sensitive adhesive layer)
12: transmission axis of the upper polarizing plate
13: rubbing direction of the upper electrode substrate
14: rubbing direction of the lower electrode substrate
15: transmission axis of the lower polarizing plate
16: direction corresponding to the rubbing direction of the polyimide film
17: direction corresponding to the rubbing direction of the polyimide film

[DETAILED DESCRIPTION OF THE INVENTION]

The present invention will be described in more detail hereinunder.

Figure 1:
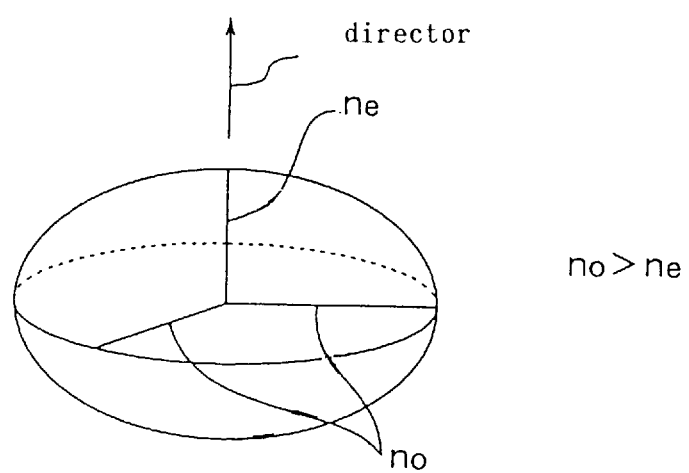
FIG. 1 is a diagram explaining a refractive index distribution peculiar to a discotic liquid crystal and a director.

In general, the discotic liquid crystal is a liquid crystal developed by molecules having a mesogen which is in the shape of a disc of high flatness. The discotic liquid crystal is characteristic in that the refractive index at a very small area in the liquid crystal layer has a negative uniaxial property. As shown in FIG. 1, if it is assumed that the refractive index in a plane is constant (the refractive index in this direction is assumed to be "no"), that the direction perpendicular to the said plane corresponds to an optical axis (hereinafter referred to as "director") and that the refractive index in the director direction is ne, there exists the relation of no>ne. The refractive index characteristic, and hence optical characteristic, of the resulting structure depends on what manner such directors are to be oriented in a liquid crystal phase at the very small area. The liquid crystalline optical film of the present invention permits control of its orientation form in conformity with a desired optical characteristic.

Usually, when directors face in the same direction throughout the entire liquid crystal layer, there is obtained a structure having a negative uniaxial property. In the case where the discotic liquid crystal is oriented uniformly in accordance with the prior art, there usually is obtained such a structure as shown in FIG. 2(a) or 2(b). The orientation shown in FIG. 2(a) is called homeotropic orientation because the directors are arranged in the direction of the substrate normal line, while the orientation shown in FIG. 2(b) is a tilt orientation wherein the directors are tilted at a certain angle from the substrate normal line. Also conceivable is such an orientation form as shown in FIG. 2(c) wherein the angle between the line normal to the film plane, or the film plane normal line, and the directors is different between the upper suface and the lower surface of the film. This orientation form is generally called hybrid orientation in the case of rod-like liquid crystal molecules, and therefore we also designate this orientation form a hybrid orientation.

The structure of the liquid crystalline optical film of the present invention is different from all of the above homeotropic orientation, tilt orientation, or a negative uniaxial structure based thereon, and hybrid orientation. The greatest feature thereof consists in that the twisted orientation form, namely a twisted structure, obtained in the state of liquid crystal of the discotic liquid crystalline material used is fixed without being impaired.

In the liquid crystalline optical film of the present invention, all the directors of discotic liquid crystal molecules present in a certain plane parallel to the film surface face in the same direction. The "twisted orientation" as referred to herein indicates a twist structure formed by the said liquid crystal molecules in the state of liquid crystal. The said twist structure means a structure wherein the projection of the directors onto the film surface rotates in a monotonously increasing fashion, that is, without changing the rotational direction from one side to the other side in the film thickness direction. In other words, this structure indicates a structure having two planes in the film in which planes the directors' directions do not overlap each other in the case where the projected directors' direction of discotic liquid crystal molecules present in one of at least two arbitrary planes out of plural planes parallel to the film surface and the projected directors' direction of discotic liquid crystal molecules present in the other plane are at an angle of smaller than 360 degrees. In such two arbitrary planes there sometimes is the case where both such projected directors' directions are different at an angle of not smaller than 360 degrees. In this case, two planes in which the projected directors' directions overlap each other are present in the film. More particularly, at a twist of 360° the projected directors' directions in two arbitrary planes overlap each other. Thus, also in the case where a twist of not smaller than 360° is present between two arbitrary planes in the film and different projected directors' directions result, the reason for overlap of the projected directors' directions is because the projected directors' directions have rotated about an arbitrary rotational axis, that is, have twisted at an angle of not smaller than 360°. Therefore, the case where the projected directors' directions are different at an angle of not smaller than 360° also corresponds to the twist structure as referred to herein. The film thickness necessary for each director to rotate 360° is here assumed to be one pitch.

In the present invention, moreover, it is possible to fix the form of orientation having the twist in the state of liquid crystal and having a varying angle (hereinafter referred to as "tilt angle") between the directors of discotic liquid crystal and the film plane normal line in the film thickness direction.

In the present invention, an apparent rotational axis of the twist is taken in the direction of the film plane normal line and the twist angle is defined in terms of a rotational angle of th e director component pre sent in the interior direction of the film surface. As to the portion where the directors substantially face in the direction of the film plane normal line at an tilt angle of not larger than 0.1°, preferably not larger than 0.5°, more preferably not larger than 1°, that portion is regarded as being free of twist angle.

Figures 3A, 3B:
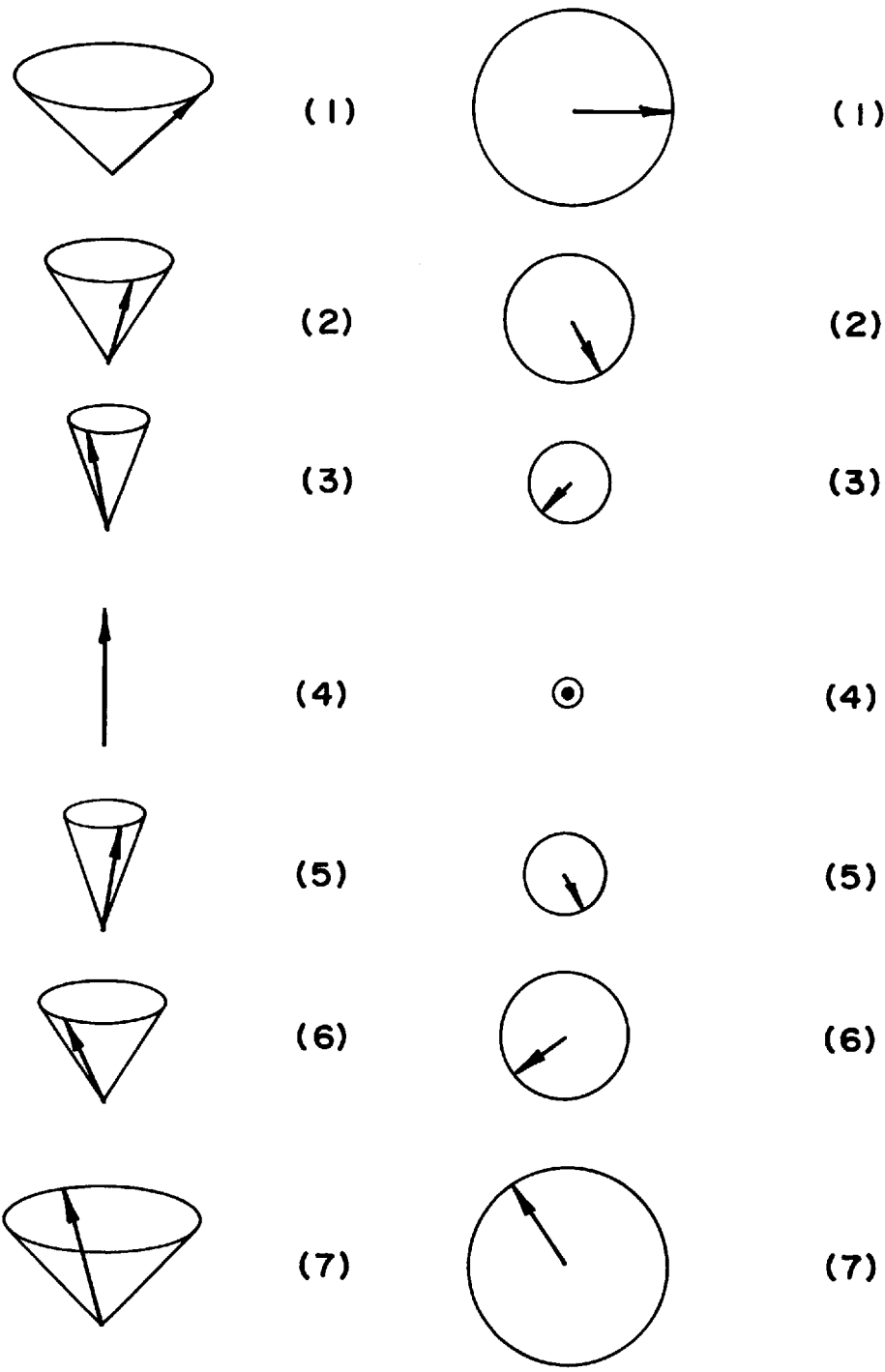
FIG. 3 is a diagram explaining, in the twist structure according to the present invention, a portion where each director in a discotic liquid crystalline compound undergoes a continuous change and a portion where it undergoes a discontinuous change, in which
(A) is a view as seen obliquely sideways, and
(B) is a view as seen from right above.

In the twisted orientation in the present invention, the direction of the directors' components in the film surface usually changes in a monotonously increasing manner with movement in the thickness direction of the film. But when in the interior of the film there is a portion where the directors face substantially in the direction of the film normal line, there can be the case where there occurs a change other than a monotonous increase in that prortion. An example i s shown in FIG. 3. In the same figure, the direction of each director is indicated with an arrow. FIG. 3(A) illustrates the director as seen obliquely sideways and FIG. 3(B) illustrates the director in FIG. (A) as projected from just above the film. Each arrow in FIG. 3(B) represents the direction of an intra-film surface component of the director, which varies in a monotonously increasing manner in the film thickness direction in the numerical order from (1). In (4), however, the tilt angle is 0° and the director faces in the film plane direction, namely faces right above. Thus, the portion from (4) to (5) there exists a portion where the intra-film surface component of the director is not present, with the result that the directional change of the said component is no longer a monotonously increasing change. In (5) et seq. there again occurs a change of monotonous increase while the tilt angle increases. At this time, the twist angle is defined to be the total of twist angles in the portions of monotonous increase change before and after the portion which does not undergo such a change.

As to the twist angle of the liquid crystalline optical film according to the present invention, its range cannot be defined sweepingly because the twist angle in question is influenced by the tilt angle or by the birefringence specific to the discotic liquid crystal, but is usually in the range from 1 to 500 degrees, preferably 5 to 300 degrees.

Figure 4:
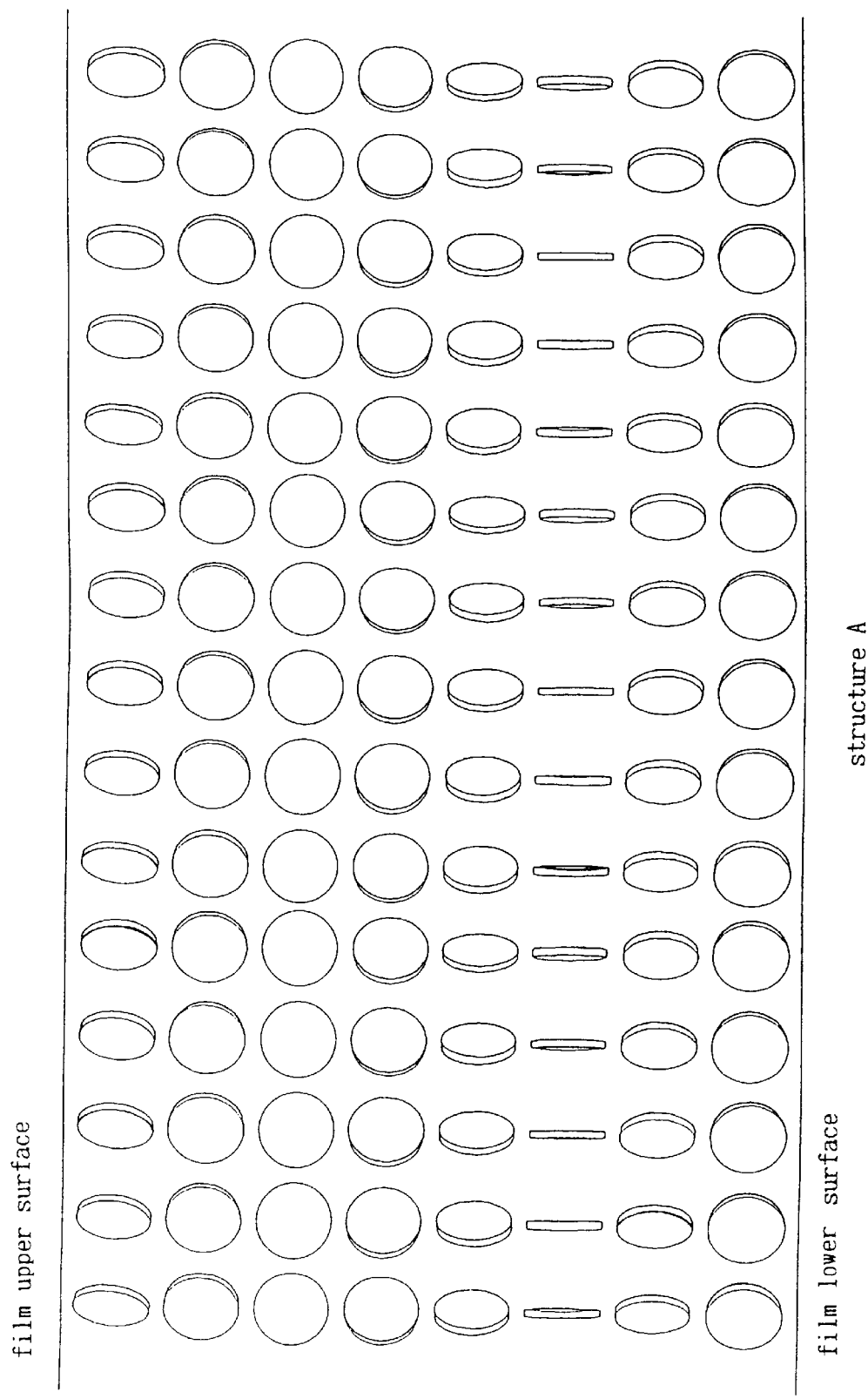
FIG. 4 is a diagram schematically showing an orientation form which the liquid crystalline optical film according to the present invention can form, with each coin-like shape representing one molecule of a discotic liquid crystalline compound, in which
structure A is a twist structure of directors facing in the intra-surface direction.
Figure 7:
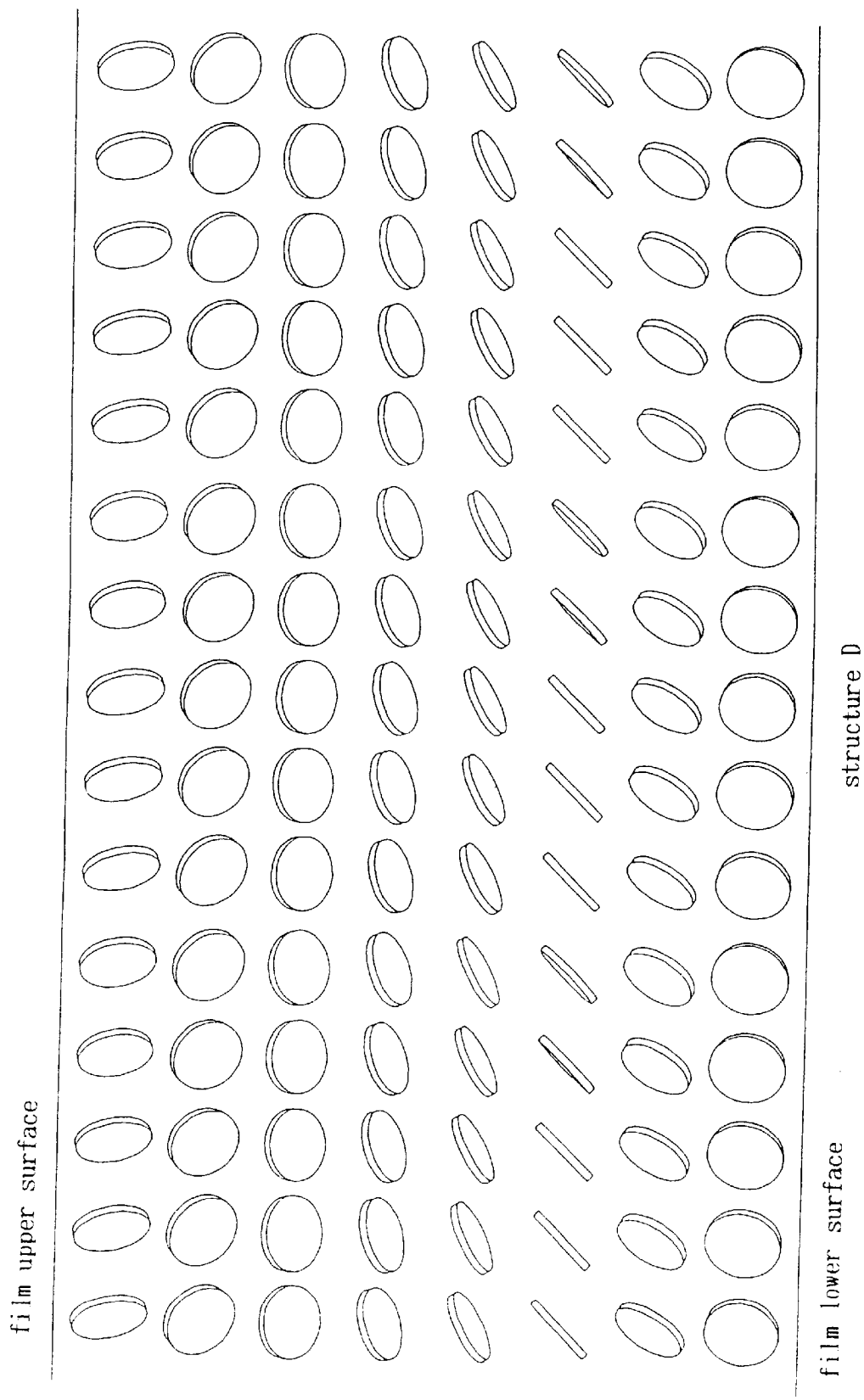
FIG. 7 is a diagram schematically showing an orientation form which the liquid crystalline optical film according to the present invention can form, with each coin-like shape representing one molecule of a discotic liquid crystalline compound, in which
structure D is a twist structure with tilt angle changing in the film thickness direction.
Figure 8:
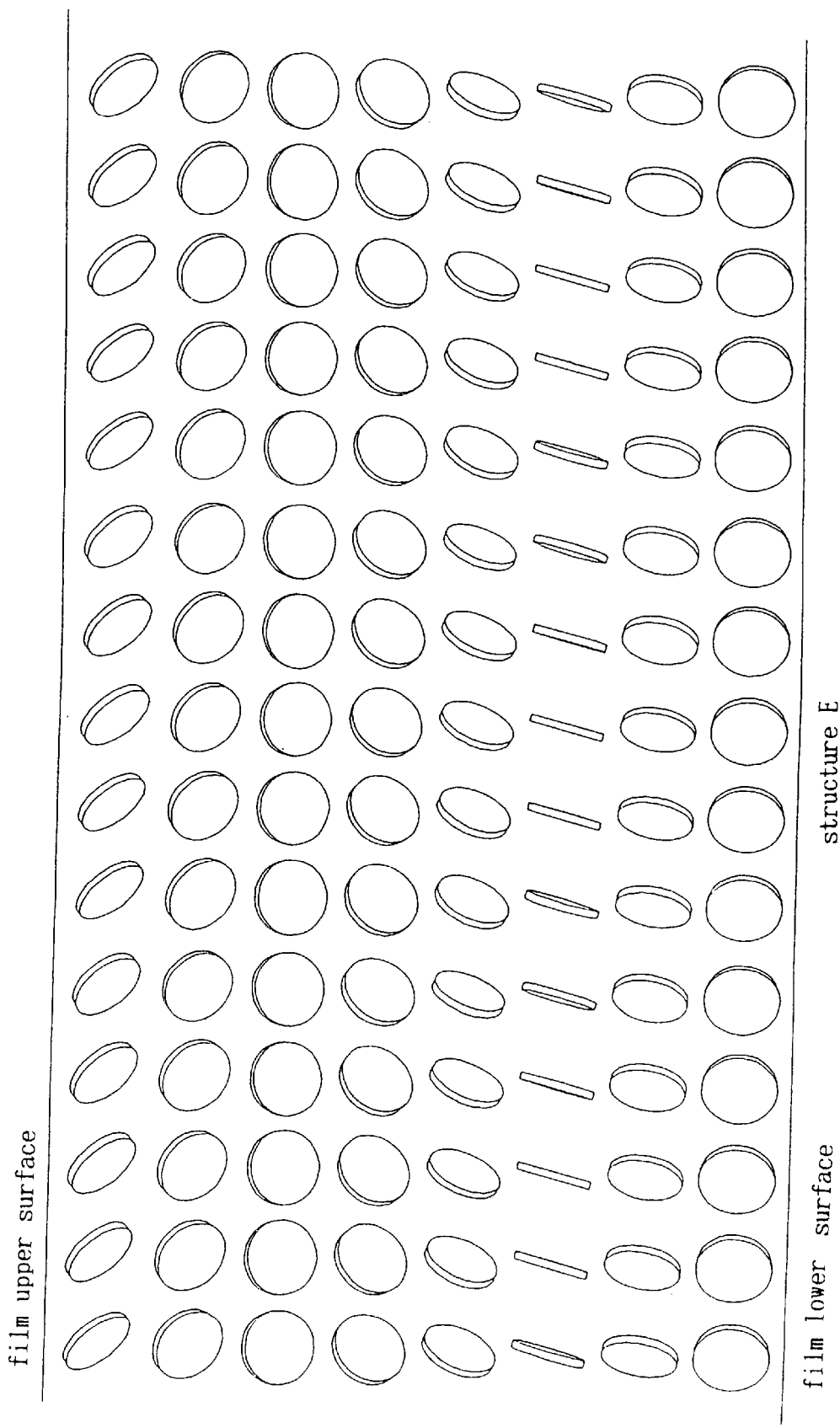
FIG. 8 is a diagram schematically showing an orientation form which the liquid crystalline optical film according to the present invention can form, with each coin-like shape representing one molecule of a discotic liquid crystalline compound, in which
structure E is a twist structure wherein the tilt angle is different between the upper and lower surfaces of the film.

Examples of twisted orientation forms capable of being formed by the liquid crystalline optical film of the present invention are shown in FIG. 4 (structure A) to FIG. 8 (structure E), provided the orientation form of the liquid crystal optical film in question is not limited thereto. In FIGS. 4 to 8, each coin-like shape represents one molecule of the discotic liquid crystalline compound.

Figure 5:
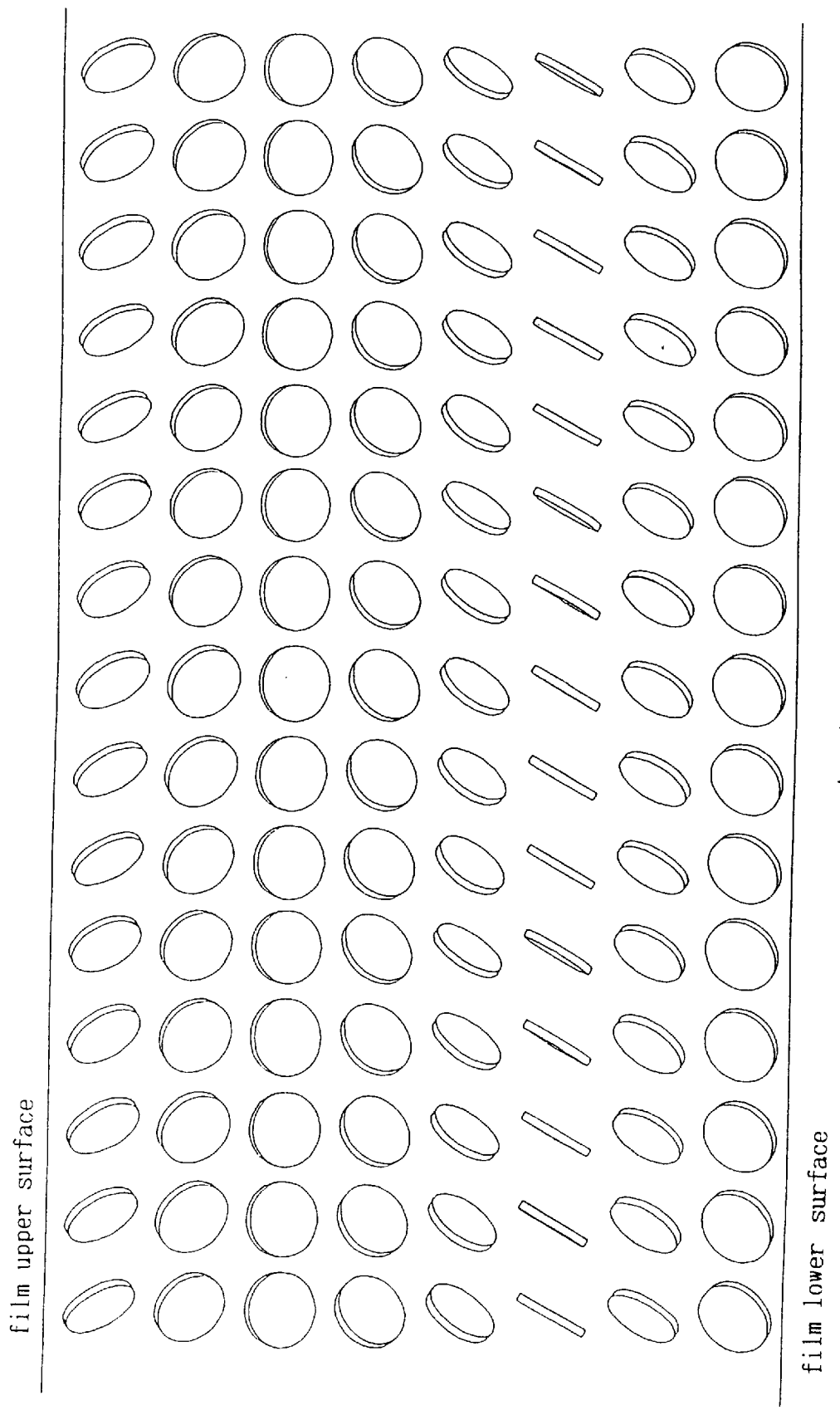
FIG. 5 is a diagram schematically showing an orientation form which the liquid crystalline optical film according to the present invention can form, with each coin-like shape representing one molecule of a discotic liquid crystalline compound, in which
structure B is a twist structure having a certain tilt angle.

In FIG. 4 (structure A), the directors facing in the intra-film surface direction take a twist structure. In FIG. 5 (structure B), the directors are each tilted at a certain tilt angle. The structure A can be regarded as a special structure wherein the tilt angle is 90°.

Figure 6:
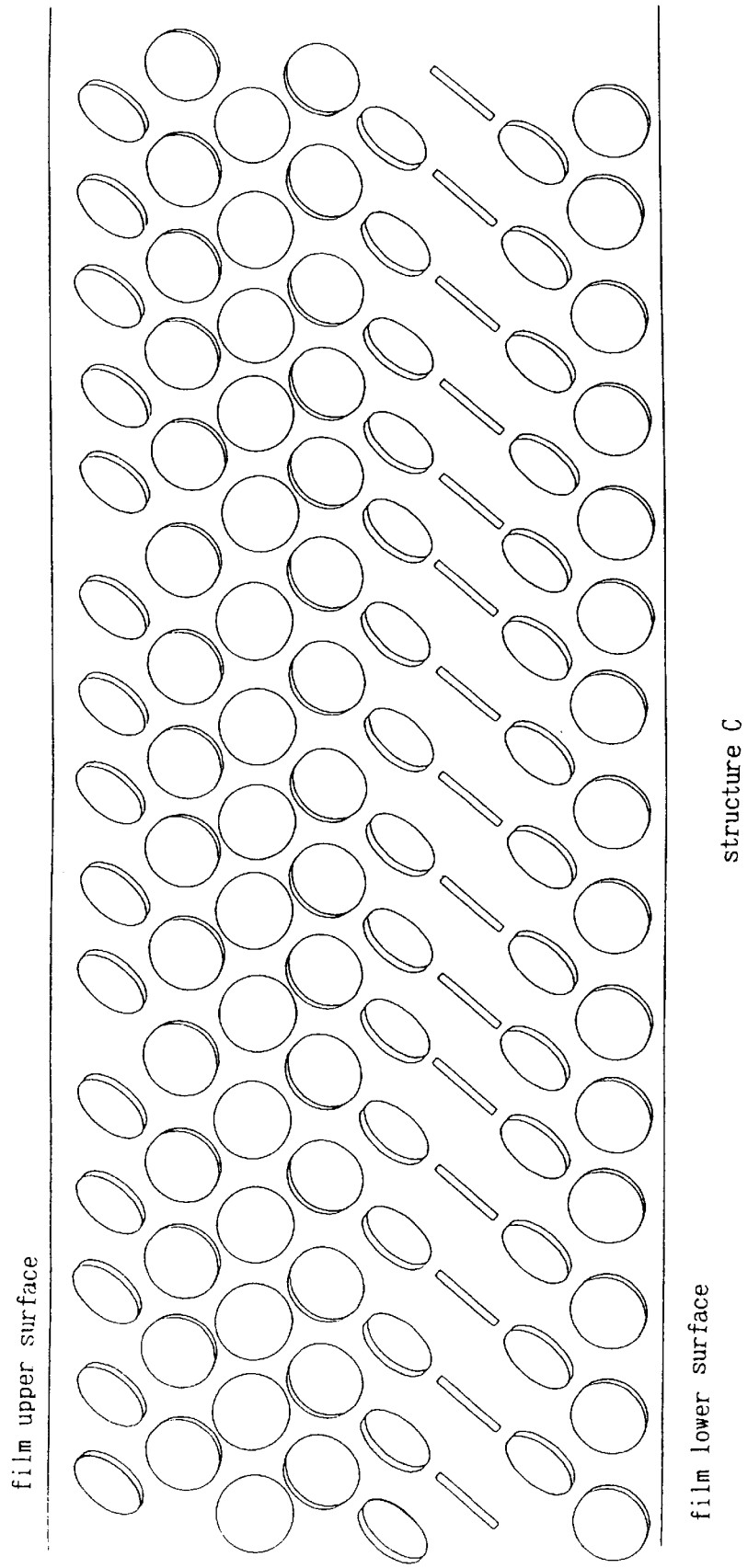
FIG. 6 is a diagram schematically showing an orientation form which the liquid crystalline optical film according to the present invention can form, with each coin-like shape representing one molecule of a discotic liquid crystalline compound, in which
structure C is a twist structure with tilt angle changing in the film thickness direction.

FIG. 6 (structure C) shows as if an apparent rotational axis in the structure B were tilted at a certain angle from the substrate normal line. However, the rotational axis in the twist structure of the present invention is in the direction of the film plan e normal line. Therefore, the structure C is regarded as a special case of a structure in which the tilt angle changes in the film thickness direction, namely the structure D in FIG. 7 or the structure E in FIG. 8.

In the structure D, the tilt angle changes in the film thickness direction, provided the tilt angle on the film upper surface side and that on the lower surface side are the same. Bu t it is not always necessary for both tilt angles to be the same. Tilt angles of different values may be adopted as in the structure E.

In the above orientation form, the tilt angle, or the angle between the directors which the discotic liquid crystalline compound possessed and the film plane normal line, may take any value in the range of 0° to 90°. Although it is impossible for the tilt angle to be 0° throughout the whole in the film thickness direction, this is possible partially in the thickness direction, as noted above.

The following description is now provided about the discotic liquid crystalline material used in the present invention. The material in question is constituted by a discotic liquid crystalline compound alone or a mixture containing at lease one such liquid crystalline compound.

By D. Destrade et al. discotic liquid crystals are classified according to orientation orders of their molecules into ND phase (discotic nematic phase), Dho phase (hexagonal ordered columnar phase), Dhd phase (hexagonal disordered columnar phase), Drd phase (rectangular disordered columnar phase) and Dob phase (oblilque columnar phase) [C. Destrade et al., Mol. Cryst. Liq. Cryst., 106, 121 (1984)]. Further, the presence of ND* phase with twist introduced therein by adding an optically active substance to the above ND phase has also been shown [C. Destrade et al., Phys. Lett., 79A, 189 (1980)].

In the present invention, no special limitation is placed on the molecular orientation order, but a material having at least ND* phase is preferred from the standpoint of easy orientation, and a material having the ND* phase as the only liquid crystal phase is particularly preferred.

The discotic liquid crystalline material used in the present invention preferably does not undergo a transition from liquid crystal phase to crystal phase during fixing of its orientation in order to fix the form of orientation in the state of liquid crystal without impairing it. It is desirable to use a discotic liquid crystalline material which when formed into film can maintain its orientation form under working conditions and can be treated like a solid. Further, the "fixed" state as referred to herein indicates typically and preferably a state in which the liquid crystal structure is frozen in an amorphous glassy state. The fixed state in question is not limited thereto, but indicates a state such that under the working conditions of the liquid crystalline optical film of the invention, more concretely in the temperature range of usually 0° to 50° C., more severely −30° to 70° C., the film has no fluidity, nor does occur any change in the orientation form under the action of an external field or an external force, and the fixed orientation form can be maintained stably. In view of these points it is preferred that the discotic liquid crystalline material used in the present invention possess any of the following properties.

① The material in question has only glass phase, not having crystal phase, in a lower temperature region than the liquid crystal phase. That is, as the temperature drops from the state of liquid crystal, fixing is made in the glassy state.

② The material in question has crystal phase in a lower temperature region than the liquid crystal phase and has glass phase in a lower temperature region than the crystal phase. As the temperature drops from the state of liquid crystal, there does not appear any crystal phase (in the case where the crystal phase is super-cooled or in a monotropic case where crystallization occurs only in heating-up process) and fixing is made in the glass state.

③ The material in question has crystal phase in a lower temperature region than the liquid crystal phase, but in a still lower temperature region does not exhibit a clear glass transition (in the case where the crystal phase is supercooled or in a monotropic case where crystallization occurs only in heating-up process). In this case, at still lower temperatures than the melting point, which is observed upon re-heating to a high temperature after fixing, the fluidity of the molecules is extremely limited. In practical use the material can be regarded as a solid material.

④ In a lower temperature region than the liquid crystal state a clear transition to crystal or to glass state is observed neither during increase of temperature nor during decrease of temperature. But when the orientation form in the state of liquid crystal is fixed, the material in question exhibits no fluidity in the working temperature range of the film of the invention nor does it exhibit any change in its orientation form even upon application thereto of an external force such as shear or an external field.

Of the above properties, ① and ② are more preferred, with the property ① being the most preferred. Discotic liquid crystalline materials having the above properties ③ and ④ are also employable practically, but it is necessary to make sure carefully that the disorder of orientation is not likely to occur under the working conditions of the resulting liquid crystalline optical film. More particularly, even if the orientation form is not disordered when a shear or the like is applied thereto forcibly in the temperature range of usually 0° to 50° C., there is no problem. On the other hand, if the orientation form is disordered by a shear or the like and the inherent optical performance is lost, no matter what treatment thereafter may not be effective to regain the original orientation form, thus giving rise to a serious problem in practical use.

It is desirable that the discotic liquid crystalline material used in the present invention have any of the foregoing properties and exhibit a good domain unity for a uniform defect-free orientation. If the domain unity is bad, the resulting structure will have a polydomain structure in which an orientation defect occurs in the boundary of domains and scatters light. Deterioration in permeability of the resulting film will also result.

Reference will now be made to a discotic liquid crystalline compound employable as the liquid crystalline material in question. A concrete structure of this compound comprises a disc-like central portion (discogen) essential for development of the discotic liquid crystal phase and substituent groups necessary for stabilizing the liquid crystal phase. As the said functional groups, monofunctional groups are preferred, but compounds obtained by using bifunctional substituent groups and allowing discogens to be partially linked into an oligomer or a polymer are also preferably employable in the invention. In this case, the bifunctional substituent groups may be used to prepare a polymer with discogens present in the main chain or a polymer such as polyacrylic acid, polymethacrylic acid or polysiloxane, preferably an amorphous polymer, with discogens present in the side chain.

Description is now directed to a more concrete structure of the discotic liquid crystalline compound used in the present invention. Generally, the discotic liquid crystalline compound in question takes such a shape as illustrated in FIG. 9. FIG. 9 is a conceptual diagram and the present invention is not limited at all thereby.

Figure 9A:
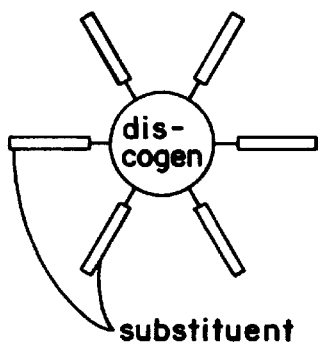
FIG. 9 is illustrate conceptual shapes of discotic liquid crystalline compounds.
Figure 9B:
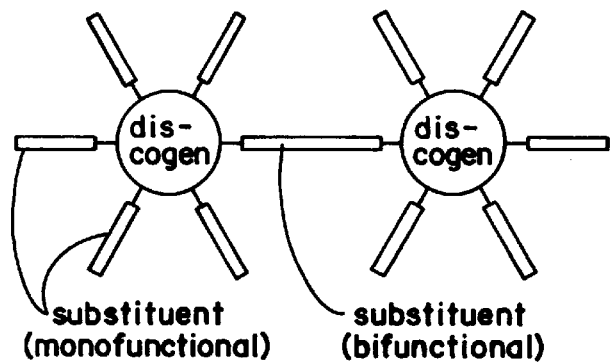

FIG. 9(A) shows a general structure of a discotic liquid crystalline compound having only monofunctional substituent groups, while FIG. 9(B) shows a structure wherein two discogens are linked through a bifunctional substituent group.

The discotic liquid crystalline material used in the present invention contains at least one optically active compound, preferably an optically active, discotic liquid crystalline compound, or is constituted by at least one optically active, discotic liquid crystalline compound, to prepare the liquid crystalline optical film of the present invention. In connection with the optically active compound or the optically active, discotic liquid crystalline compound, which enantiomer is to be added into, or used as, the said material is determined according to desired optical characteristics. Generally, the direction of twist of the liquid crystal phase can be reversed by using an enantiomer having a reverse configuration. In the present invention there may be used any optically active compound if only it is optically active and can induce twist in the liquid crystal phase. From the standpoint of compatibility, however, it is desirable to use an optically active compound having a similar liquid crystallinity to that of the discotic liquid crystal used. More specifically, it is desirable to use a discotic liquid crystalline compound in which some or all of the plural substituent groups attached to dicogen are replaced with optically active substituent groups. Also employable are the said liquid crystalline compound which contains a group not optically active (the term "achiral" will be used in this sense hereinafter) as part of the substituent groups, as well as a mixture of a discotic liquid crystalline compound wherein all the substituent groups are achiral with an optically active discotic liquid crystalline compound with at least one optically active substituent group bonded thereto.

In the present invention, the compound capable of being a discogen and constituting the achiral discotic liquid crystalline compound and the optically active discotic liquid crystalline compound is a compound having a molecular structure superior in flatness, generally having at least one aromatic ring and having three or more, preferably six of more, substituent group bonding sites (hereinafter referred to brief as "substituent site(s)").

A concrete substituent group structure will now be described. Optically active, monofunctional substituent groups employable in the present invention usually have 3 to 30, preferably 3 to 20, carbon atoms. The numer of asymmetric center is not always limited to one. Substituent groups having two or more asymmetric centers are also employable.

The following substituent groups are exemplified (They are referred to as Exemplification 1):

1-methyl propyl, 1-methyl butyl, 2-methyl butyl, 1-methyl pentyl, 2-methyl pentyl, 3-methyl pentyl, 1-methyl hexyl, 2-methyl hexyl, 3-methyl hexyl, 4-methyl hexyl, 1-methyl heptyl, 2-methyl heptyl, 3-methyl heptyl, 4-methyl heptyl, 5-methyl heptyl, 1-methyl octyl, 2-methyl octyl, 3-methyl octyl, 4-methyl octyl, 5-methyl octyl, 6-methyl octyl, 1-methyl nonyl, 2-methyl nonyl, 3-methyl nonyl, 4-methyl nonyl, 5-methyl nonyl, 6-methyl nonyl, 7-methyl nonyl, 1-methyl decyl, 2-methyl decyl, 1-methyl undecyl, 2-methyl undecyl, 1-methyl dodecyl, 2-methyl dodecyl, 1-ethyl butyl, 1-ethyl pentyl, 2-ethyl pentyl, 1-ethyl hexyl, 2-ethyl hexyl, 1-ethyl heptyl, 1-ethyl octyl, 1-ethyl nonyl, 1-ethyl decyl, 1-ethyl undecyl, 1,2-dimethyl propyl, 1,2-dimethyl butyl, 1,2-dimethyl pentyl, 1,2-dimethyl hexyl, 1,2-dimethyl heptyl, 1,2-dimethyl octyl, 1,2-dimethyl nonyl, 1,2-dimethyl decyl, 1,2-dimethyl undecyl, 1,2-dimethyl dodecyl, glycidyl 1-trifluoromethyl ethyl, 1-trifluoromethyl propyl, 1-trifluoromethyl butyl, 1-trifluoromethyl pentyl, 1-trifluoromethyl hexyl, 1-trifluoromethyl heptyl, 1-trifluoromethyl octyl, 1-trifluoromethyl nonyl, 1-trifluoromethyl decyl, 1-phenyl-2,2,2-trifluoroethyl, 1-(4-methoxylphenyl)-2,2,2-trifluoroethyl, 1-fluoromethyl ethyl, 1-fluoromethyl propyl, 2-fluoromethyl propyl, 1-fluoromethyl butyl, 1-chloromethyl ethyl, 1-chloromethyl propyl, 2-chloromethyl propyl, 1-chloromethyl butyl, 1-phenyl ethyl, 1-phenyl propyl, 2-methoxy propyl, 2-methoxy pentyl, 2-ethoxy propyl, 2-ethoxy butyl, 2-butoxy propyl, 1-(methoxymethyl) ethyl, 1-(ethoxymethyl) ethyl, 1-(propoxyethyl) ethyl, 2-methoxy-3-pentyloxy propyl, 2-methoxy-3-heptyloxy propyl, 2-methoxy-3-octyloxy propyl, 2-methoxy-3-nonyloxy propyl, 2-methoxy-3-decyloxy propyl, 2-methoxy-3-undecyloxy propyl, 2-methoxy-3-dodecyloxy propyl, 2-methoxy-1-ethoxymethyl ethyl, 2-methoxy-1-propoxymethyl ethyl, 2-methoxy-1butoxymethyl ethyl, 2-methoxy-1-pentyloxymethyl ethyl, 2-methoxy-1-hexyloxymethyl ethyl, 2-methoxy-1-heptyloxymethyl ethyl, 2-methoxy-1-octyloxymethyl ethyl, 2-methoxy-1-nonyloxymethyl ethyl, 2-methoxy-1-decyloxymethyl ethyl, 2-methoxy-1-undecyloxymethyl ethyl, 2-methoxy-4-methyl pentyl, 2-ethoxy-3-methyl pentyl, 2-ethoxy-4-methyl pentyl, 2-propoxy-3-methyl pentyl, 2-propoxy-4-methyl pentyl, 2-butoxy-3-methyl pentyl, 2-butoxy-4-methyl pentyl, 2-ethoxy-3-phenyl propyl, 2-propoxy-3-phenyl propyl, 2-butoxy-3-phenyl propyl, 2-pentyloxy-3-phenyl propyl, 2-hexyloxy-3-phenyl propyl, 2-heptyloxy-3-phenyl propyl, 2-methoxy-2-phenyl ethyl, 2-ethoxy-2-phenyl ethyl, 2-propoxy-2-phenyl ethyl, 2-butoxy-2-phenyl ethyl, 2-pentyloxy-2-phenyl ethyl, 2-ethyloxy-2-phenyl ethyl, 2-methoxy-2-(4-pentyloxyphenyl) ethyl, 2-methoxy-2-(4-hexyloxyphenyl) ethyl, 2-methoxy-2-(4-heptyloxyphenyl) ethyl, 2-methyl cyclopentyl, 3-methyl cyclopentyl, 2-methyl cyclohexyl, 3-methyl cyclohexyl, 2-phenyl cyclohexyl, 3-phenyl cyclohexyl, menthyl, isomenthyl, 2-(penten-2-yl) -5menthyl cyclohexyl, 4,4-dimethyl tetrahydrofura-2-non-3-yl, norbornan-2-yl, norbornan-7-yl, bornenyl, terpinenyl, choresteryl, 2-(1-methoxy-1-methylethyl)-5-methyl cyclohexyl, tetrahydrofuran-2-yl, tetrahydrofuran-3-yl, tetrahydropyran-2-yl, tetrahydropyran-3-yl, 2-methoxy cyclohexyl, 3-methoxy cyclohexyl, 2-methoxy cyclopentyl, 3-methoxy cyclopentyl.

The optically active bifunctional group used in the present invention has usually 3–30, preferably 3–20 carbon atoms. Examples are as follows (They are referred to as Exemplification 2):

methylethan-1,2-diyl, 1,2-dimethylethan-1,2-diyl, phenylethan-1,2-diyl, methoxymethylethan-1,2-diyl, ethoxymethylethan-1,2-diyl, propoxymethylethan-1,2-diyl, butoxymethylethan-1,2-diyl, pentyloxymethylethan-1,2-diyl, hexyloxymethylethan-1,2-diyl, 2-methylbutan-1,4-diyl, 2-phenylbutan-1,4-diyl, 2-benzylbutan-1,4-diyl, 2-ethylbutan-1,4-diyl, 1,2-dimethylbutan-1,4-diyl, 2,3-dimethylbutan-1,4-diyl, 2-methoxybutan-1,4-diyl, 2-ethoxybutan-1,4-diyl, 2-propoxybutan-1,4-diyl, 2-butoxybutan-1,4-diyl, 2,3-dimethoxybutan-1,4-diyl, 2,3-diethoxybutan-1,4-diyl, 2,3-dibenzyloxybutan-1,4-diyl, 1-methylhexan-1,6-diyl, 2-methylhexan-1,6-diyl, 3-methylhexan-1,6-diyl, cyclopentan-1,2-diyl, cyclopentan-1,3-diyl, cyclohexan-1,2-diyl, cyclohexan-1,3-diyl, cycloheptan-1,2-diyl, cyclooctan-1,2-diyl, 1,2,2-trimethylcyclopentan-1,3-diyl, norbornan-2,3-diyl, norbornan-2,5-diyl, norbornan-2,6-diyl, 5-norbornanemethyl-(2,α)-diyl.

The method for preparing the discotic liquid crystalline compound and optically active discotic liquid crystalline used in the present invention, namely the method for bonding a compound capable of being a substituent group and a substituent site in a compound capable of being a discogen, is mentioned hereinafter. The means for bonding the substituent group exemplified in Exemplification 1 or 2 to the bonding site of a compound capable of being a discogen is not specially limited. For example, when the substituent site of a compound capable of being a discogen has hydroxyl or mercapto groups, the compound capable of being a discogen is bonded to the compound capable of being a substituent by alkylating said site to form an ether or sulfide linkage. In such a case there is exemplified a method in which a tosylate, mesylate, benzenesulfonate, bromide, iodide or similar compound having a substituent exemplified in Example 1 or a ditosylate, dimesylate, dibenzenesulfonate, dibromide, diiodide or similar compound having a substituent exemplified in Exemplification 2 is condensed with an alkoxide, phenoxid, thioalkoxide or thiophenoxide which is the substituent site of a compound capable of being a discogen in the presence or absence of a basic compound. Examples of the compound having hydroxy or mercapto groups capable of being a discogen and as follows:

2,3,6,7,10,11-hexahydroxy triphenylene, 2,3,6,7,10,11-hexamercapto triphenylene, 1,2,5,6,8,9,12,13-octahydroxy benzo[fg, op]naphthacene, 1,2,5,6,8,9,12,13-octamercaptodibenzo[fg, op]naphthacene, 1,3,5-trihydroxybenzene, 1,3,5-trimercaptobenzene, 2,3,7,8,12,13-hexahydroxytruxene, 2,3,7,8,12,13-hexamercaptotruxene, 2,3,7,8,12,13-hexahydroxytrioxatruxene, 2,3,7,8,12,13-hexamercaptotrioxatruxene, 1,2,3,5,6,7-hexahydroxyanthraquinone, 1,2,3,5,6,7-hexamercaptoanthraquinone, 4-(2,6-bis(4-hydroxy phenyl)-4 H-pyran-4-ylidene)-2,6-bis(4-hydroxyphenyl)-4 H-pyran, 4-(2,6-bis(4-mercaptophenyl)-4 H-pyran-4-ylidene)-2,6bis(4-mercaptophenyl)-4 H-pyran, 1,3,6,8-tetrahydroxy pyran, 1,3,6,8-tetramercapto pyran, 2,3,6,7,10,11-hexakis(4-hydroxy benzene-1-ylcarboxy)triphenylene, 2,3,6,7,10,11-hexakis(6hydroxynaphthalene-2-ylcarboxy) triphenylene, 2,3,6,7,10,11-hexakis(4'-hydroxy[1,1'-biphenyl]-4-ylcarboxy)triphenylene, 2,3,6,7,10,11-hexakis(4-hydroxyphenylacetoxy)triphenylene, 2,3,6,7,10,11-hexakis(4-hydroxyphenylpropenoyloxy)tri phenylene, 1,3,5-tris(4-hydroxybenzene-1-ylcarboxy)tri phenylene, 1,3,5-tris(6-hydroxynaphthalene-2-ylcarboxy) benzene, 1,3,5-tris(4'-hydroxy[1,1'-biphenyl]-4-ylcarboxy)benzene, 1,3,5-tris(4-hydroxy(phenylacetoxy) benzene, 1,3,5-tris(4-hydrophenylpropenoyloxy)benzene, 2,3,7,8,12,13-hexakis(4-hydroxybenzene-1-ylcarboxy)truxene, 2,3,7,8,12,13-hexakis(6-hydroxy naphthalene-2-ylcarboxy) truxene, 2,3,7,8,12,13-hexakis(4'-hydroxy[1,1'-biphenyl]-4ylcarboxy) truxene, 2,3,7,8,12,13-hexakis(4-hydroxy phenyl acetoxy) truxene, 2,3,7,8,12,13-hexakis(4-hydroxypropenoy loxy) truxene, 2,3,7,8,12,13-hexakis(4-hydroxybenzene-1-ylcarboxy)trioxatruxene, 2,3,7,8,12,13-hexakis (6hydroxynaphthalene-2-ylcarboxy)trioxatruxene, 2,3,7,8, 12,13-hexakis(4'-hydroxyl[1,1'-biphenyl]-4-ylcarboxy) trioxatruxene, 2,3,7,8,12,13-hexakis(4-hydroxyphenylacetoxy) trioxatruxene, 2,3,7,8,12,13-hexakis(4-hydroxyphenyl propenoyloxy)trioxatruxene, 1,2, 5,6,8,9,12,13-octakis(4-hydroxybenzene-1-ylcarboxy) dibenzo[fg, op]naphthacene, 1,2,5,6,8,9,12,13-octakis(6-hydroxynaphthalene-2-ylcarboxy)dibenzo[fg, op]naphthacene, 1,2,5,6,8,9,12,13-octakis(4'-hydroxy [1,1'-biphenyl]-4-ylcarboxy)dibenzo [fg, op]naphthacene, 1,2,5, 6,8,9,12,13-octakis(4-hydroxyphenylacetoxy)dibenzo[fg, op]naphthacene, 1,2,5,6,8,9,12,13-octakis(4-hydroxyphenylpropenoyloxy) dibenzo[fg, op]naphthacene and the like.

The following are preferable:

2,3,6,7,10,11-hexahydroxy triphenylene, 2,3,6,7,10,11-hexamercapto triphenylene, 1,2,5,6,8,9,12,13-octahydroxy benzo[fg, op]naphthacene, 1,3,5-trihydroxybenzene, 1,3,5-trimercaptobenzene, 2,3,7,8,12,13-hexahydroxytruxene, 2,3,7,8,12,13-hexahydroxytrioxatruxene, 1,2,3,5,6,7-hexahydroxyanthraquinone, 4-(2,6-bis(4-hydroxyphenyl)-4 H-pyran-4-ylidene)-2,6-bis(4-hydroxyphenyl)-4 H-pyran.

When using the above bonding method, the optically active (di)tosylate, (di)bromide or (di)iodide compound can be used alone or in the combination of two or more thereof for preparing an optically active discotic liquid crystalline compound which constitutes a discotic liquid crystalline material usable in the present invention. Also, if necessary, they can be alkylated by using a mixture with a (di)tosylate, (di)mecylate, (di)benzene-sulfonate, (di)bromide or (di) iodide compound of an achiral groups to yield said discotic liquid crystalline compound.

In the present invention, an optically inactive discotic liquid crystalline compound, namely a discotic liquid crystalline compound containing achiral groups only, can be mixed with said liquid crystalline compound containing an optically active group(s) to yield a discotic liquid crystalline material to be used in the present invention.

In the achiral substituent groups constituting the above-mentioned optically inactive discotic liquid crystalline compound, monofunctional group is an aliphatic group, alicyclic group, aromatic group or the like having 1–30, preferably 1–20 carbon atoms and usually used in the form of tosylate, mesylate, benzenesulfonate, bromide or iodide compound in the bond-forming reaction with the substituent site of a compound capable of becoming a discogen.

Examples are methyl tosylate, ethyl tosylate, propyl tosylate, isopropyl tosylate, butyl tosylate, isobutyl tosylate, pentyl tosylate, hexyl tosylate, heptyl tosylate, octyl tosylate, nonyl tosylate, decyl tosylate, undecyl tosylate, dodecyl tosylate, tridecyl tosylate, tetradecyl tosylate, benzyl tosylate or corresponding mesylate, benzenesulfonate, bromide or iodide compound, or the like.

Also, an achiral bifunctional group having 2–30, preferably 2–20 carbon atoms can be used. Usually they are used in the form of tosylate, mesylate, benzenesulfonate, bromide or iodide compound such as alkyl tosylate or aryl tosylate in the bond-forming reaction.

Examples are ethane-1,2-ditosylate, propane-1,3-ditosylate, butane-1,4-ditosylate, pentane-1,5-ditosylate, hexane-1,6-ditosylate, heptane-1,7-ditosylate, octane-1,8-ditosylate, nonane-1,9-ditosylate, decane-1,10-ditosylate, undecane-1,11-ditosylate, dodecane-1,12-ditosylate, benzene-1,4-ditosylate, benzene-1,4-dimethyl-α-α'-ditosylate, cyclohexane-1,4-dimethyl-α-α'-ditosylate or corresponding dimesylate, bisbenzenesulfonate, dibromide or diiodide compound, or the like.

When the substituent site of the compound capable of being a discogen has hydroxyl or mercapto groups, they can be converted to ester bondings by using an optically active carboxylic acid or its functional derivative and used for preparing an optically active discotic liquid crystalline compound which can be used in the present invention. The method is not specially limited.

For example, an optically active group can be introduced by an ester-exchange of a compound capable of being a discogen which has a lower aliphatic acid ester at the substituent site or the compound obtained by converting the hydroxyl or mercapto group at the substituent site to a lower aliphatic acid ester through acetylation or the like with a suitable optically active carboxylic acid compound or its functional derivative.

Alternatively, an optically active carboxylic acid or its functional derivative is coverted to an acid chloride, acid anhydride or the like and then esterified with a compound capable of being a discogen having a hydroxyl or mercapto group at the substituent site in the presence of a reagent which can activate carboxylic acids, such as paratoluenesulfonic acid or dicyclohexyl carbodiimide to yield a desirable discotic liquid crystalline compound.

Examples of the compound capable of being a discogen having hydroxyl or mercapto groups in the respective substituent site are the same as those exemplified above.

The following are examples of the compound having lower an aliphatic carboxylic acid ester at the substituent site which is capable of being a discogen: 2,3,6,7,10,11-hexaacetoxy triphenylene, 2,3,6,7,10,11-hexaacetylthio triphenylene, 1,2,5,6,8,9,12,13-octaacetoxy dibenzo[fg, op]naphthacene, 1,2,5,6,8,9,12,13-octaacetylthio dibenzo[fg, op]naphthacene, 1,3,5-triacetoxy benzene, 1,3,5-triacetyloxythio benzene, 2,3,7,8,12,13-hexaacetoxy truxene, 2,3,7,8,12,13-hexaacetylthio truxene, 2,3,7,8,12,13-hexaacetoxytrioxa truxene, 2,3,7,8,12,13-hexaacetylthiotrioxa truxene, 1,2,3,5,6,7-hexaacetoxy anthraquinone, 1,2,3,5,6,7-hexaacetylthio anthraquinone, 4-(2,6-bis(4-acetoxyphenyl)-4 H-pyran-4-ylidene)-2,6-bis(4-acetoxyphenyl)-4 H-pyran, 4-(2,6-bis(4-acetylthiophenyl)-4 H-pyran-4-ylidene)-2,6-bis(4-acetylthiophenyl)-4 H-pyran, 1,3,6,8-tetraacetoxy pyran, 1,3,6,8-tetraacetylthio pyran, 2,3,6,7,10,11-hexakis(4-acetoxybenzene-1-ylcarboxy)triphenylene, 2,3,6,7,10,11-hexakis(4acetoxynaphthalene-2-ylcarboxy)triphenylene, 2,3,6,7,10,11-hexakis(4'-acetoxy[1,1'-biphenyl]-4-ylcarboxy) triphenylene, 2,3,6,7,10,11-hexakis(4-acetoxyphenylacetoxy)triphenylene, 2,3,6,7,10,11-hexakis(4-acetoxyphenylpropenoyloxy)triphenylene, 1,3,5-tris(4-acetoxybenzene-1-ylcarboxy)benzene, 1,3,5-tris(6-acetoxynaphthalene-2-ylcarboxy)benzene, 1,3,5-tris(4'-acetoxy[1,1'-biphenyl]-4-ylcarboxy)benzene, 1,3,5-tris(4-acetoxyphenylacetoxy)benzene, 1,3,5-tris(4-acetoxyphenylpropenoyloxy)benzene, 2,3,7,8,12,13-hexakis(4-acetoxybenzene-1-ylcarboxy)truxene, 2,3,7,8,12,13-hexakis(6-acetoxynaphthalene-2-ylcarboxy)truxene, 2,3,7,8,12,13-hexakis(4'-acetoxy[1,1'-biphenyl]-4-ylcarboxy) truxene, 2,3,7,8,12,13-hexakis(4-acetoxyphenylacetoxy) truxene, 2,3,7,8,12,13-hexakis(4-acetoxyphenylpropenoyloxy)truxene, 2,3,7,8,12,13-hexakis (4-acetoxybenzene-1-ylcarboxy)trioxatruxene, 2,3,7,8,12, 13-hexakis(6-acetoxynaphthalene-2-ylcarboxy) trioxatruxene, 2,3,7,8,12,13-hexakis(4'-acetoxy[1,1'-biphenyl]-4-ylcarboxy)trioxatruxene, 2,3,7,8,12,13-hexakis (4-acetoxyphenylacetoxy)trioxatruxene, 2,3,7,8,12,13-hexakis(4-acetoxyphenylpropenoyloxy)trioxatruxene, 1,2,5, 6,8,9,12,13-octakis(4-acetoxybenzene-1-ylcarboxy)dibenzo [fg, op]nephthacene, 1,2,5,6,8,9,12,13-octakis(6-acetoxynaphthalene-2-ylcarboxy)dibenzo[fg, op]nephthacene, 1,2,5,6,8,9,12,13-octakis(4'-acetoxy [1,1'-biphenyl]-4-ylcarboxy)dibenzo [fg, op]nephthacene, 1,2,5, 6,8,9,12,13-octakis(4-acetoxyphenylacetoxy)dibenzo[fg, op]nephthacene, 1,2,5,6,8,9,12,13-octakis(4-acetoxyphenylpropenoyloxy)dibenzo[fg, op]nephthacene and the like.

The following are preferable: 2,3,6,7,10,11-hexaacetoxy triphenylene, 1,2,5,6,8,9,12,13-octaacetoxydibenzo[fg, op]naphthacene, 1,3,5-triacetoxy benzene, 2,3,7,8,12,13-hexaacetoxy truxene, 2,3,7,8,12,13-hexaacetoxytrioxatruxene, 4-(2,6-bis(4-acetoxyphenyl)-4 H-pyran-4-ylidene)-2,6-bis(4-acetoxyphenyl)-4 H-pyran.

In this case, the optically active carboxylic acid or its functional derivative which can be used for the ester-exchange reaction with the lower aliphatic carboxylic acid ester present at the substituent site of a compound capable of being a discogen has 3–30, preferably 3–20 carbon atoms. Carboxylic acids having monofunctional substituent group exemplified above may be used.

Examples are 2-methyl butyric acid, 2-methyl pentanoic acid, 3-methyl pentanoic acid, 2-methyl hexanoic acid, 3-methyl hexanoic acid, 4-methyl hexanoic acid, 2-methyl heptanoic acid, 3-methyl heptanoic acid, 4-methyl heptanoic acid, 5-methyl heptanoic acid, 2-methyl octanoic acid, 3-methyl octanoic acid, 4-methyl octanoic acid, 5-methyl octanoic acid, 6-methyl octanoic acid, 2-methyl nonanoic acid, 3-methyl nonanoic acid, 4-methyl nonanoic acid, 5-methyl nonanoic acid, 6-methyl nonanoic acid, 7-methyl nonanoic acid, 2-methyl decanoic acid, 2-methyl undecanoic acid, 2-methyl dodecanoic acid, 2-ethyl pentanoic acid, 2-ethyl hexanoic acid, 2-fluoromethyl propionic acid, 2-chloromethyl propionic acid, 2-methoxy propionic acid, 2-methoxy butyric acid, 2-methoxy pentanoic acid, 2-ethoxy propionic acid, 2-ethoxy butyric acid, 2-butoxy propionic acid, 2-methoxy-3-pentyloxy propionic acid, 2-methoxy-3-hexyloxy propionic acid, 2-methoxy-3-heptyloxy propionic acid, 2-methoxy-3-octyloxy propionic acid, 2-methoxy-3-nonyloxy propionic acid, 2-methoxy-3-decyloxy propionic acid, 2-methoxy-3-undecyloxy propionic acid, 2-methoxy-3-dodecyloxy propionic acid, 2-methoxy-4-methyl pentanoic acid, 2-ethoxy-3-methyl pentanoic acid, 2-ethoxy-4-methyl pentanoic acid, 2-propoxy-3-methyl pentanoic acid, 2-propoxy-4-methyl pentanoic acid, 2-butoxy-3-methyl pentanoic acid, 2-butoxy-4-methyl pentanoic acid, 2-ethoxy-3-phenyl propionic acid, 2-propoxy-3-phenyl propionic acid, 2-butoxy-3-phenyl propionic acid, 2-pentyloxy-3-phenyl propionic acid, 2-hexyloxy-3-phenyl propionic acid, 2-heptyloxy-3-phenyl propionic acid, 2-methoxy-2-phenyl acetic acid, 2-ethoxy-2-phenyl acetic acid, 2-propoxy-2-phenyl acetic acid, 2-butoxy-2-phenyl acetic acid, 2-pentyloxy-2-phenyl acetic acid, 2-hexyloxy-2- phenyl acetic acid, 2-methoxy-2-(4-pentyloxyphenyl) acetic acid, 2-methoxy-2-(4-hexyloxyphenyl) acetic acid, 2-methoxy-2-(4-heptyloxyphenyl) acetic acid, 2-methyl cyclopentane carboxylic acid, 3-methyl cyclopentane carboxylic acid, 2-methyl cyclohexane carboxylic acid, 3-methyl cyclohexane carboxylic acid, 2-phenyl cyclohexane carboxylic acid, 3-phenyl cyclohexane carboxylic acid, 2-(penten-2-yl)-5-methyl cyclohexane carboxylic acid, 4,4-dimethyl tetrahydrofra-2-none-3-carboxylic acid, norbornane-2-carboxylic acid, norbornane-7-carboxylic acid, 2-(1-methoxy-1-methylethyl)-5-methyl cyclohexane carboxylic acid, tetrahydrofran-2-carboxylic acid, tetrahydrofran-3-carboxylic acid, tetrahydropyran-2-carboxylic acid, tetrahydropyran-3-carboxylic acid, 2-methoxy cyclohexane carboxylic acid, 3-methoxy cyclohexane carboxylic acid, 2-methoxy cyclopentane carboxylic acid, 3-methoxy cyclopentane carboxylic acid and the like.

Also, an optically active carboxylic acid having an aromatic group or its functional derivative can be preferably used for the preparation of a discotic liquid crystalline compound used in the present invention.

Examples are the following carboxylic acid of which one or more hydrogens and substituted with one or more optically active groups or functional derivatives threof: benzoic acid, methoxy benzoic acid, ethoxy benzoic acid, propoxy benzoic acid, isopropoxy benzoic acid, butoxy benzoic acid, isobutoxy benzoic acid, sec-butoxy benzoic acid, tert-butoxy benzoic acid, pentyloxy benzoic acid, hexyloxy benzoic acid, heptyloxy benzoic acid, octyloxy benzoic acid, nonyloxy benzoic acid, decyloxy benzoic acid, fluoro benzoic acid, difluoro benzoic acid, trifluoromethyl benzoic acid, chloro benzoic acid, dichloro benzoic acid, methyl benzoic acid, ethyl benzoic acid, propyl benzoic acid, isopropyl benzoic acid, butyl benzoic acid, isobutyl benzoic acid, sec-butyl benzoic acid, tert-butyl benzoic acid, pentyl benzoic acid, hexyl benzoic acid, heptyl benzoic acid, octyl benzoic acid, nonyl benzoic acid, decyl benzoic acid, dimethoxy benzoic acid, diethoxy benzoic acid, dipropoxy benzoic acid, diisopropoxy benzoic acid, dibutoxy benzoic acid, diisobutoxy benzoic acid, dipentyloxy benzoic acid, dihexyloxy benzoic acid, diheptyloxy benzoic acid, dioctyloxy benzoic acid, dinonyloxy benzoic acid, didecyloxy benzoic acid, difluoro benzoic acid, dichloro benzoic acid, dimethyl benzoic acid, cinnamic acid, methoxy cinnamic acid, ethoxy cinnamic acid, propoxy cinnamic acid, isopropoxy cinnamic acid, butoxy cinnamic acid, isobutoxy cinnamic acid, sec-butoxy cinnamic acid, tert-butoxy cinnamic acid, pentyloxy cinnamic acid, hexyloxy cinnamic acid, heptyloxy cinnamic acid, octyloxy cinnamic acid, nonyloxy cinnamic acid, decyloxy cinnamic acid, fluoro cinnamic acid, trifluoromethyl cinnamic acid, chloro cinnamic acid, bromo cinnamic acid, nitro cinnamic acid, dimethyl amino cinnamic acid, methyl cinnamic acid, ethyl cinnamic acid, propyl cinnamic acid, isopropyl cinnamic acid, butyl cinnamic acid, isobutyl cinnamic acid, sec-butyl cinnamic acid, tert-butyl cinnamic acid, pentyl cinnamic acid, hexyl cinnamic acid, heptyl cinnamic acid, octyl cinnamic acid, nonyl cinnamic acid, decyl cinnamic acid, phenyl acetic acid, (methoxy) phenyl acetic acid, (ethoxy)phenyl acetic acid, (propoxy) phenyl acetic acid, (isopropoxy)phenyl acetic acid, (butoxy) phenyl acetic acid, (isobutoxy)phenyl acetic acid, (sec-butoxy)phenyl acetic acid, (tert-butoxy)phenyl acetic acid, (pentyloxy)phenyl acetic acid, (hexyloxy)phenyl acetic acid, (heptyloxy)phenyl acetic acid, (octyloxy)phenyl acetic acid, (nonyloxy)phenyl acetic acid, (decyloxy)phenyl acetic acid, (fluoro)phenyl acetic acid, (trifluoromethyl) phenyl acetic acid, (chloro)phenyl acetic acid, (bromo) phenyl acetic acid, (nitro)phenyl acetic acid, (dimethylamino)phenyl acetic acid, (methyl)phenyl acetic acid, (ethyl)phenyl acetic acid, (propyl)phenyl acetic acid, (isopropyl)phenyl acetic acid, (butyl)phenyl acetic acid, (isobutyl)phenyl acetic acid, (sec-butyl)phenyl acetic acid, (tert-butyl)phenyl acetic acid, (pentyl)phenyl acetic acid, (hexyl)phenyl acetic acid, (heptyl)phenyl acetic acid, (octyl) phenyl acetic acid, (nonyl)phenyl acetic acid, (decyl)phenyl acetic acid, phenyl butyric acid, phenyl valeric acid, phenyl hexanoic acid, stilbene carboxylic acid, 1-naphthoic acid, 2-naphthoic acid, [1,1'-biphenyl]-4-carboxylic acid and the like.

Preferable are the above carboxylic acid or derivatives thereby which are substituted with one or more optically active alkoxy groups because they are easily available.

The method for preparing the above aromatic group-containing optically active carboxylic acid or its derivative is not specially limited. Commercially, available compounds can be prepared by known methods.

The following are typical methods for preparing carboxylic acid substituted with optically active alkoxy groups which are commercially, available.

For example, they can be prepare by alkylating the hydroxy group(s) of the corresponding hydroxy carboxylic acid with an optically active alkoxy group.

Examples of the hydroxy carboxylic acid to be used are 2-hydroxy benzoic acid, 3-hydroxy benzoic acid, 4-hydroxy benzoic acid, 3,4-hydroxy benzoic acid, 3,4,5-hydroxy benzoic acid, 3-methoxy-4-hydroxy benzoic acid, 4-methoxy-3-hydroxy benzoic acid, 3-methoxy-4,5-hydroxy benzoic acid, 4-methoxy-3,5-hydroxy benzoic acid, 3-hydroxy-4,5-dimethoxy benzoic acid, 4-hydroxy-3,5-dimethoxy benzoic acid, 2-hydroxyphenyl acetic acid, 3-hydroxyphenyl acetic acid, 4-hydroxyphenyl acetic acid, 3,4,5-hydroxyphenyl acetic acid, 3-methoxy-4-hydroxyphenyl acetic acid, 4-methoxy-3-hydroxyphenyl acetic acid, 3-methoxy-4,5-dihydroxyphenyl acetic acid, 4-methoxy-3,5-dihydroxyphenyl acetic acid, 3-hydroxy-4,5-dimethoxyphenyl acetic acid, 4-hydroxy-3,5-dimethoxyphenyl acetic acid, 2-hydroxy cinnamic acid, 3-hydroxy cinnamic acid, 4-hydroxy cinnamic acid, 3,4-hydroxy cinnamic acid, 3,4,5-trihydroxy cinnamic acid, 3-methoxy-4-hydroxy cinnamic acid, 4-methoxy-3-hydroxy cinnamic acid, 3-methoxy-4,5-dihydroxy cinnamic acid, 4-methoxy-3,5-dihydroxy cinnamic acid, 4-hydroxy-3,5-dimethoxy cinnamic acid, 6-hydroxy-2-naphthoic acid, 3-hydroxy-2-naphthoic acid, 4'-hydroxy[1,1'-biphenyl]-4-carboxylic acid, 2-hydroxy-1-naphthoic acid, 4-hydroxy-1-naphthoic acid and the like.

The hydroxy group(s) of these hydroxy carboxylic acid can be alkylated with appropriate optically active group(s) to yield the aromatic group-containing carboxylic acid derivative which can be used when preparing the discotic liquid crystalline compound used in the present invention. One of the alkylation methods, is a method wherein optically active alkyl group-containing tosylate, mesylate, benzenesulfonate, bromide or iodide compound is reacted with hydroxycarboxylic acid in the presence of a base (hereinafter referred to as Williamson method).

As the optically active alkyl group-containing tosylate, mesylate, benzenesulfonate, bromide or iodide compound, those having the group(s) exemplified in example 1 or 2 can be used. Among them, tosylate, mesylate and bromides are preferable and tosylate, mesylate and bromides are preferable and tosylate are more preferable in view of commercial availablity.

When using a hydroxycarboxylic acid having two or more hydroxy group(s) in used as a starting material for the compound capable of being a substituent group, an achiral group-containing tosylate, mesylate, benzenesulfonate, bromide or iodide compound is coexisted together with an optically active tosylate, mesylate, benzenesulfonate, bromide or iodide compound to yield an optically active carboxylic acid or its functional derivative in which an optically active group is introduced in a part of the hydroxy groups and an achiral group is introduced in the rest of the hydroxyl groups which can be used for preparing the liquid crystalline compound used in the present invention. The achiral group-containing tosylate, mesylate, benzenesulfonate, bromide or iodide compounds are compounds having an aliphatic group, alicyclic group or aromatic group having 1–30, preferably 1–20 carbon atoms or derivatives thereof. Typical tosylate compounds are methyl tosylate, ethyl tosylate, propyl tosylate, isopropyl tosylate, butyl tosylate, isobutyl tosylate, pentyl tosylate, hexyl tosylate, heptyl tosylate, tosylate, octyl tosylate, nonyl tosylate, decyl tosylate, undecyl tosylate, dodecyl tosylate, tridecyl tosylate, tetradecyl tosylate, benzyl tosylate, alkyl tosylate, cyclohexyl tosylate and the like.

Groups such as fluoro, chloro and nitro located at ortho- or para- position of a nucleophilic substituent group such as nitro, cyano or carboxyl group tend to take place a cleophilic substitution reaction easily.

By utilizing this property such a compound is reacted with an alkoxide to yield an aromatic group-containing carboxylic acid derivative which can be used for preparing the discotic liquid crystalline compound which constitutes the material of the present invention (hereinafter referred to as SNAr method).

Examples of the aromatic compound to be used in this reaction are 2-fluoro benzonitrile, 4-fluoro benzonitrile, 2-nitro benzonitrile, 4-nitro benzonitrile, 2-chloro benzonitrile, 4-chloro benzonitrile, 2,4-dinitro benzonitrile, 3,4-dinitro benzonitrile, 3-nitro-4-fluoro benzonitrile, 3-fluoro-4-nitro benzonitrile, 2-nitro-4chloro benzonitrile, 4-fluoro benzoic acid, 2-fluoro benzoic acid, 4-nitro benzoic acid, 2-nitro benzoic acid, 4-fluoro-3-nitro benzoic acid, 4-chloro-3-nitro benzoic acid and the like.

In a case where a nitrile is produced as an intermediate, it can be converted to a desirable optically active carboxylic acid on its functional derivative by hydrolysis under an acidic or alkaline condition utilizing conventional method. In a case where a nitro group-containing optically active carboxylic acid or its derivative is produced it can be used in the present invention so far as it has no undesirable properties such as absorption at visible region. If necessary, undesirable substituent groups, if any, can be substituted with suitable groups.

Examples of the alkoxide which can be used in the SNAr method are alkoxide which have one or more substituent groups exemplified in the Exemplification 1. They can be prepared by reacting an alcohol having the substituent group(s) with an alkali or alkali metal such as Na, K, nBuLi, NaH, KH or tert Bu OK in an solvent if necessary.

Hereinafter, the chemical structures of the aromatic group-containing carboxylic acid derivatives obtained by the above methods are explained in detail.

In the case of benzoic acid derivatives, an optically active group is usually substituted at any position of 2-, 3- or 4-position, but the 4-position substituted compounds are most preferably used due to easy preparation. Benzoic acid derivatives having the substituent groups mentioned in Exemplification 1 can be exemplified as concrete compounds.

Examples are 4-(1-methylpropoxy)benzoic acid, 4-(1-methylbutoxy)benzoic acid, 4-(1-methylpentyloxy)benzoic acid, 4-(1-methylhexyloxy)benzoic acid, 4-(1-methylheptyloxy)benzoic acid, 4-(1-methyloctyloxy) benzoic acid, 4-(2-methylbutoxy)benzoic acid, 4-(2-methylpentyloxy)benzoic acid, 4-(2-methylhexyloxy) benzoic acid, 4-(2-methylheptyloxy)benzoic acid, 4-menthyloxy benzoic acid, 4,5-bis(1-methylpropoxy) benzoic acid, 4,5-bis(1-methylbutoxy)benzoic acid, 4,5-bis(1-methylpropoxy)-3-methoxy benzoic acid, 4,5-bis(1-methylbutoxy)-3-methoxy benzoic acid, 3,5-bis(1-methylpropoxy)benzoic acid, 3,5-bis(1-methylbutoxy) benzoic acid, 3,5-bis(1-methylpropoxy)-4-methoxy benzoic acid, 3,5-bis(1-methylbutoxy)-4-methoxy benzoic acid, 3,4,5-tris(1-methylpropoxy)benzoic acid, 3,4,5-tris(1-methylbutoxy)benzoic acid, 3,4,5-tris(1-methylpentyloxy) benzoic acid, 3,4,5-tris(1-methylhexyloxy)benzoic acid, 3,4,5-tris(1-methylheptyloxy)benzoic acid, 3,4,5-tris(1-methyloctyloxy)benzoic acid, 3,4,5-tris(2-methylbutoxy) benzoic acid, 3,4,5-tris(2-methylpentyloxy)benzoic acid, 3,4,5-tris(2-methylhexyloxy)benzoic acid, 3,4,5-tris(2-methylheptyloxy)benzoic acid and the like.

In the case of phenyl acetic acid derivatives, an optically active group is usually substituted at 2-, 3- or 4- position but the 4- substituted compounds are most preferably used due to easy preparation.

Examples are 4-(1-methylpropoxy)phenyl acetic acid, 4-(1-methylbutoxy)phenyl acetic acid, 4-(1-methylpentyloxy)phenyl acetic acid, 4-(1-methylhexyloxy) phenyl acetic acid, 4-(1-methylheptyloxy)phenyl acetic acid, 4-(1-methyloctyloxy)phenyl acetic acid, 4-(2-methylbutoxy)phenyl acetic acid, 4-(2-methylpentyloxy) phenyl acetic acid, 4-(2-methylhexyloxy)phenyl acetic acid, 4-(2-methylheptyloxy)phenyl acetic acid, 4-menthyloxy phenyl acetic acid, 4,5-bis(1-methylpropoxy)phenyl acetic acid, 4,5-bis(1-methylbutoxy)phenyl acetic acid, 4,5-bis(1-methylpentyloxy)phenyl acetic acid, 4,5-bis(1-methylhexyloxy)phenyl acetic acid, 4,5-bis(1-methylpropoxy)-3-methoxy phenyl acetic acid, 4,5-bis(1-methylbutoxy)-3-methoxy phenyl acetic acid, 4,5-bis(1-methylpentyloxy)-3-methoxy phenyl acetic acid, 4,5-bis(1-methylhexyloxy)-3-methoxy phenyl acetic acid, 3,4,5-tris(1-methylpropoxy)phenyl acetic acid, 3,4,5-tris(1-methylbutoxy)phenyl acetic acid, 3,4,5-tris(1-methylpentyloxy)phenyl acetic acid, 3,4,5-tris(1-methylhexyloxy)phenyl acetic acid, 3,4,5-tris(1-methylheptyloxy)phenyl acetic acid, 3,4,5-tris(1-methyloctyloxy)phenyl acetic acid, 3,4,5-tris(2-methylbutoxy)phenyl acetic acid and the like.

In the case of cinnamic acid derivatives, an optically active substituent group is usually substituted at 2-, 3- or 4- position but the 4- substituted compounds are most preferably used due to easy preparation.

Examples are 4-(1-methylpropoxy)cinnamic acid, 4-(1-methylbutoxy)cinnamic acid, 4-(1-methylpentyloxy) cinnamic acid, 4-(1-methylhexyloxy)cinnamic acid, 4-(1-methylheptyloxy)cinnamic acid, 4-(1-methyloctyloxy) cinnamic acid, 4-(2-methylbutoxy)cinnamic acid, 4-(2-methylpentyloxy)cinnamic acid, 4-(2-methylhexyloxy) cinnamic acid, 4-(2-methylheptyloxy)cinnamic acid, 4-menthyloxy cinnamic acid, 4,5-bis(1-methylpropoxy) cinnamic acid, 4,5-bis(1-methylbutoxy)cinnamic acid, 4,5-bis(1-methylpentyloxy)cinnamic acid, 4,5-bis(1-methylhexloxy)cinnamic acid, 4,5-bis(1-methylheptyloxy) cinnamic acid, 4,5-bis(1-methyloctyloxy)cinnamic acid, 4,5-bis(1-methylpropoxy)-3-methoxy cinnamic acid, 4,5-bis(1-methylbutoxy)-3-methoxy cinnamic acid, 4,5-bis(1-methylpentyloxy)-3-methoxy cinnamic acid, 3,5-bis(1-methylpropoxy)cinnamic acid, 3,5-bis(1-methylbutoxy)

cinnamic acid, 3,5-bis(1-methylpentyloxy)cinnamic acid, 3,5-bis(1-methylhexyloxy)cinnamic acid, 3,5-bis(1-methylheptyloxy)cinnamic acid, 3,5-bis(1-methyloctyloxy) cinnamic acid, 3,4,5-tris(1-methylpropoxy)cinnamic acid, 3,4,5-tris(1-methylbutoxy)cinnamic acid, 3,4,5-tris(1-methylpentyloxy)cinnamic acid, 3,4,5-tris(1-methylhexyloxy)cinnamic acid, 3,4,5-tris(1-methylheptyloxy)cinnamic acid and the like.

As the naphthoic acid derivative, usually any isomers of a substituted naphthoic acid may be used. Preferably, those having a carboxylic acid group at 2-position of the naphthalene ring and the substituent group(s) at 6- or 7-position, more preferably 6-position, thereof are used.

Examples are 6-(1-methylpropoxy)-2-naphthoic acid, 6-(1-methylbutoxy)-2-naphthoic acid, 6-(1-methylpentyloxy)2-naphthoic acid, 6-(1-methylhexyloxy)-2-naphthoic acid, 6-(1-methylheptyloxy)-2-naphthoic acid, 6-(1-methyloctyloxy)-2-naphthoic acid, 6-(2-methylbutoxy)-2-naphthoic acid, 6-(2-methylpentyloxy)-2-naphthoic acid, 6-(2-methylhexyloxy)-2-naphthoic acid, 6-(2-methylheptyloxy)-2-naphthoic acid and the like.

Further, as the [1,1'-biphenyl] carboxylic acid derivative, usually any isomers of a substituted [1,1'-biphenyl] carboxylic acid may be used. Preferably, those having a carboxylic acid group at 4-positon of the [1,1'-biphenyl] group and the substituent group at 4'-position thereof are used.

Examples are 4'1-methylheptyloxy)-[1,1'-biphenyl]-4-carboxylic acid, 4'-(1-methyloctyloxy)-[1,1'-biphenyl]-4-carboxylic acid, 4'-(2-methylbutoxy)-[1,1'-biphenyl]-4-carboxylic acid, 4'-(2-methylpentyloxy)-[1,1'-biphenyl]-4-carboxylic acid, 4'-(2-methylhexyloxy)-[1,1'-biphenyl]-4-carboxylic acid, 4'-(2-methylheptyloxy)-[1,1'-biphenyl]-4-carboxylic acid and the like.

Not only monocarboxylic acids but also dicarboxylic acids are preferably used. Examples thereof are methyl succinic acid, 2-dimethylamino succinic acid, 2-methoxy succinic acid, 2-ethoxy succinic acid, 2-benzyl succinic acid, 2-phenyl succinic acid, 2-(4-methoxy-phenylmethyl) succinic acid, 2,3-dimethyl succinic acid, 2,3-diphenyl succinic acid, 2,3-dimethoxy succinic acid, 2,3-diethoxy succinic acid, 3-methyl glutaric acid, 2,3-dimethyl glutaric acid, 2-dimethylamino glutaric acid, 2-methoxy glutaric acid, 2-methyl adipic acid, 3-methyl adipic acid, 3,4-dimethyl adipic acid, camphor acid, cyclohexane dicarboxylic acid and the like.

Dicarboxylic acids in which both sides of an optically active difunctional group mentioned in Exemplification 2 are each attached to benzoic acid group, naphthoic acid group, [1,1'-biphenyl] carboxylic acid group, hydroxybenzoic acid group, hydroxynaphthoic acid group, hydroxyphenyl acetic acid group, hydroxy cinnamic acid group or the like are also preferably used.

The method for preparing those compounds are basically the same as the method for preparing the before-mentioned monofunctional aromatic group-containing optically active carboxylic acid derivative. As the tosylate, mesylate, benzenesulfonate, bromide or iodide compound to be used in the Williamson method are bistosylate, bismesylate, benzenesulfonate, dibromide or diiodide compound which has a substituent group mentioned in Exemplification 2.

As the alcohol to be used as a raw material for alkoxide in the SNAr method, various diol compounds having a substituent group mentioned in Exemplification 2 may be used.

Hereinafter, examples of the bifunctional aromatic group-containing optically active carboxylic acid are mentioned. Compounds in which the aromatic groups attached to both sides of the substituent group mentioned in Exemplification 2 are identical, are mentioned in the following, but those having different aromatic groups are also preferably used.

In the case of benzoic acid derivative, an optically active substituent group is usually substituted at 2-, 3- or 4-position but the 4- substituted compounds are most preferably used due to easy preparation.

Examples are 4,4'-(1-methylethan-1,2-diylbisoxy) bisbenzoic acid, 4,4'-(1-methylpropan-1,3-diylbisoxy) bisbenzoic acid, 4,4'-(2-methylbutan-1,4-diylbisoxy) bisbenzoic acid, 4,4'-(2-methylpentan-1,5-diylbisoxy) bisbenzoic acid, 4,4'-(3-methylhexan-1,6-diylbisoxy) bisbenzoic acid and the like.

In the case of the phenyl acetic acid, an optically active substituent group is usually substituted at 2-, 3- or 4-position but the 4- substituted compounds are most preferably used due to easy preparation.

Examples are 4,4'-(1-methylethan-1,2-diylbisoxy) bisphenyl acetic acid, 4,4'-(1-methylpropan-1,3-diylbisoxy) bisphenyl acetic acid, 4,4'-(2-methylbutan-1,4-diylbisoxy) bisphenyl acetic acid, 4,4'-(2-methylpentan-1,5-diylbisoxy) bisphenyl acetic acid, 4,4'-(3-methylhexan-1,6-diylbisoxy) bisphenyl acetic acid and the like.

In the case of cinnamic acid derivative, an optically active substituent group is usually substituted at 2-, 3- or 4-position, but the 4- substituted compounds are most preferably used in view of easy preparation.

Examples are 4,4'-(1-methylethan-1,2-diylbisoxy) biscinnamic acid, 4,4'-(1-methylpropan-1,3-diylbisoxy) biscinnamic acid, 4,4'-(2-methylbutan-1,4-diylbisoxy) biscinnamic acid, 4,4'-(2-methylpentan-1,5-diylbisoxy) biscinnamic acid, 4,4'-(3-methylhexan-1,6-diylbisoxy) biscinnamic acid and the like.

As the naphthoic acid derivative, usually any isomers of a substituted naphthoic acid may be used. Preferably, those having a carboxylic acid group at 2-position of the naphthalene ring and the substituent group(s) at 6- or 7-position, more preferably 6-position, thereof are used.

Examples are 6,6'-(1-methylethan-1,2-diylbisoxy) bis(2-naphthoic acid), 6,6'-(1-methylpropan-1,3-diylbisoxy) bis(2-naphthoic acid), 6,6'-(2-methylbutan-1,4-diylbisoxy) bis(2-naphthoic acid), 6,6'-(2-methylpentan-1,5-diylbisoxy) bis(2-naphthoic acid), 6,6'-(3-methylhexan-1,6-diylbisoxy) bis(2-naphthoic acid) and the like.

Further, as the [1,1'-biphenyl] carboxylic acid derivative, usually any isomers of a substituted [1,1'-biphenyl] carboxylic acid may be used. Preferably, those having a carboxylic acid group at 4-positon of the [1,1'-biphenyl]group and the substituent group at 4'-position thereof are used.

Examples are 4,4'''-(1-methylethan-1,2-diylbisoxy) bis([1,1'-biphenyl]-4-carboxylic acid), 4,4'''-(1methylpropan-1,3-diylbisoxy) bis([1,1'-biphenyl]-4-carboxylic acid), 4,4'''-(2-methylbutan-1,4-diylbisoxy) bis([1,1'-biphenyl]-4-carboxylic acid), 4,4'''-(2-methylpentan-1,5-diylbisoxy) bis([1,1'-biphenyl]-4-carboxylic acid), 4,4'''-(3-methylhexan-1,6-diylbisoxy) bis([1,1'-biphenyl]-4-carboxylic acid) and the like.

Hereinbefore, the optically active carboxylic acids used in the present invention are explained.

In the case of compounds having two or more substituent groups mentioned in Exemplification I, any combination of those having different structures can be used except those exhibiting no optical activity such as meso form.

The above mentioned optically active (mono)carboxylc acids and dicarboxylic acids may be used alone or in combination thereof in the preparation of the liquid crystalline compound. Also, if necessary, mixtures with an achiral carboxylic acid or its derivative may be used.

Further, a discotic liquid crystalline compound prepared from an achiral carboxylic acid or its functional derivative alone can be mixed with a discotic liquid crystalline compound prepared from starting materials containing an optically active carboxylic acid or its functional derivative to prepare a discotic liquid crystalline material used in the present invention.

Typical examples of the achiral carboxylic acid to be used in the above are racemic or meso forms of the above mentioned optically active carboxylic acids as well as alkanoic acids or alkenoic acids having 2–30 carbon atoms such as acetic acid, propionic acid, butyric acid, isobutyric acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosane acid, 4-pentanoic acid, 3-pentanoic acid and the like.

Further, benzoic acid and its derivatives having 7–37, preferably 7–27 carbon atoms can be preferably used. When using a substituted benzoic acids, the substituent position is not specially limited, i.e. 2-, 3- and 4substituted compounds can be preferably used, but the 4substituted compounds are most preferably used in view of easy preparation. Examples are benzoic acid, 4-methyl benzoic acid, 4-ethyl benzoic acid, 4-propyl benzoic acid, 4-isopropyl benzoic acid, 4-butyl benzoic acid, 4-sec-butyl benzoic acid, 4-isobutyl benzoic acid, 4-tert-butyl benzoic acid, 4-pentyl benzoic acid, 4-hexyl benzoic acid, 4-heptyl benzoic acid, 4-octyl benzoic acid, 4-nonyl benzoic acid, 4-decyl benzoic acid, 4-undecyl benzoic acid, 4-dodecyl benzoic acid, 4-tridecyl benzoic acid, 4-tetradecyl benzoic acid, 4-chloro benzoic acid, 4-bromo benzoic acid, 4-nitro benzoic acid, 4-dimethylamino benzoic acid, 4-hydroxy benzoic acid, 4-methoxy benzoic acid, 4-ethoxy benzoic acid, 4-propoxy benzoic acid, 4-isopropoxy benzoic acid, 4-butoxy benzoic acid, 4-sec-butoxy benzoic acid, 4-isobutoxy benzoic acid, 4-tert-butoxy benzoic acid, 4-pentyloxy benzoic acid, 4-hexyloxy benzoic acid, 4-heptyloxy benzoic acid, 4-octyloxy benzoic acid, 4-nonyloxy benzoic acid, 4-decyloxy benzoic acid, 4-undecyloxy benzoic acid, 4-dodecyloxy benzoic acid, 4-tridecyloxy benzoic acid, 4-tetradecyloxy benzoic acid, 3-methyl benzoic acid, 3-methoxy benzoic acid, 3-ethoxy benzoic acid, 3-propoxy benzoic acid, 3-butoxy benzoic acid, 3-pentyloxy benzoic acid, 3-hexyloxy benzoic acid, 3-heptyloxy benzoic acid, 3-octyloxy benzoic acid, 3-nonyloxy benzoic acid, 3-decyloxy benzoic acid, 2-methyl benzoic acid, 2-methoxy benzoic acid, 2-ethoxy benzoic acid, 2-propoxy benzoic acid, 2-butoxy benzoic acid, 2-pentyloxy benzoic acid, 2-hexyloxy benzoic acid, 2-heptyloxy benzoic acid, 2-octyloxy benzoic acid, 2-nonyloxy benzoic acid, 2-decyloxy benzoic acid and the like.

Also, as the achiral carboxylic acid, naphthoic acid derivatives having 11–41, preferably 11–31 carbon atoms can be preferably used. When using a substituted naphthoic acid substituent position is not specially limited, but those having carboxylic acid group at 2- position and substituent group at 6- or 7-, preferably used in view of availability.

Examples are 2-naphthoic acid, 6-methyl-2-naphthoic acid, 6-isopropyl-2-naphthoic acid, 6-methoxy naphthoic acid, 6-ethoxy-2-naphthoic acid, 6-propoxy-2-naphthoic acid, 6-butoxy-2-naphthoic acid, 6-pentyloxy-2-naphthoic acid, 6-hexyloxy-2-naphthoic acid, 6-heptyloxy-2-naphthoic acid, 6-octyloxy-2-naphthoic acid, 6-nonyloxy-2-naphthoic acid, 6-decyloxy-2-naphthoic acid and the like.

Also, as the achiral carboxylic acid, [1,1'-biphenyl] carboxylic acid derivatives having 9–39, preferably 9–29 carbon atoms can be preferably used. When using a substituted [1,1'-biphenyl] carboxylic acid derivatives, the substituent position is not specially limited, but those having a carboxylic acid group at 4-position and a substituent group at 4'- preferably used.

Examples are [1,1'-biphenyl]-4-carboxylic acid, 4'-methyl [1,1'-biphenyl]-4-carboxylic acid, 4'-methoxy [1,1'-biphenyl]-4-carboxylic acid, 4'-ethoxy [1,1'biphenyl]-4-carboxylic acid, 4'-propoxy [1,1'-biphenyl]-4-carboxylic acid, 4'-butoxy [1,1-biphenyl]-4-carboxylic acid, 4'-pentyloxy [1,1'-biphenyl]-4-carboxylic acid, 4'-hexyloxy [1,1'-biphenyl]-4-carboxylic acid, 4'-heptyloxy [1,1'-biphenyl]-4-carboxylic acid, 4'-octyloxy [1,1'biphenyl]-4-carboxylic acid, 4'-nonyloxy [,1'-biphenyl]-4-carboxylic acid, 4'-decyloxy [1,1'-biphenyl]-4-carboxylic acid and the like.

Also, achiral bifunctional carboxylic acids can be used.

Examples are dicarboxylic acids having 2–30, preferably 2–20 carbon atoms such as oxalic acid, malonic acid, succinic acid, glutaric acid, adipic acid, pimelic acid, suberic aid, azelaic acid, sebacic acid, undecane dicarboxylic acid, dodecane dicarboxylic acid, tridecane dicarboxylic acid, tetradecane dicarboxylic acid, 1,4-cyclohexane dicarboxylic acid, phthalic acid, isopthahlic acid, terephthalic acid, 2,6-naphthalene dicarboxylic acid, 2,5-naphthalene dicarboxylic acid, 1,4-naphthalene dicarboxylic acid, 1,5-naphthalene dicarboxylic acid, [1,1'biphenyl]-4,4'-dicarboxylic acid, fumaric acid, maleic acid, stilbene-4,4'-dicarboxylic acid, [1,1'-dicyclohexane-4,4'-dicarboxylic acid, benzene-1,4-diylbis(3-propenic acid) and the like.

Also dicarboxylic acids in which two groups selected from benzoic acid group, naphthoic acid group and [1,1'-biphenyl] carboxylic acid groups are present between an organic group having 2–30, preferably 2–20 carbon atoms such as aliphatic group, alicyclic group or aromatic group can be preferably used.

When using benzoic acid derivatives, usually those having a substituent group at 2-, 3- or 4- position, but 4substituted compounds are most preferably used in view of easy preparation. When using substituted naphthoic acid, any isomers thereof can be used, but those having a carboxylic acid group at 2- position naphthalene ring and a substituent group at 6-, or 7- position, preferably 6position can be preferably used. When using substituted [1,1'-biphenyl] carboxylic acid, any isomers thereof can be used, but those having a carboxylic acid group at 4-position of [1,1'- biphenyl] and a substituent group at 4'-position thereof can be preferably used.

Examples are 4,4'-(ethan-1,2-diylbisoxy) bisbenzoic acid, 4,4'-(propan-1,3-diylbisoxy) bisbenzoic acid, 4,4'-(butan-1,4-diylbisoxy) bisbenzoic acid, 4,4'(pentan-1,5-diylbisoxy) bisbenzoic acid, 4,4'-(hexan-1,6diylbisoxy) bisbenzoic acid 4,4'-(heptan-1,7-diylbisoxy) bisbenzoic acid 4,4'-(octan-1,8-diylbisoxy) bisbenzoic acid 4,4'-(nonan-1,9-diylbisoxy) bisbenzoic acid 4,4'-(decan-1,10-diylbisoxy) bisbenzoic acid 4,4'-(undecan-1,11-diylbisoxy) bisbenzoic acid 4,4'-(dodecan-1,12-diylbisoxy) bisbenzoic acid 4,4'-(benzen-1,4-diylbisoxy) bisbenzoic acid 4,4'-(benzene-1,4-dimethyl-α,α'-diylbisoxy) bisbenzoic acid, 4,4'-(cyclohexane-1,4-dimethyl-α,α'-diylbisoxy) bisbenzoic acid, 6,6'-(ethan-1,2-diylbisoxy) bis(2-naphthoic acid), 6,6'-(propan-1,3-diylbisoxy) bis(2-naphthoic acid), 6,6'-(butan-1,4-diylbisoxy) bis(2-naphthoic acid), 6,6'-(pentan-1,5-diylbisoxy) bis(2-naphthoic acid), 6,6'-(hexan-1,6-diylbisoxy) bis(2-naphthoic acid), 6,6'-(hepan-1,7-diylbisoxy) bis(2-naphthoic acid), 6,6'-(octan-1,8-diylbisoxy) bis(2-naphthoic acid), 6,6'-(nonan-1,9-diylbisoxy) bis(2-naphthoic acid), 6,6'-(decan-1,10-diylbisoxy) bis(2-naphthoic acid), 6,6'-(undecan-1,11-diylbisoxy) bis(2-naphthoic acid), 6,6'-(dodecan-1,12-diylbisoxy) bis(2-naphthoic acid), 6,6'-(benzen-1,4-diylbisoxy) bis(2-naphthoic acid), 6,6'-(cyclohexane-1,4-dimethyl-α,α'-diylbisoxy) bis(2-naphthoic acid), 4,4'''-(ethan-1,2-diylbisoxy) bis([1,1'biphenyl]-4-carboxylic acid), 4,4'''-(propan-1,3-diylbisoxy) bis( 1,1'-biphenyl]-4-carboxylic acid), 4,4'''-(butan-1,4diylbisoxy) bis([1,1'-biphenyl]-4-carboxylic acid), 4,4'''(pentan-1,5-diylbisoxy) bis([1,1'-biphenyl]-4-carboxylic acid), 4,4'''-(hexan-1,6-diylbisoxy) bis([1,1'-biphenyl]-4-carboxylic acid) 4,4'''-(heptan-1,7-diylbisoxy) bis([1,1'biphenyl]-4-carboxylic acid), 4,4'''-(octan-1,8-diylbisoxy) bis([1,1'-biphenyl]-4-carboxylic acid), 4,4'''-(nonan-1,9-diylbisoxy) bis([1,1'-biphenyl]-4-carboxylic acid), 4,4'''-(decan-1,10-diylbisoxy) bis([1,1'-biphenyl]-4-carboxylic acid), 4,4'''-(undecan-1,11-diylbisoxy) bis([1,1'-biphenyl]-4-carboxylic acid), 4,4'''-(dodecan-1,12-diylbisoxy) bis([1,1'-biphenyl]-4-carboxylic acid), 4,4'''-(benzene-1,4-dimethyl-α,α'-diylbisoxy) bis([1, 1'-biphenyl]-4-carboxylic acid), 4,4'-(cyclohexane-1,4-dimethyl-α,α'-diylbisoxy) bis([1,1'-biphenyl]-4-carboxylic acid) and the like.

Also, compounds obtained from an α, α-dihydroxy compound such as diethylene glycol triethylene glycol or tetraethylene glycol and a hydroxy carboxylic acid, such as hydroxy-benzoic acid, hydroxy-naphthoic acid, hydroxy [1,1'-biphenyl] carboxylic acid through an ether linkage formation between two terminal hydroxy groups of the former and the hydroxy group of the later can be used.

In the case of a difunctional carboxylic acid containing the above benzoic acid group, naphthoic acid group and/or [1,1'-biphenyl] carboxylic acid group, different groups-containing compounds, for example, those having benzoic acid group at one side and naphthoic acid group at another side can be used.

In the case where the substituent site of a compound capabale of being a discogen has a carboxylic acid group, an ester bonding can be formed between the carboxylic acid group and an alcohol having a substituent group mentioned in Exemplification 1. Any conventional method such as ester exchange method, acid halide method, acid anhydride method or a method using dicyclohexyl carbodiimide can be used for this reaction. In this case, the following compounds can be used as a compound capable of being a discogen: triphenylene-2,3,6,7,10,11-hexacarboxylic acid, dibenzo[fg, op]naphthacene-2,5,6,8,9,12,13-octacarboxylic acid, benzene-1,3,5-tricarboxylic acid, toluxene-2,3,7,8,12,13-hexacarboxylic acid, trioxatoluxene-2,3,7,8,12,13-hexacarboxylic acid, anthraquinone-1,2,3,5,6,7-hexacarboxylic acid, 4-(2,6-bis(4-hydroxycarbonylphenyl)-4 H-pyran-4-ylidene)-2,6-bis(4-hydroxycarbonylphenyl)-4 H-pyran, pyran-1,3,6,8-tetracarboxylic acid, (benzene-1,3, 5-tricarboxy)-6,6',6"-tris(naphthalene-2-carboxylic acid, (benzene-1,3,5-tricarboxy)-4,4',4"-tribenzoic acid and the like. Among them, preferred are triphenylene-2,3,6,7,10,11-hexacarboxylic acid, dibenzo[fg, op]naphthacene-1,2,5,6,8, 9,12,13-octacarboxylic acid, benzene-1,3,5-tricarboxylic acid, toluxene-2,3,7,8,12,13-hexacarboxylic acid.

Optically active alcohols for forming an ester bonding with the carboxylic acid-containing compound capable of being a discogen and those having 3–30, preferably 3–20 carbon atoms. Concretely one or more optically active alcohols having a substituent group mentioned in Exemplification 1 can be used. They can be used as a mixture with an achiral alcohol.

Achiral alcohols employable in this case are those having 1–30, preferably 1–20 carbon atoms such as aliphatic and alicyclic alcohols.

Examples are methanol, ethanol, propanol, isopropanol, butanol, isobutanol, pentanol, hexanol, heptanol, octanol, nonanol, decanol, undecanol, dodecanol, tridecanol, tetradecanol, stearyl alcohol, cyclohexanol and the like.

Hereinabove, detailed descriptions have been given about the alkylation of hydroxyl or mercapto groups of compounds capable of being discogens, esterification of such hydroxyl or mercapto groups, as well as esterification of carboxyl groups of the said compounds. Particularly, in the case of compounds capable of being discogens and having hydroxyl or mercapto groups, there may be adopted a manufacturing method wherein part of such groups are alkylated and the rest are esterified.

Each discotic liquid crystalline compound thus prepared and having optically active substituent groups is employable as the discotic liquid crystalline material used in the invention as it is or after mixing with an achiral discotic liquid crystalline compound if necessary. In this case the concentration of the optically active substituents is determined according to the size of twist required, but using optically active groups for all of the substituent groups requires the use of the expensive material in a large quantity. Usually, in the case of using an optically active discotic liquid crystalline compound alone as the discotic liquid crystalline material, the proportion of optically active substituent groups relative to all the substituent groups is usually in the range of 0.001 to 100 mol%, preferably 0.01 to 50 mol%, more preferably 0.1 to 30 mol%. For example, in the case where a composition of a discotic liquid crystalline compound wherein all the substituent groups are optically active and a discotic liquid crystalline compound wherein all the substituent groups are achiral is used as the discotic liquid crystalline material, the proportion of the substituent groups in the optically active discotic liquid crystalline compound is usually in the range of 0.001 to 100 mol%, preferably 0.01 to 50 mol%, more preferably 0.1 to 30 mol%, relative to the total of the substituent groups in the optically active discotic liquid crystalline compound and the substituent groups of the achiral discotic liquid crystalline compound. Therefore, also in the case of using as the material in question a plurality of optically active discotic liquid crystalline compounds or a mixture of plural optically active discotic liquid crystalline compounds and plural achiral discotic liquid crystalline compounds, this can be done by mixing so that the proportion of optically active substituents falls under the above range. The mixture can be prepared by a suitable mixing method such as, for example, solid mixing, solution mixing, or melt mixing, while making adajustment so that the proportion of optically active substituents falls under the aforesaid range.

In preparing discotic liquid crystalline compounds used in the invention it is not necessary at all to make such an advanced selectivity control as introducing a specific substituent group into a specific substituent site of a compound capable of being a single certain discogen. Therefore, a compound capable of being a discogen and a plurality of different compounds capable of being substituents may be reacted simultaneously in a single reactor to afford a discotic liquid crystalline compound having a plurality of different substituent groups, which may be used in the present invention. Also employable suitably is a discotic liquid crystalline compound prepared by mixing plural compounds capable of being discogens with plural optically active compounds capable of being substituents and plural such compounds which are aciral. In this case, the compound obtained is in the form of a mixture of compounds having a distribution of various substituent groups. In the present invention, however, the occurrence of a liquid crystal phase to crystal phase transition is not desirable, so for example in the sence of reducing the symmetry of molecules it is a preferred mode to use such various compounds capable of being substituents. Further, discotic liquid crystalline compounds of different substituent compositions may be used as a mixture.

It is desirable that the discotic liquid crystalline material comprising a discotic liqud crystalline compound described above be constituted substantially by only an optically active discotic liquid crystalline compound and/or an achiral discotic liquid crystalline compound.

The following are concrete structures of discotic liquid crystalline compounds each constituting the discotic liquid crystalline material described above:

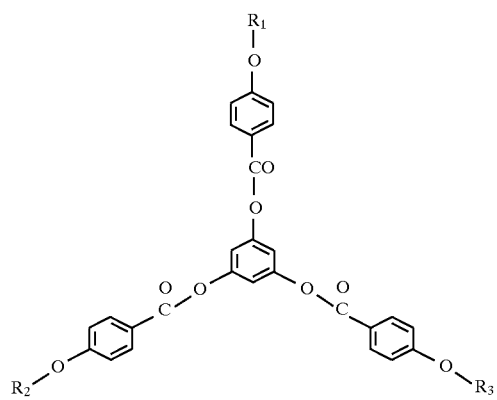

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, and n is an integer of 1–18, preferably 3–14.

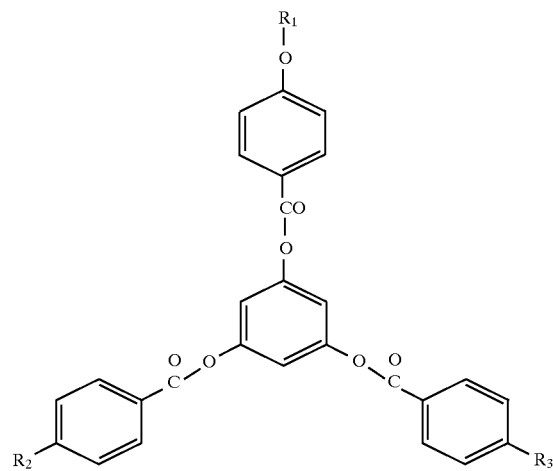

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, and n is an integer of 1–18, preferably 3–14.

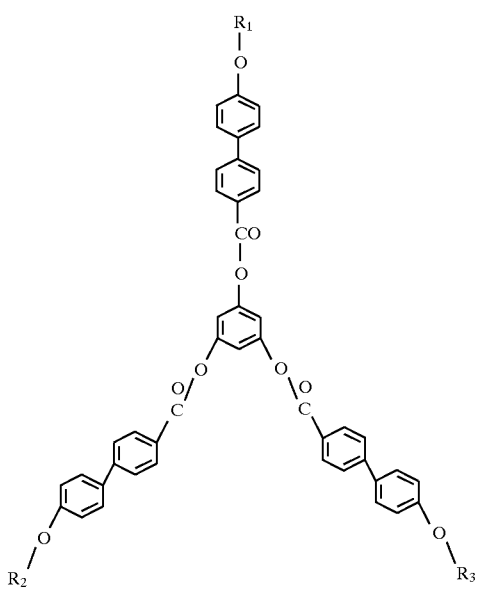

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, and n is an integer of 1–18, preferably 3–14.

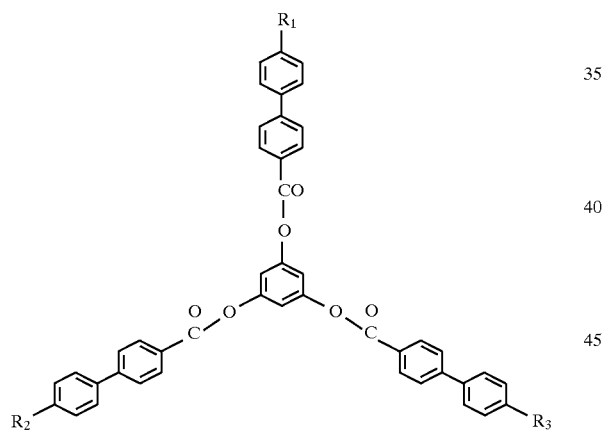

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, n is an integer of 1–18, preferably 3–14.

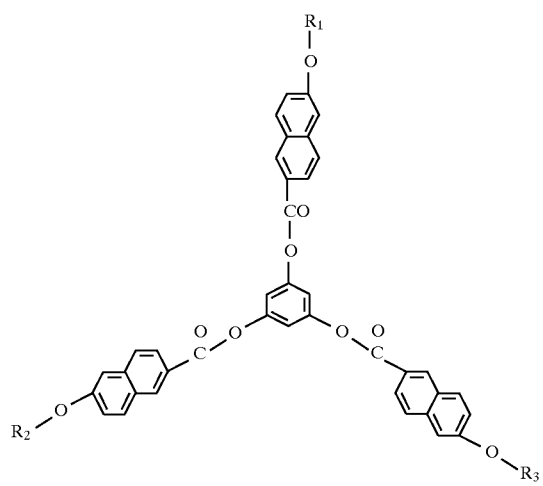

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, and n is an integer of 1–18, preferably 3–14.

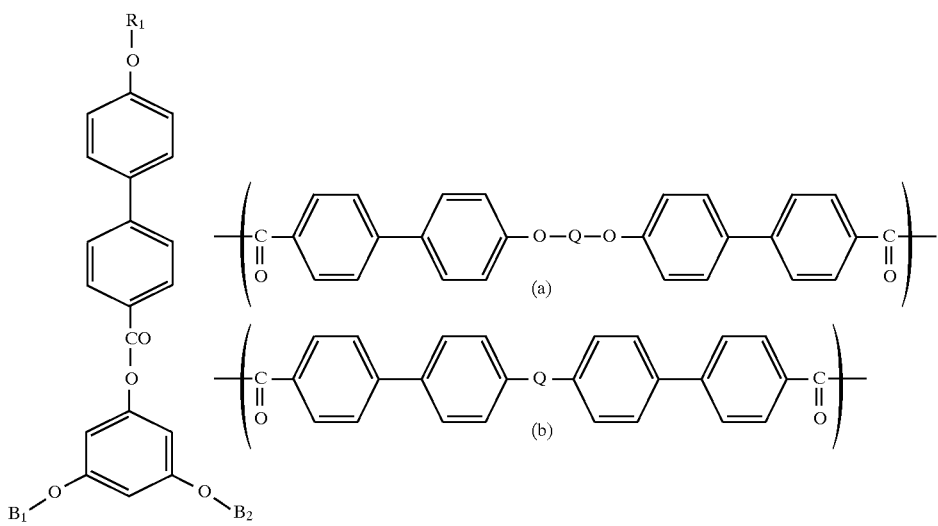

wherein $R_1$ is a linear or branched alkyl group having the formula $C_nH_{2n+1}$ or a substituent group selected from the substituent groups mentioned in Examplification 1, $B_1$ and/or $B_2$ is at least one bonding selected form (a) and (b), Q is a linear or branched alkyl group having the formula $C_nH_{2n+1}$ or a substituent group selected from the substituent groups mentioned in Examplification 2, in the case of a discotic liquid crystalline compound, $R_1$ has a substituent group mentioned in Examplification 1 or at least one of $B_1$ and $B_2$ has an optically active substituent group mentioned in Examplification 2, n is an integer of 1–18, preferably 3–14 m is an integer of 2–16, preferably 4–12 and the average molecular weight is in the range of 3,000 to 10,000.

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, and n is an integer of 1–18, preferably 3–14.

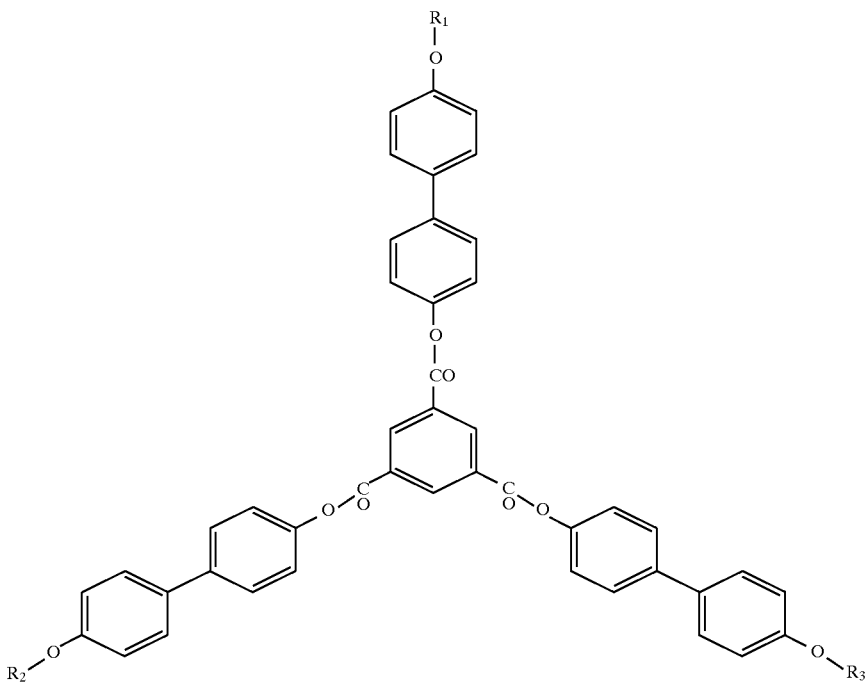

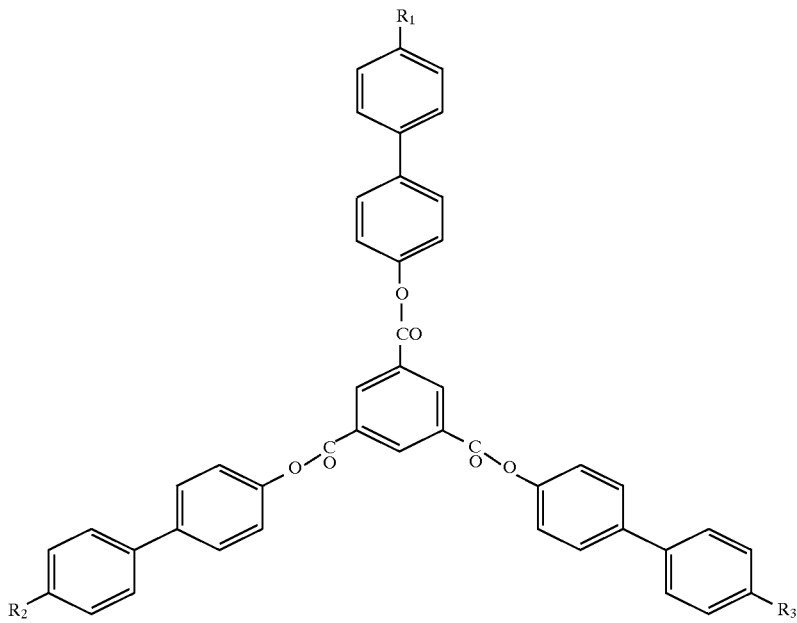

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, and n is an integer of 1–18, preferably 3–14.

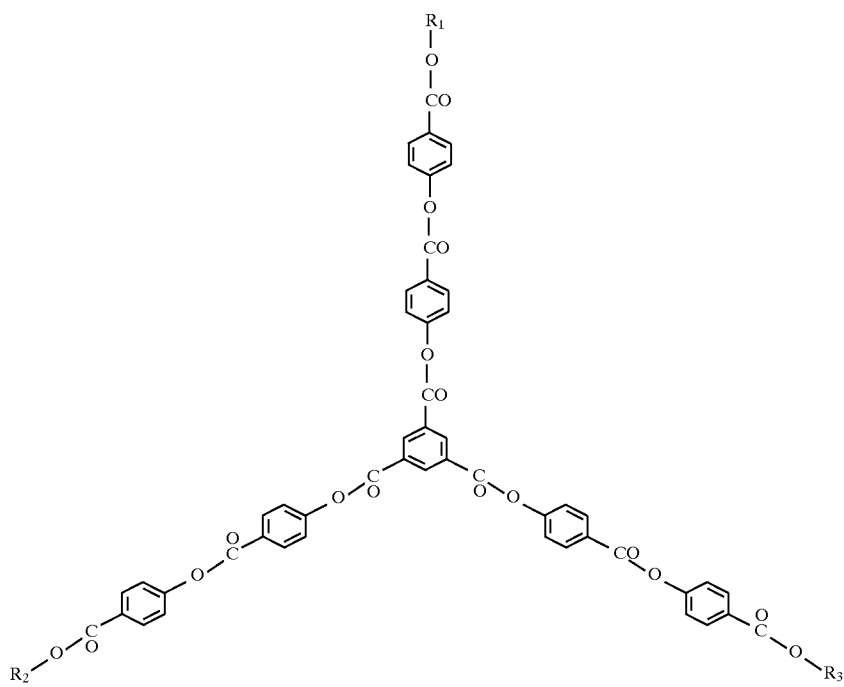

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, and n is an integer of 1–18, preferably 3–14.

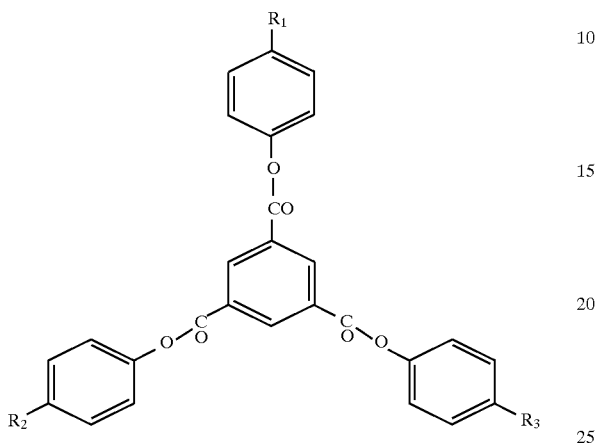

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystalline compound, at least one of $R_1$, $R_2$ and $R_3$ is an optically active substituent mentioned in Examplification 1, and n is an integer of 1–18, preferably 3–14.

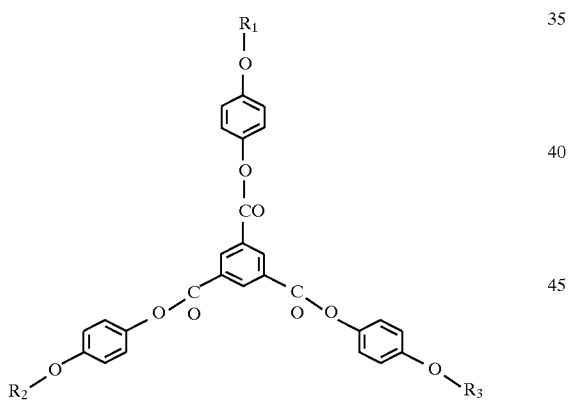

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystalline compound, at least one of $R_1$, $R_2$ and $R_3$ is an optically active substituent mentioned in Examplification 1, and n is an integer of 1–18, preferably 3–14.

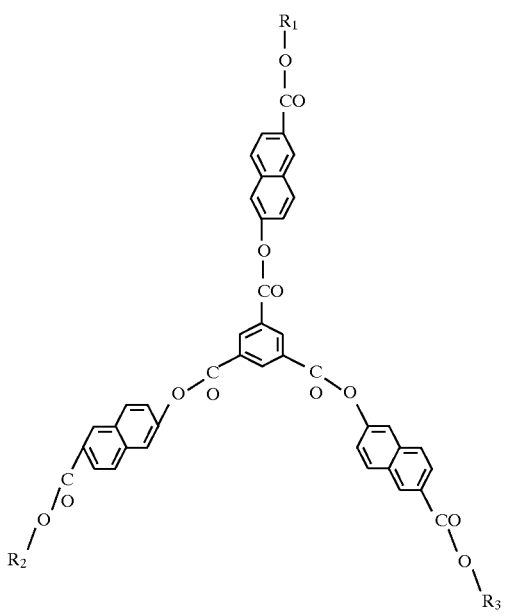

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, and n is an integer of 1–18, preferably 3–14.

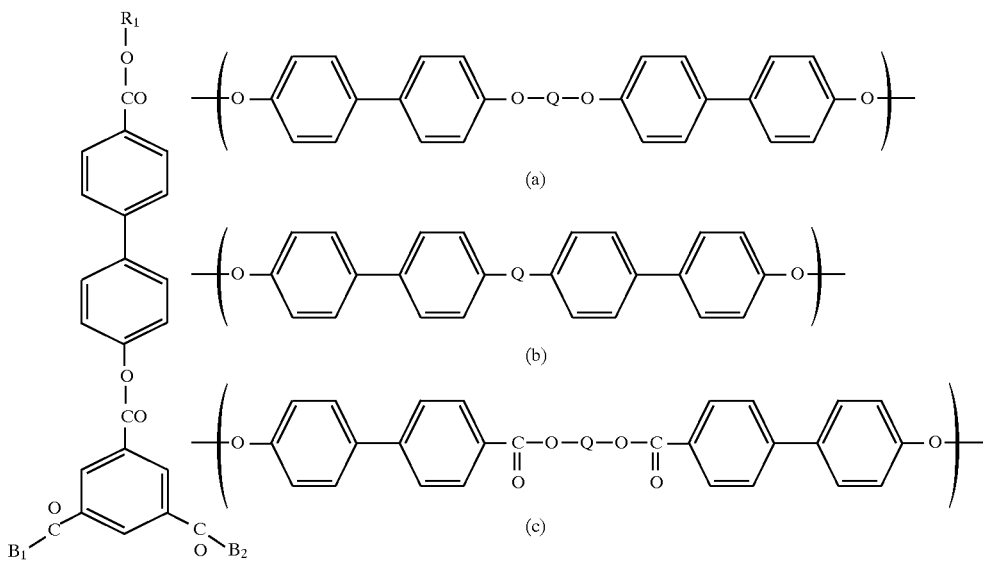

wherein $R_1$ is a linear or branched alkyl group having the formula $C_nH_{2n+1}$ or a substituent group selected from the substituent groups mentioned in Examplification 1, $B_1$ and/or $B_2$ is at least one bonding selected form (a) and (b), Q is a linear or branched alkyl group having the formula $C_nH_{2n+1}$ or a substituent group selected from the substituent groups mentioned in Examplification 2, in the case of a discotic liquid crystallline compound, $R_1$ has a substituent group mentioned in Examplification 1 or at least one of $B_1$ and $B_2$ has an optically active substituent group mentioned in Exemplification 2, n is an integer of 1–18, preferably 3–14, m is an integer of 2–16, preferably 4–12 and the average molecular weight is in the range of 3,000 to 10,000.

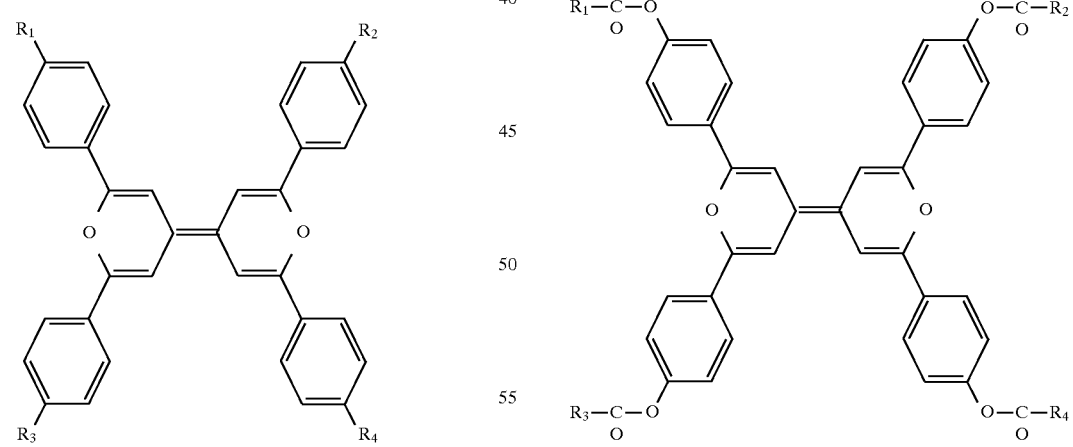

wherein $R_1$, $R_2$, $R_3$ and $R_4$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$ and $R_4$ is an optically active substituent mentioned in Examplification 1, and n is an integer of 1–18, preferably 3–14.

wherein $R_1$, $R_2$, $R_3$ and $R_4$ are independently a linear or branched alkyl group having the formula $C_nH_{2n+1}$ or a substituent group selected from the substituent groups mentioned in Examplication 1, in the case of a discotic liquid crystallline compound, at least one of $R_1$, $R_2R_3$ and $R_4$ is an optically active substituent mentioned in Examplification 1, and n is an integer of 1–18, preferably 3–14.

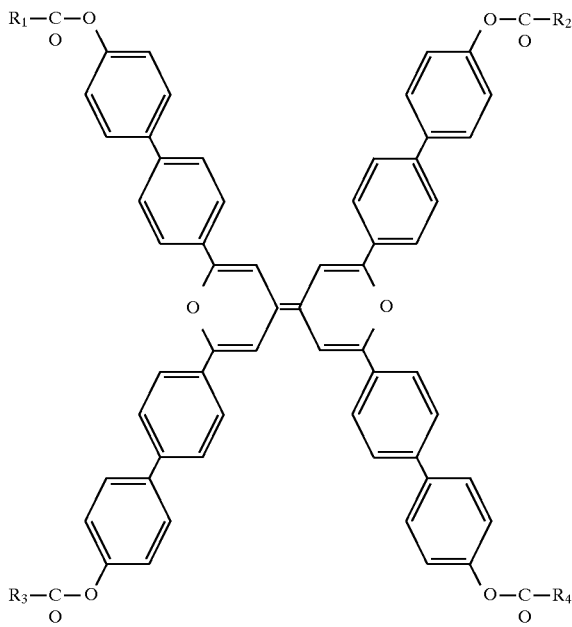

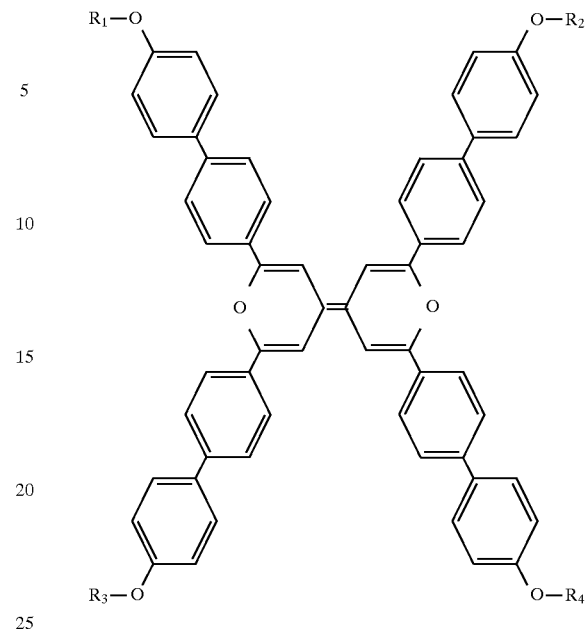

wherein $R_1$, $R_2$, $R_3$ and $R_4$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$ and $R_4$ is an optically active substituent mentioned in Examplification 1, and n is an integer of 1–18, preferably 3–14.

wherein $R_1$, $R_2$, $R_3$ and $R_4$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$ and $R_4$ is an optically active substituent mentioned in Examplification 1, and n is an integer of 1–18, preferably 3–14.

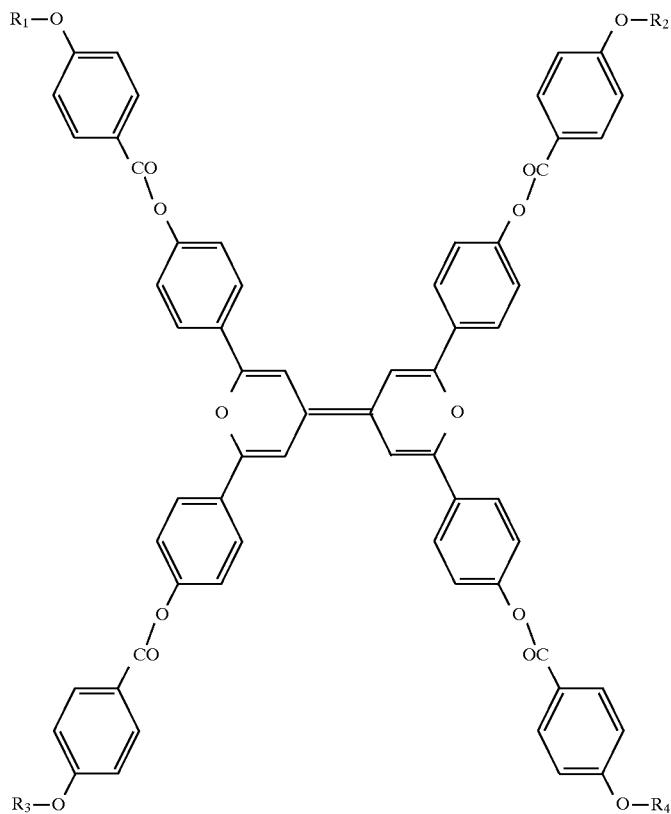

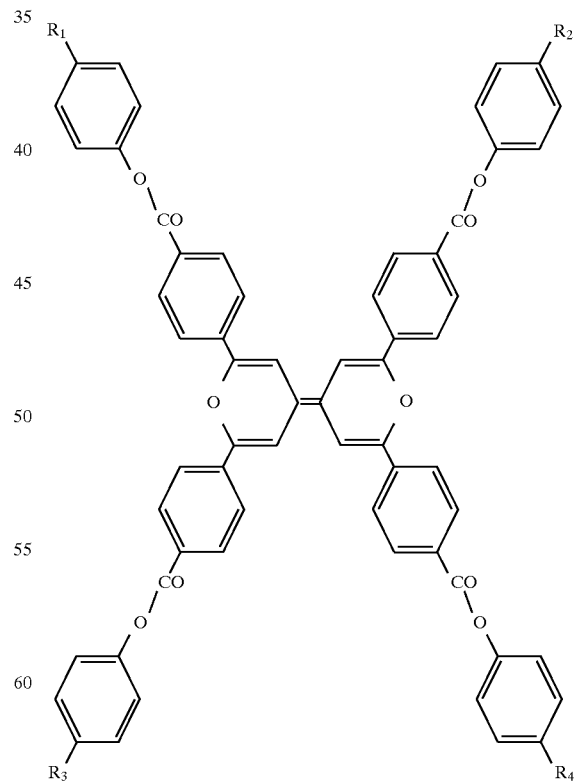

wherein $R_1$, $R_2$, $R_3$ and $R_4$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$ and $R_4$ is an optically active substituent mentioned in Examplification 1, and n is an integer of 1–18, preferably 3–14.

wherein $R_1$, $R_2$, $R_3$ and $R_4$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$ and $R_4$ is an optically active substituent mentioned in Examplification 1, and n is an integer of 1–18, preferably 3–14.

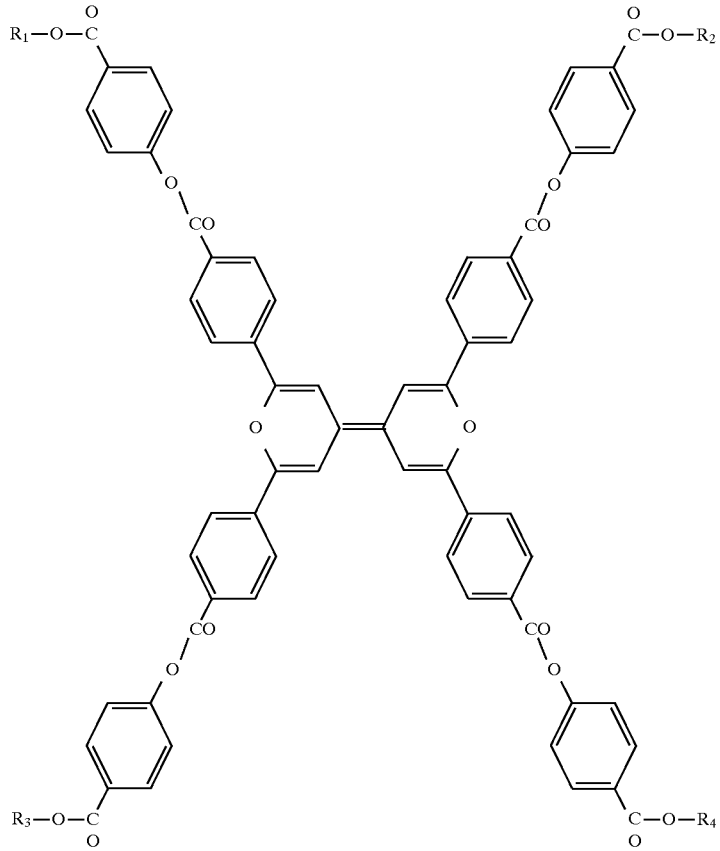

wherein $R_1$, $R_2$, $R_3$ and $R_4$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$ and $R_4$ is an optically active substituent mentioned in Examplification 1, and n is an integer of 1–18, preferably 3–14.

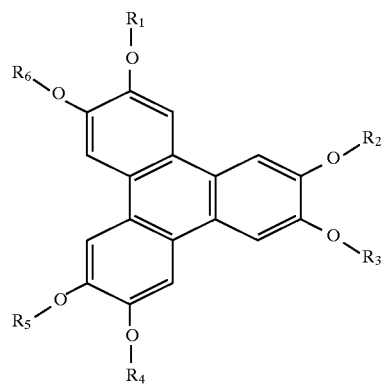

wherein $R_1$, $R_2$, $R_3$, and $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

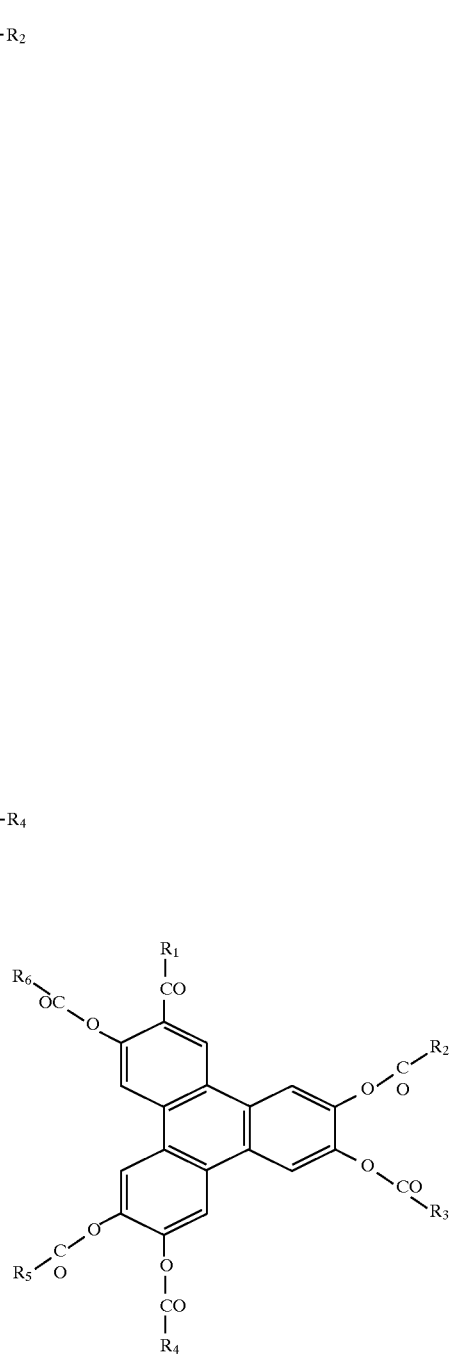

wherein $R_1$, $R_2$, $R_3$, and $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

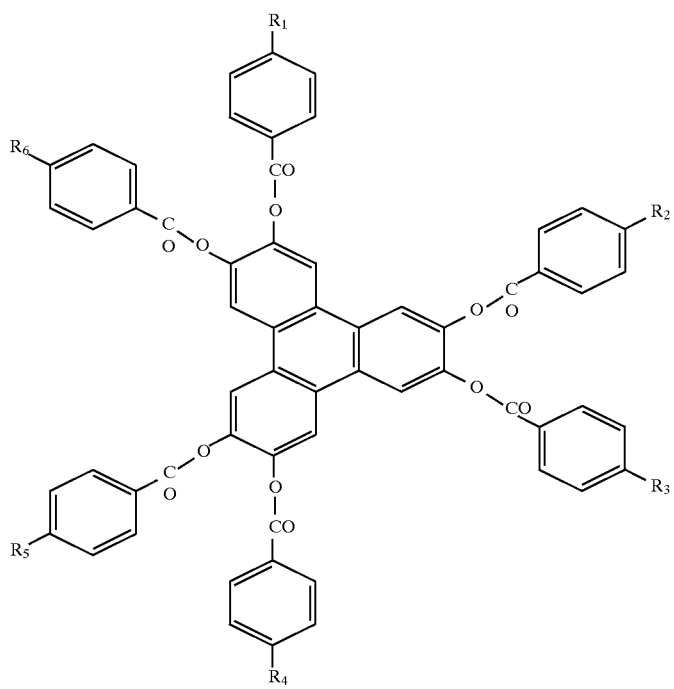

wherein $R_1$, $R_2$, $R_3$, and $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

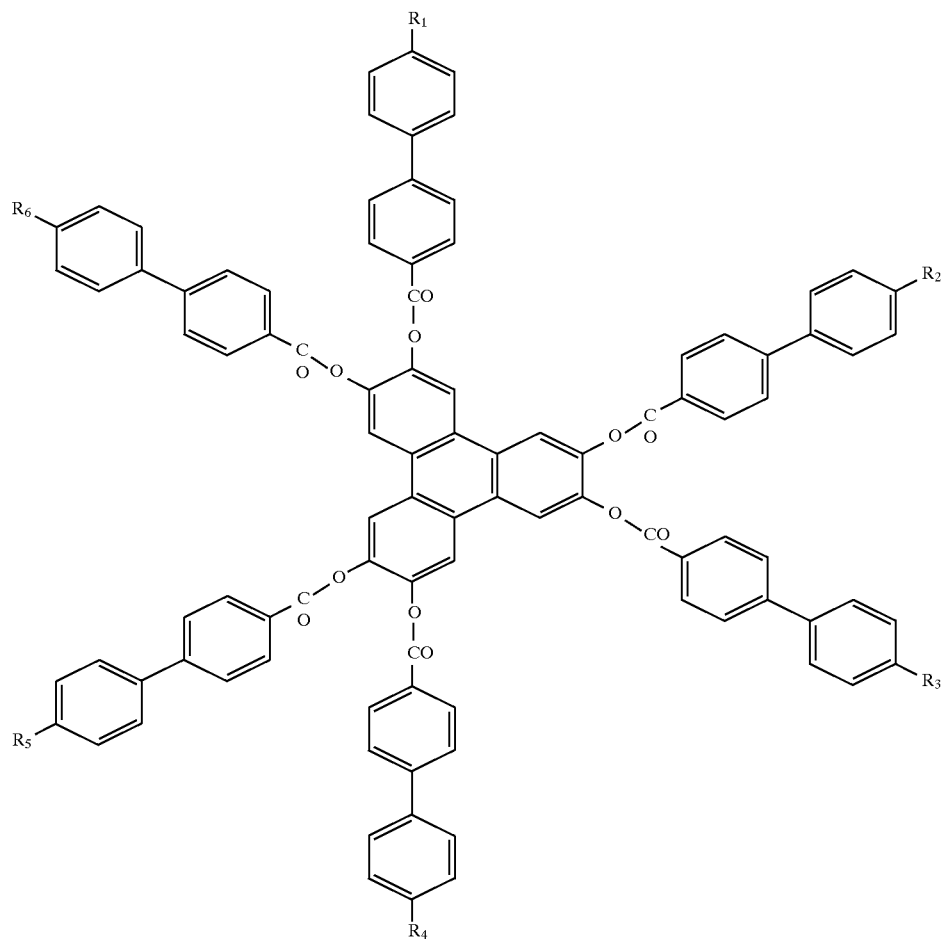

wherein $R_1$, $R_2$, $R_3$, and $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

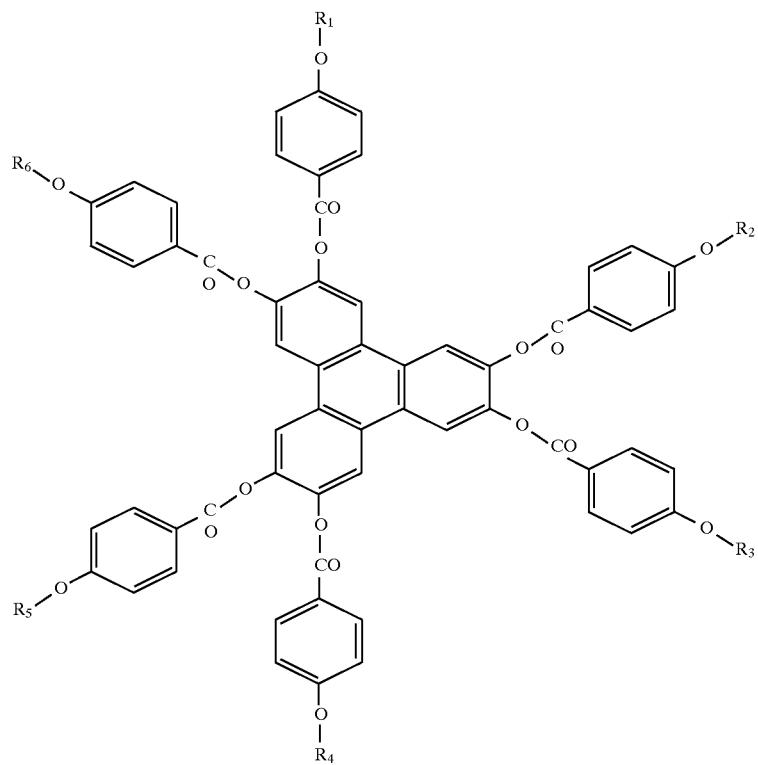

wherein $R_1$, $R_2$, $R_3$, and $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

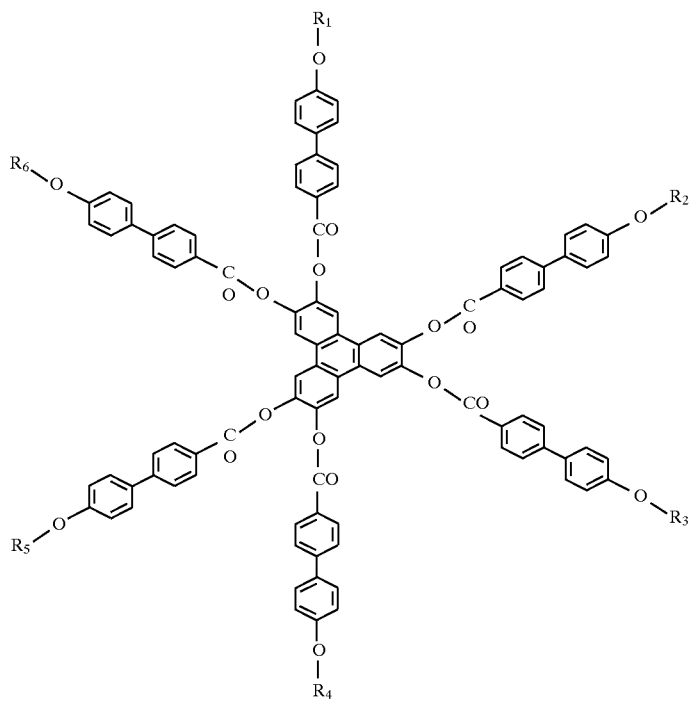

wherein $R_1$, $R_2$, $R_3$, and $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

wherein $R_1$, $R_2$, $R_3$, and $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

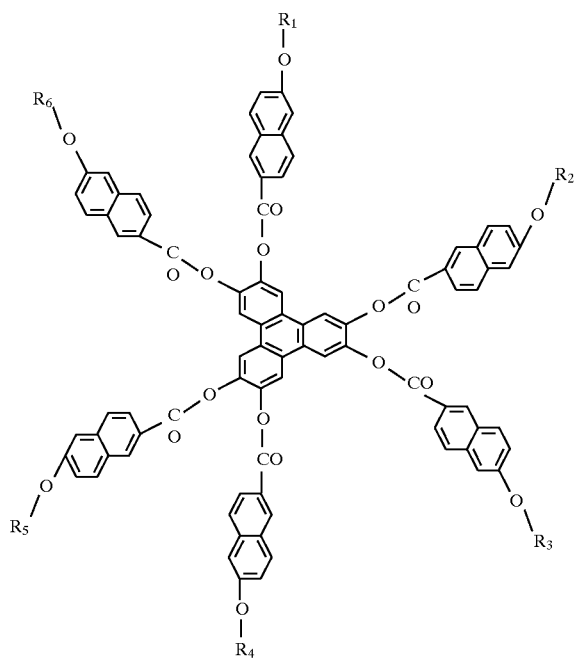

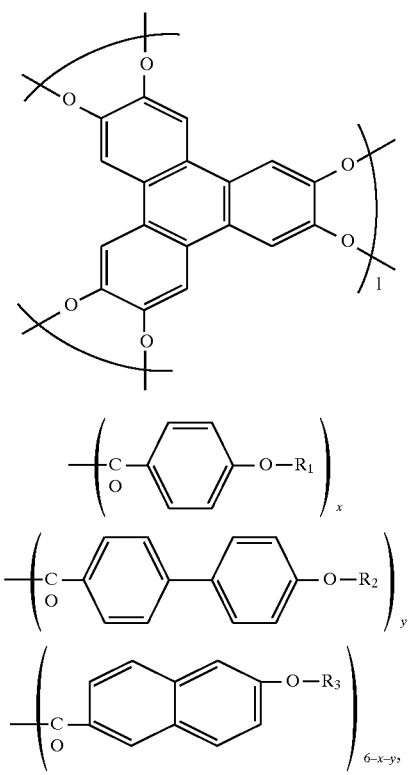

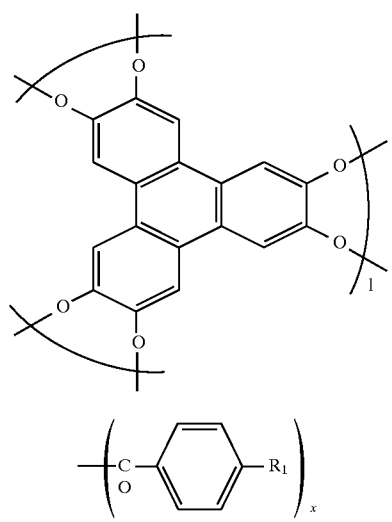

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, n is an integer of 1–18, preferably 3–14 and the numerals outside the parentheses mean molar composition ratio where X and Y are $0 \leq X \leq 6$, $0 \leq Y \leq 6$, $X+Y \leq 6$.

Composition represented by:

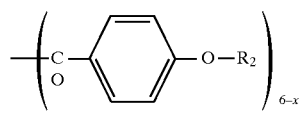

wherein $R_1$ and $R_2$ are independently a linear or branched alkyl group having the formula $C_nH_{2n+1}$ or a substituent group selected from the substituent groups mentioned in Examplification 1, in the case of a discotic liquid crystallline compound, at least one of $R_1$ and $R_2$ is an optically active substituent mentioned in Examplification 1, n is an integer of 1–18, preferably 3–14 and the numerals outside the parentheses means molar composition ratio where X is $0 \leq X \leq 6$.

Composition represented by:

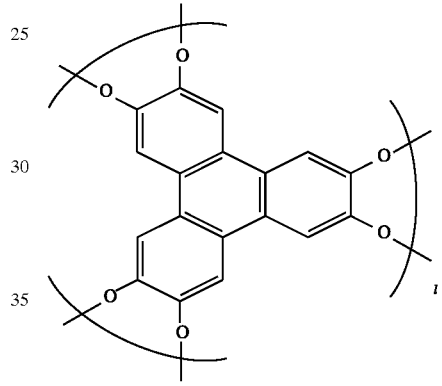

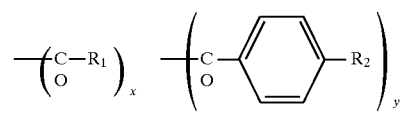

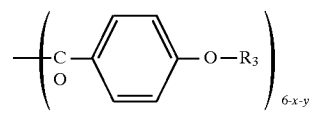

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystalline compound, at least one of $R_1$, $R_2$ and $R_3$ is an optically active substituent mentioned in Examplification 1, n is an integer of 1–18, preferably 3–14 and the numerals outside the parentheses mean molar composition ratio where X and Y are $0 \leq X \leq 6$, $0 \leq Y \leq 6$, $X+Y \leq 6$.

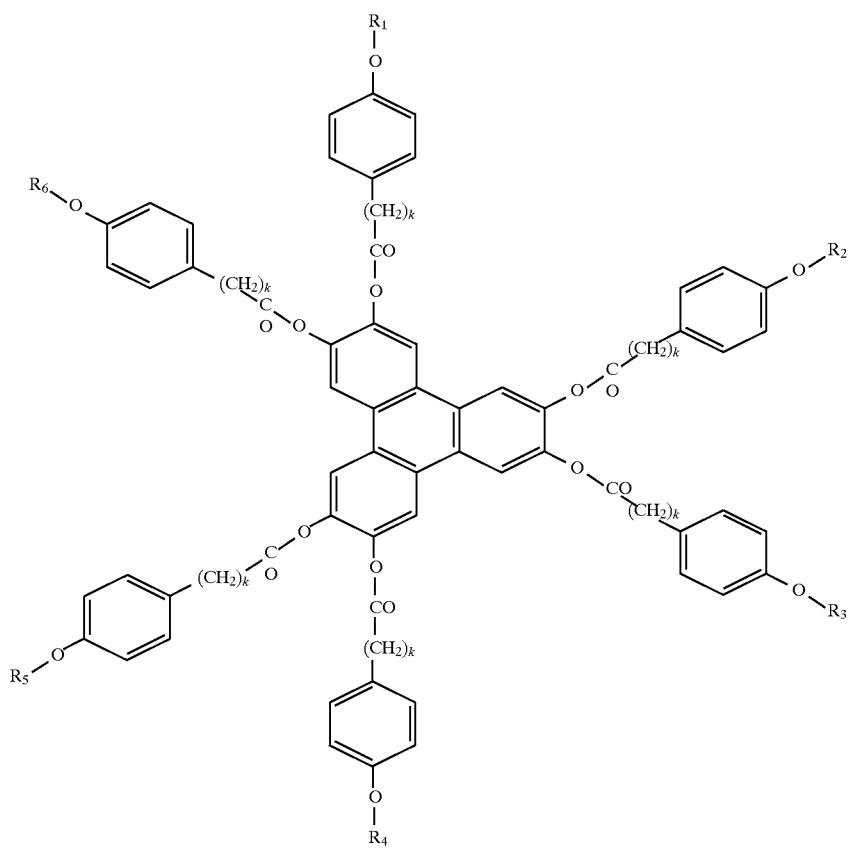

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, n is an integer of 1–18, preferably 3–14, and k is 1, 2 or 3.

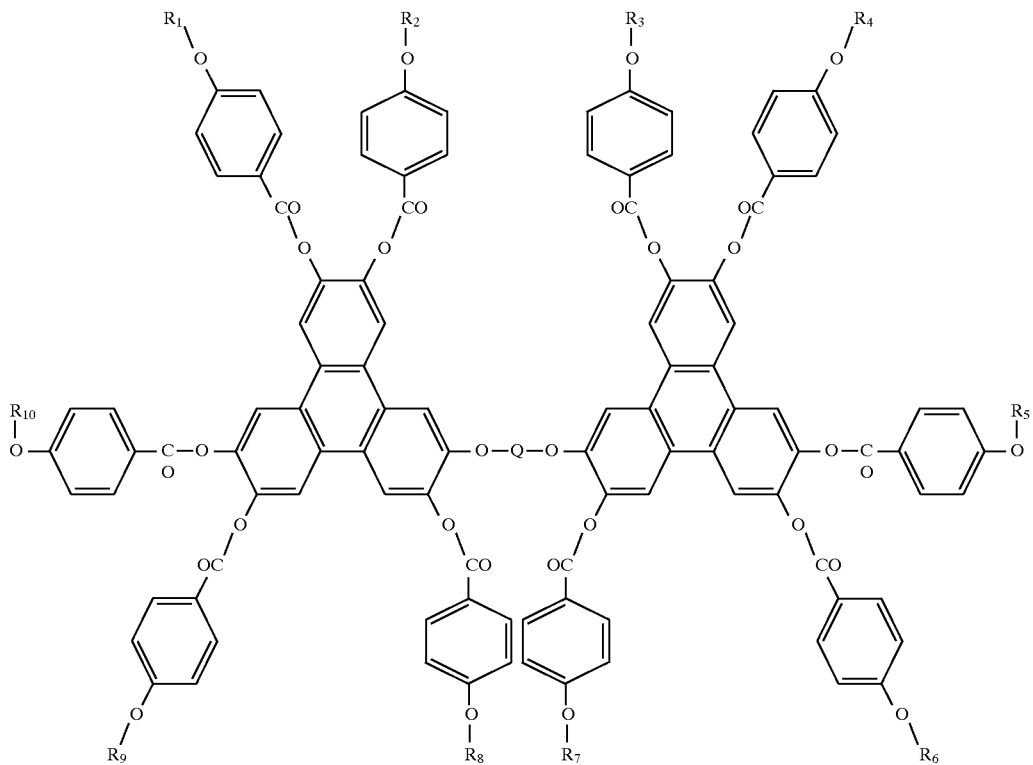

wherein $R_1$, $R_2$, $R_3$, $R_4$, $R_5$, $R_6$, $R_7$, $R_8$, $R_9$ and $R_{10}$ are independently a linear or branched alkyl group having the formula $C_nH_{2n+1}$ or a substituent group selected from the substituent groups mentioned in Examplification 1, Q is a substituent group selected from the substituent groups having the following formulae:

Q:

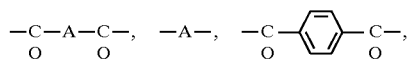
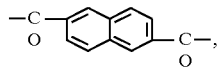
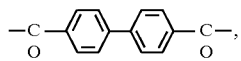
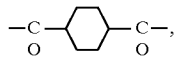
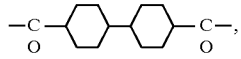
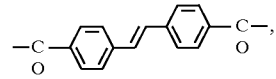
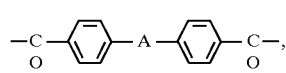

-continued

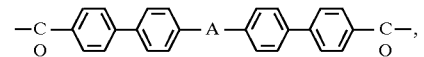
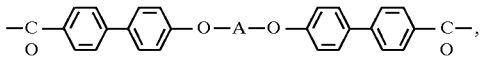
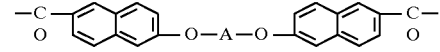
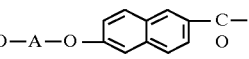

wherein A is a linear or branched alkylene group having the formula $C_mH_{2m}$ or selected from the substituent groups mentioned in Examplification 2, m is an integer of 2–16, preferably 4–12, in the case of a discotic liquid crystallline polymer, at least one of $R_1$, $R_2$, $R_3$, $R_4$, $R_5$, $R_6$, $R_7$, $R_8$, $R_9$ and $R_{10}$ has an optically active substituent group or Q has at least one optically active substituent group selected from Examplification 2 at A in the above formulae, n is an integer of 1–18, preferably 3–14, and the average of 3,000 to 10,000.

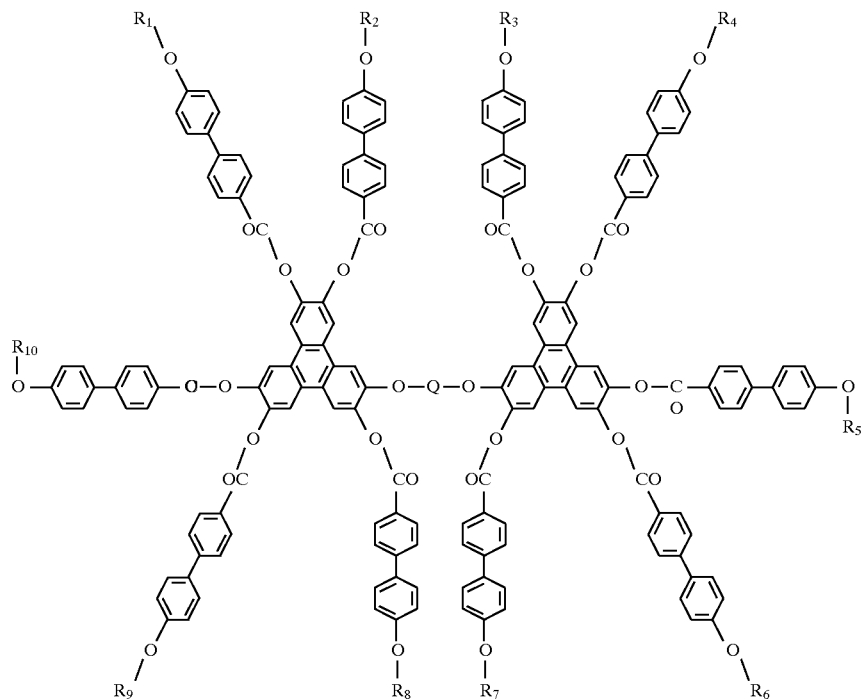

wherein $R_1$, $R_2$, $R_3$, $R_4$, $R_5$, $R_6$, $R_7$, $R_8$, $R_9$ and $R_{10}$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$, $R_8$, $R_9$ and $R_{10}$ has an optically active substituent group or Q has at least one optically active substituent group selected from Examplification 2 at A in the above formulae, n is an integer of 1–18, preferably 3–14, and the average of 3,000 to 10,000.

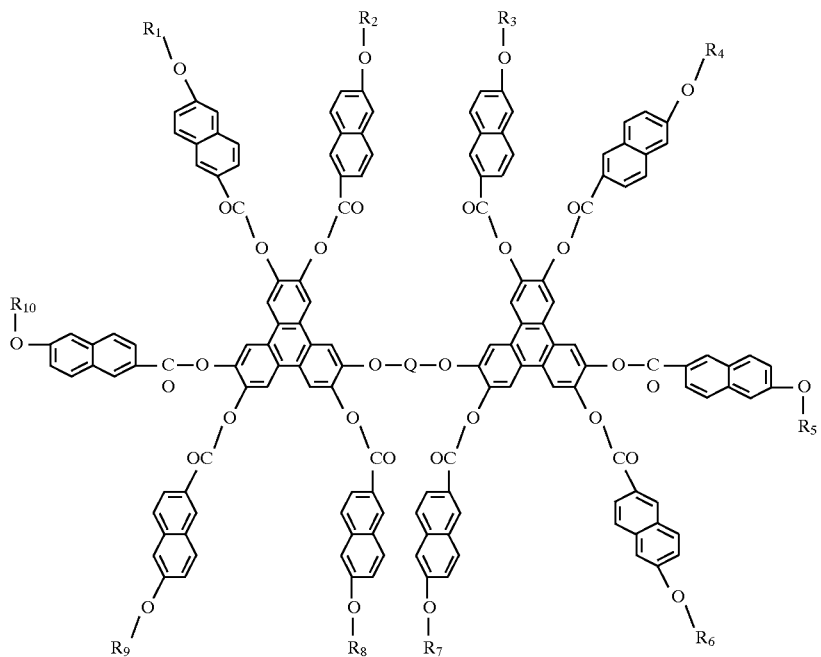

wherein $R_1$, $R_2$, $R_3$, $R_4$, $R_5$, $R_6$, $R_7$, $R_8$, $R_9$ and $R_{10}$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$, $R_8$, $R_9$ and $R_{10}$ has an optically active substituent group or Q has at least one optically active substituent group selected from Examplification 2 at A in the above formulae, n is an integer of 1–18, preferably 3–14, and the average of 3,000 to 10,000.

Composition represented by:

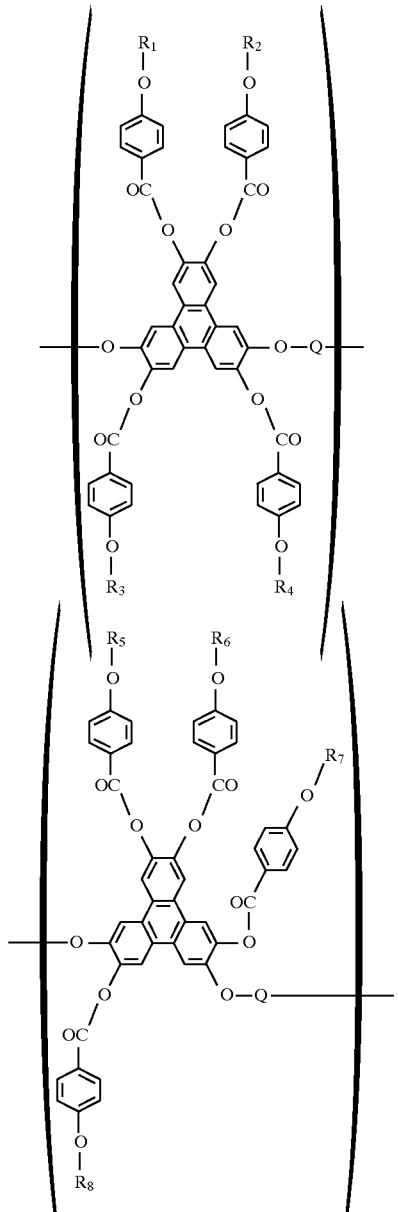

wherein $R_1$, $R_2$, $R_3$, $R_4$, $R_5$, $R_6$, $R_7$ and $R_8$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$ and $R_8$ has an optically active substituent group or Q has at least one optically active substituent group selected from Examplification 2 at A in the above formulae, n is an integer of 1–18, preferably 3–14, and the average of 5,000 to 10,000.

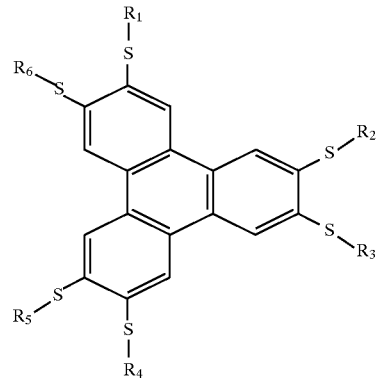

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

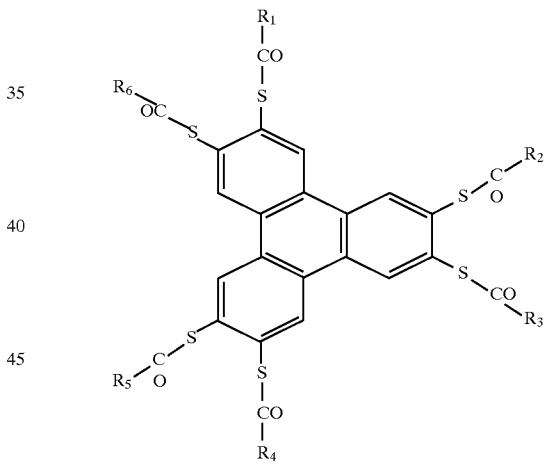

wherein $R_1$, $R_2$, $R_3$, $R_4$, $R_5$ and $R_6$, are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

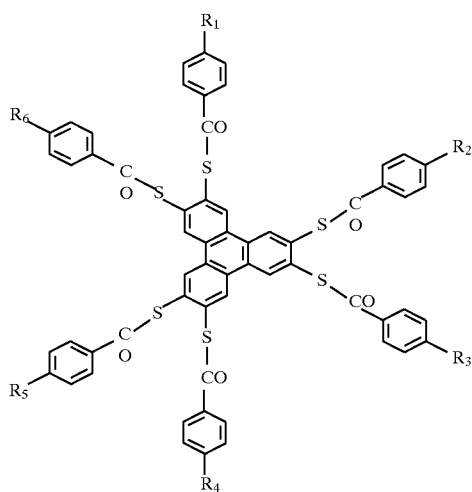

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

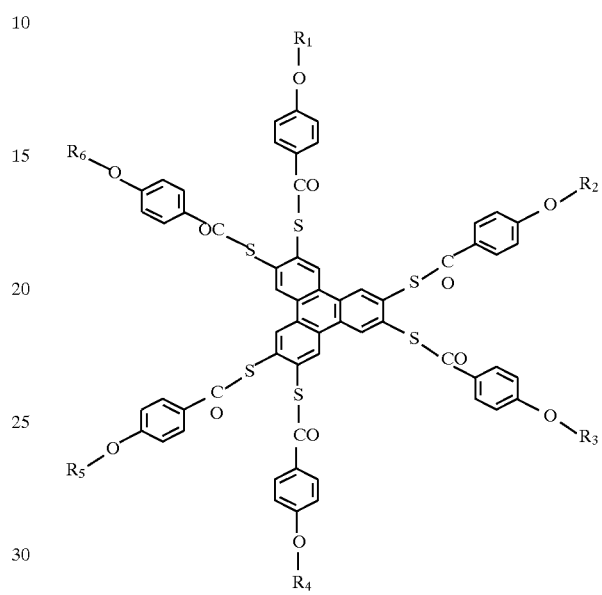

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

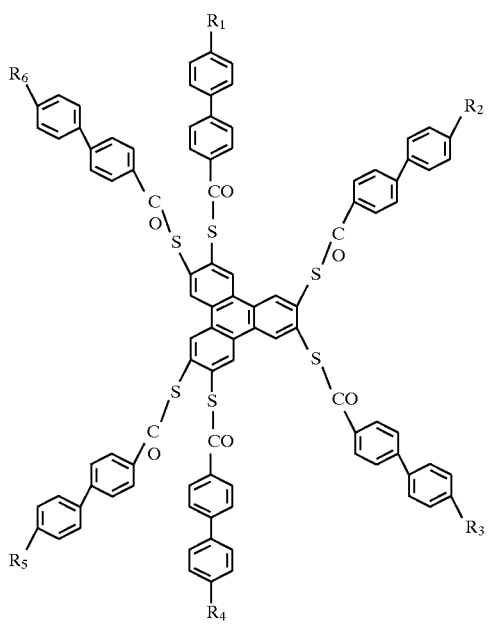

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

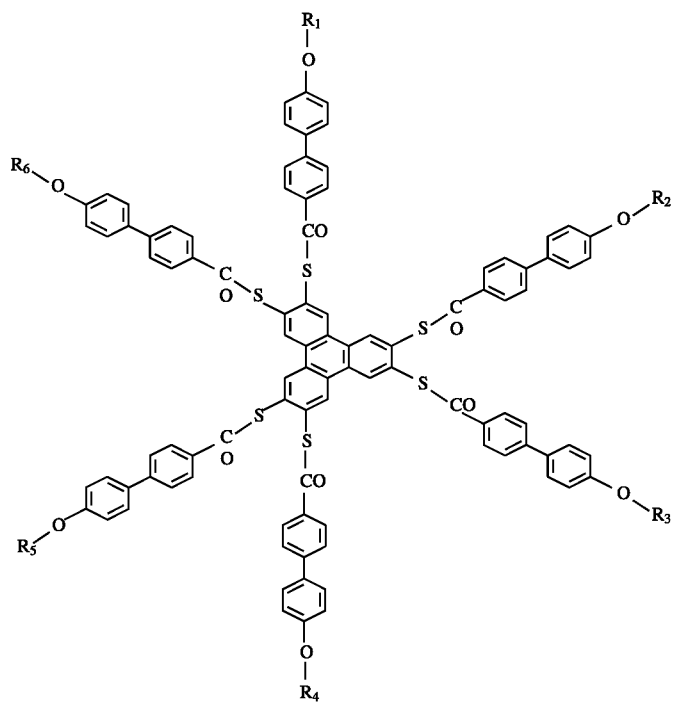

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

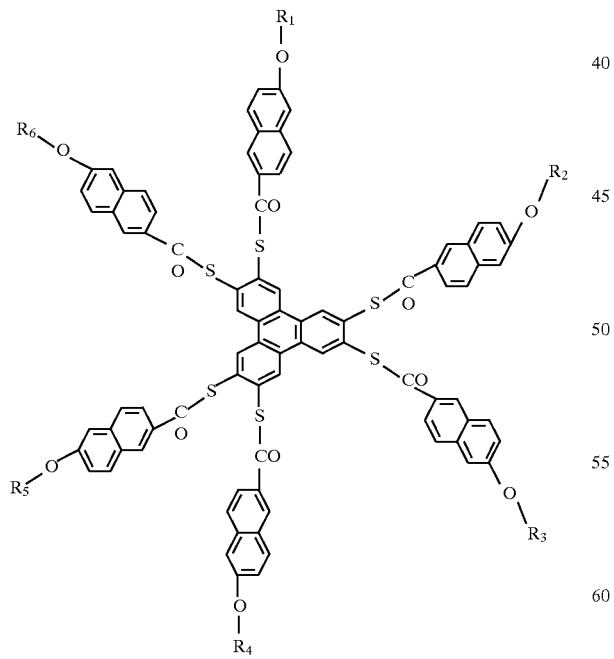

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

Composition represented by:

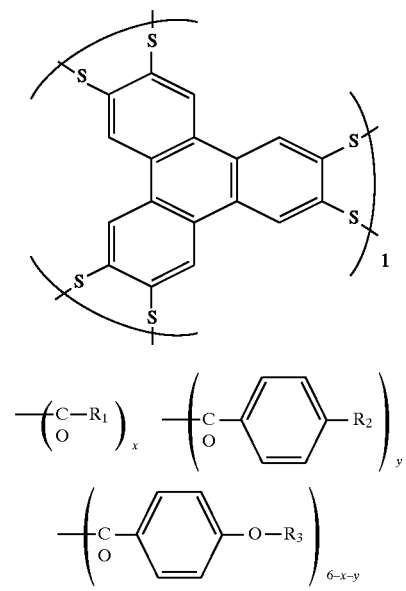

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, n is an integer of 1–18, preferably 3–14 and the numerals outside the parentheses mean molar composition ratio where X and Y are $0 \leq X \leq 6$, $0 \leq Y 6$, $X+Y \leq 6$.

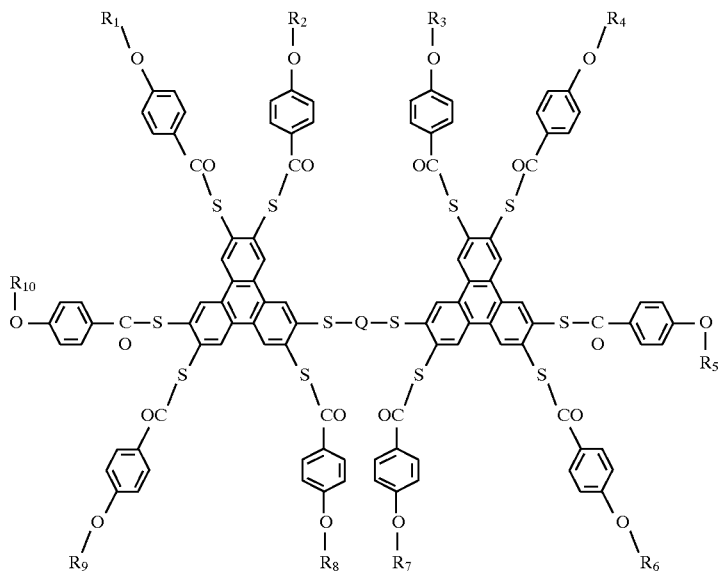

wherein $R_1$, $R_2$, $R_3$, $R_4$, $R_5$, $R_6$, $R_7$, $R_8$, $R_9$ and $R_{10}$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$, $R_8$, $R_9$ and $R_{10}$ has an optically active substituent group or Q has at least one optically active substituent group selected from Examplification 2 at A in the above formulae, n is an integer of 1–18, preferably 3–14, and the average of 3,000 to 10,000.

Composition represented by:

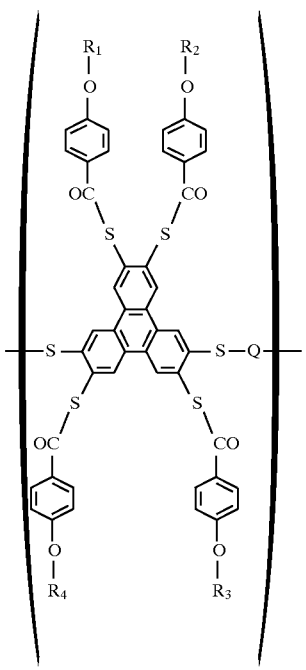

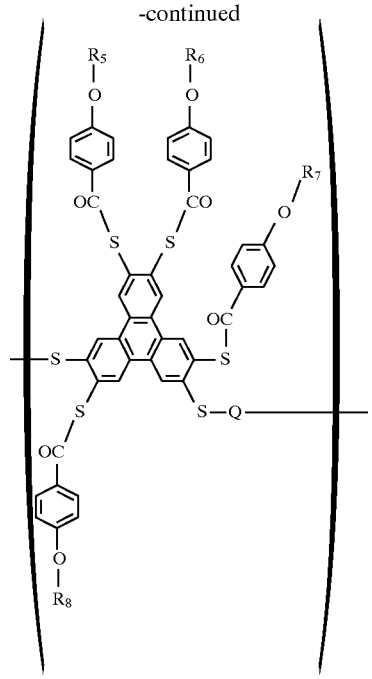

wherein $R_1$, $R_2$, $R_3$, $R_4$, $R_5$, $R_6$, $R_7$ and $R_8$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$ and $R_8$ has an optically active substituent group or Q has at least one optically active substituent group selected from Examplification 2 at A in the above formulae, n is an integer of 1–18, preferably 3–14, and the average of 5,000 to 10,000.

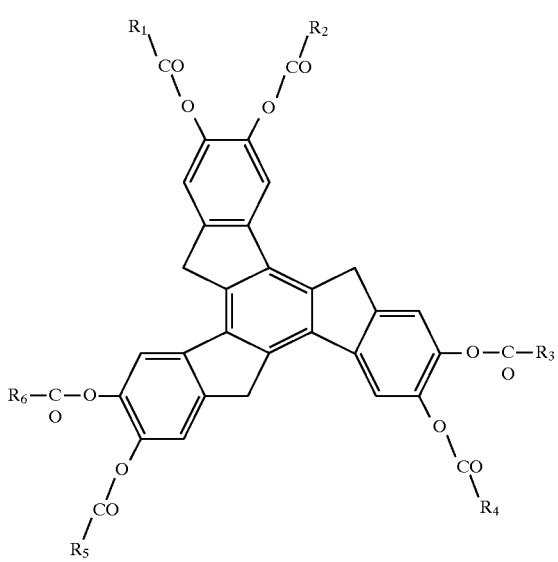

wherein $R_1, R_2, R_3, R_4, R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1, R_2, R_3, R_4, R_5$ and $R_6$ is an optically active substituent mentioned in Examplification 1, and n is an integer of 1–18, perferably 3–14.

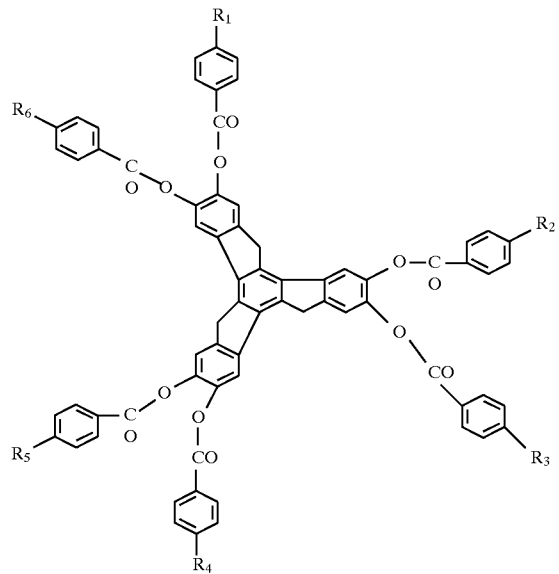

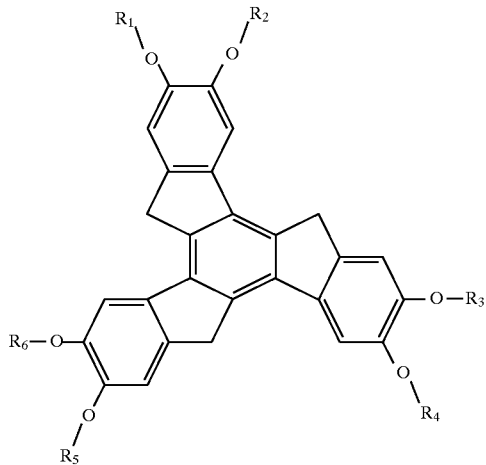

wherein $R_1, R_2, R_3, R_4, R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1, R_2, R_3, R_4, R_5$ and $R_6$ is an optically active substituent mentioned in Examplification 1, and n is an integer of 1–18, perferably 3–14.

wherein $R_1, R_2, R_3, R_4, R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1, R_2, R_3, R_4, R_5$ and $R_6$ is an optically active substituent mentioned in Examplification 1, and n is an integer of 1–18, perferably 3–14.

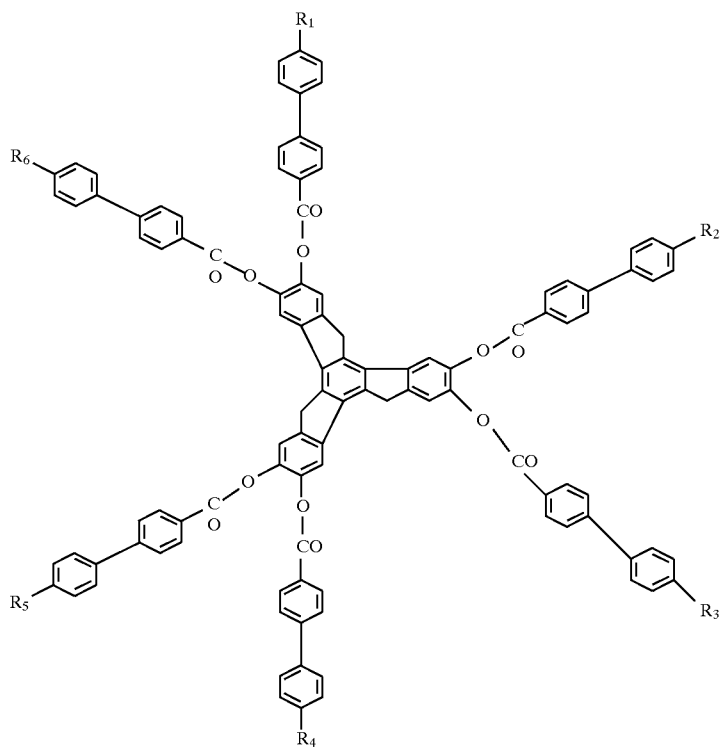

wherein $R_1, R_2, R_3, R_4, R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1, R_2, R_3, R_4, R_5$ and $R_6$ is an optically active substituent mentioned in Examplification 1, and n is an integer of 1–18, perferably 3–14.

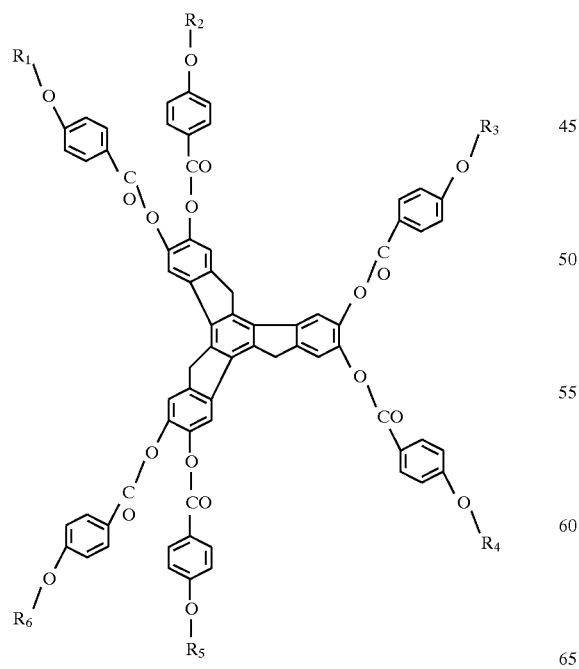

wherein $R_1, R_2, R_3, R_4, R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1, R_2, R_3, R_4, R_5$ and $R_6$ is an optically active substituent mentioned in Examplification 1, and n is an integer of 1–18, perferably 3–14.

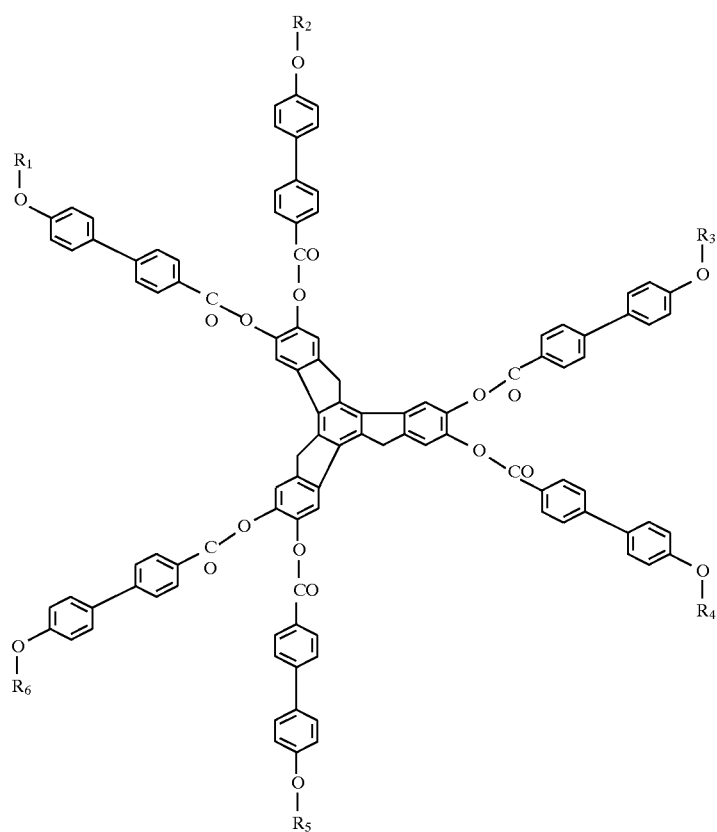

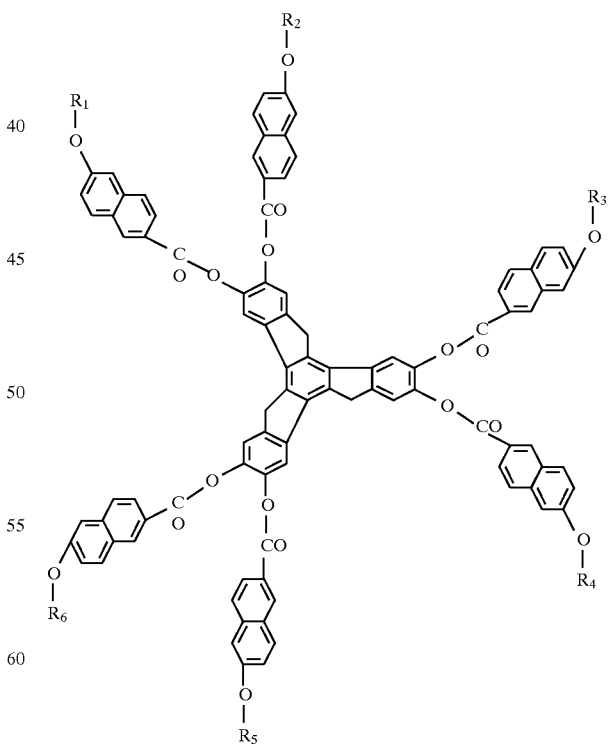

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, perferably 3–14.

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, perferably 3–14.
Composition represented by:

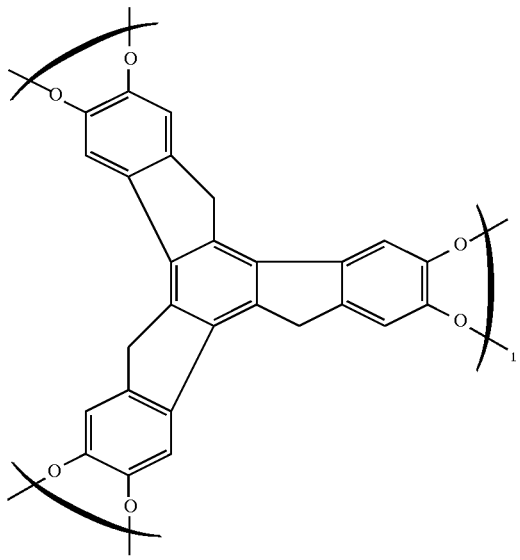

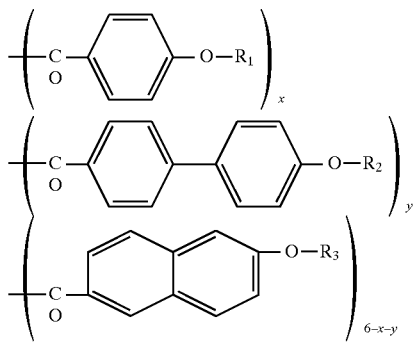

Examplification 1, in the case of a discotic liquid crystallline compound, at least one of $R_1$ and $R_2$ is an optically active substituent mentioned in Examplification 1, n is an integer of 1–18, preferably 3–14 and the numerals outside the parentheses means molar composition ratio where X is $0 \leq X \leq 6$.

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, n is an integer of 1–18, preferably 3–14 and the numerals outside the parentheses mean molar composition ratio where X and Y are $0 \leq X \leq 6$, $0 \leq Y \leq 6$, $X+Y \leq 6$.
Composition represented by:

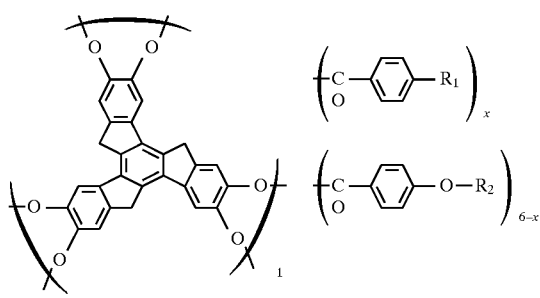

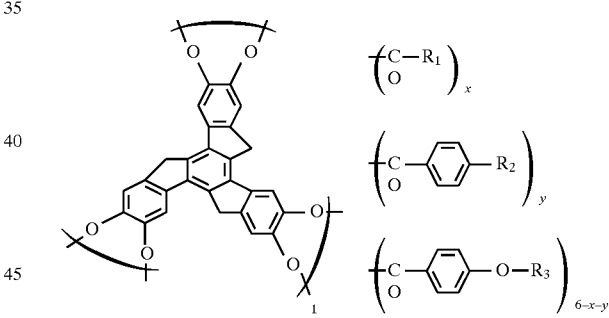

wherein $R_1$ and $R_2$ are independently a linear or branched alkyl group having the formula $C_nH_{2n+1}$ or a substituent group selected from the substituent groups mentioned in wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, n is an integer of 1–18, preferably 3–14 and the numerals outside the parentheses mean molar composition ratio where X and Y are $0 \leq X \leq 6$, $0 \leq Y \leq 6$, $X+Y \leq 6$.

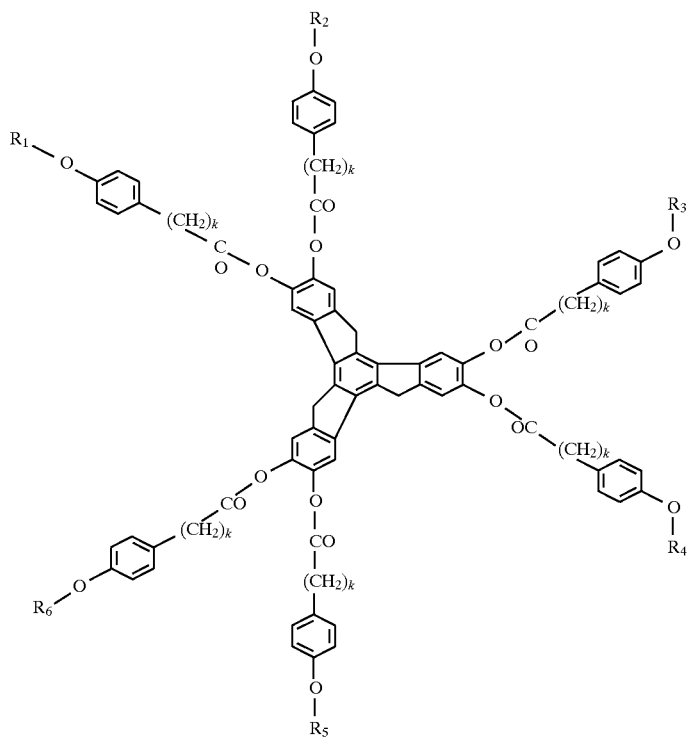

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14, and k is 1, 2 or 3.

wherein $R_1$, $R_2$, $R_3$, $R_4$, $R_5$, $R_6$, $R_7$, $R_8$, $R_9$ and $R_{10}$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$, $R_8$, $R_9$ and $R_{10}$ has an optically active substituent group or Q has at least one optically active substituent group selected from

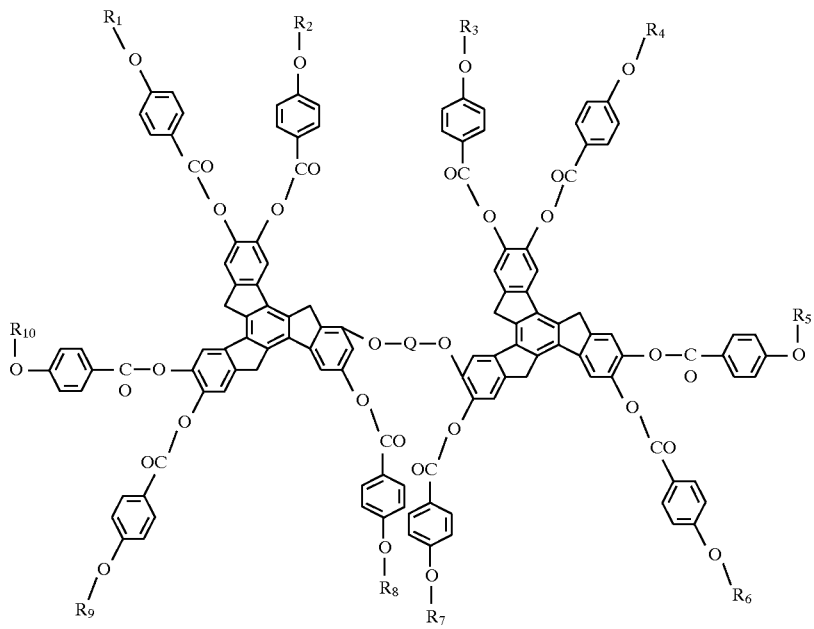

Examplification 2 at A in the above formulae, n is an integer of 1–18, preferably 3–14, and the average of 3,000 to 10,000.

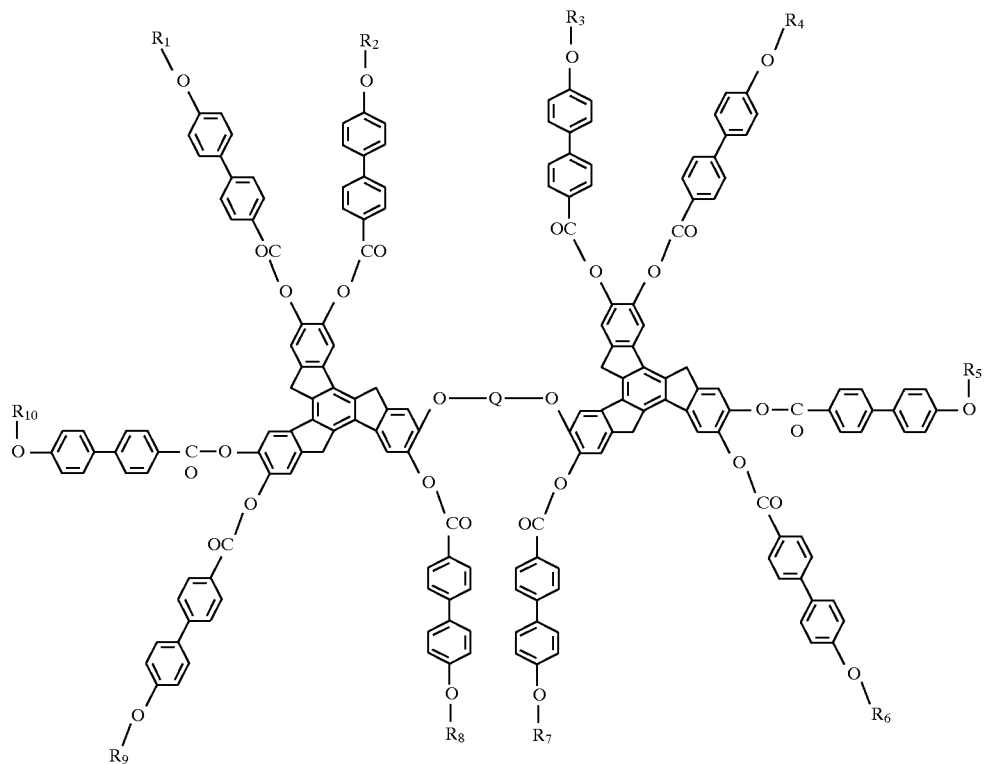

wherein $R_1$, $R_2$, $R_3$, $R_4$, $R_5$, $R_6$, $R_7$, $R_8$, $R_9$ and $R_{10}$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$, $R_8$, $R_9$ and $R_{10}$ has an optically active substituent group or Q has at least one optically active substituent group selected from Examplification 2 at A in the above formulae, n is an integer of 1–18, preferably 3–14, and the average of 3,000 to 10,000.

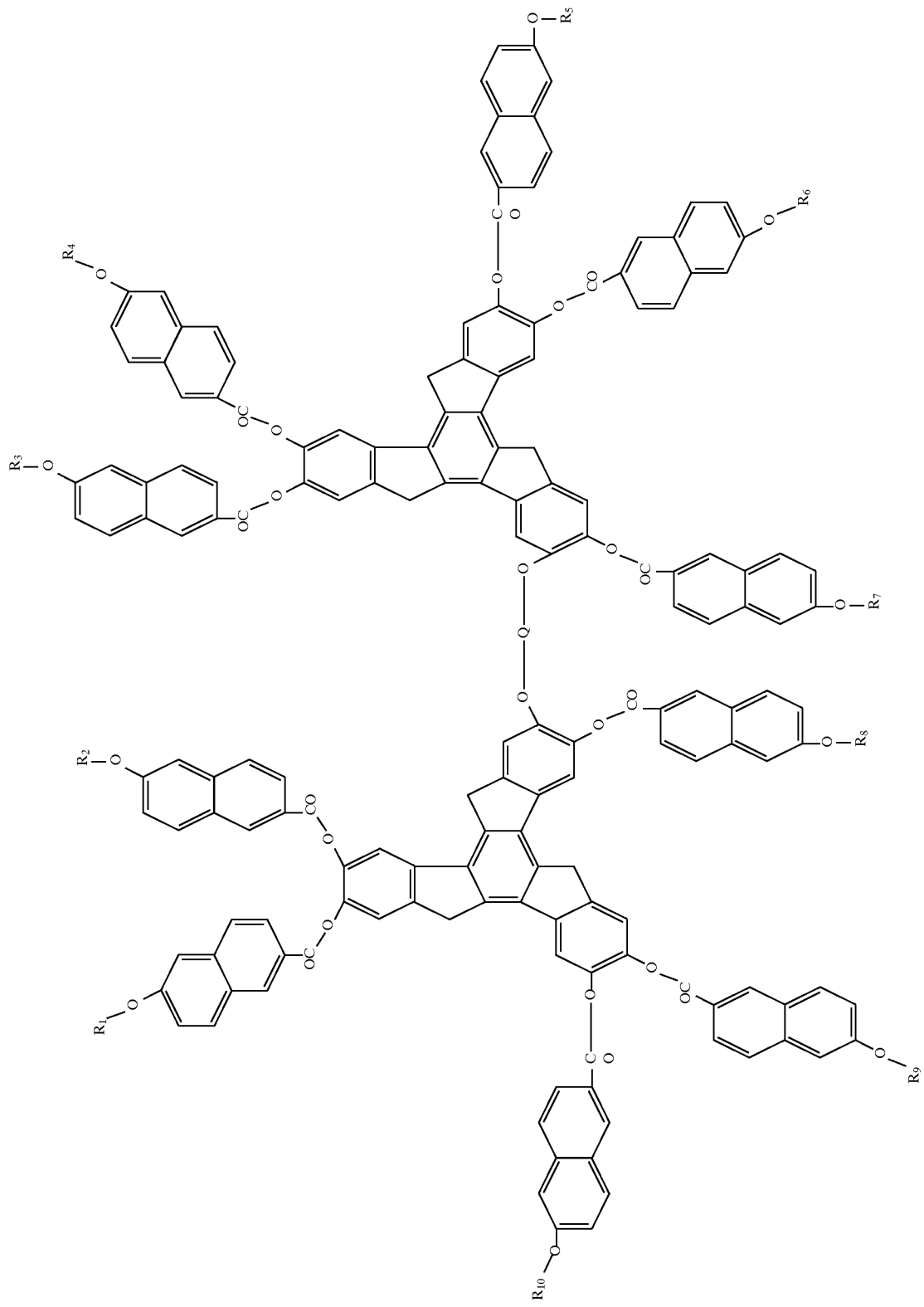

wherein $R_1, R_2, R_3, R_4, R_5, R_6, R_7, R_8, R_9$ and $R_{10}$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1, R_2, R_3, R_4, R_5, R_6, R_7, R_8, R_9$ and $R_{10}$ has an optically active substituent group or Q has at least one optically active substituent group selected from Examplification 2 at A in the above formulae, n is an integer of 1–18, preferably 3–14, and the average of 3,000 to 10,000.

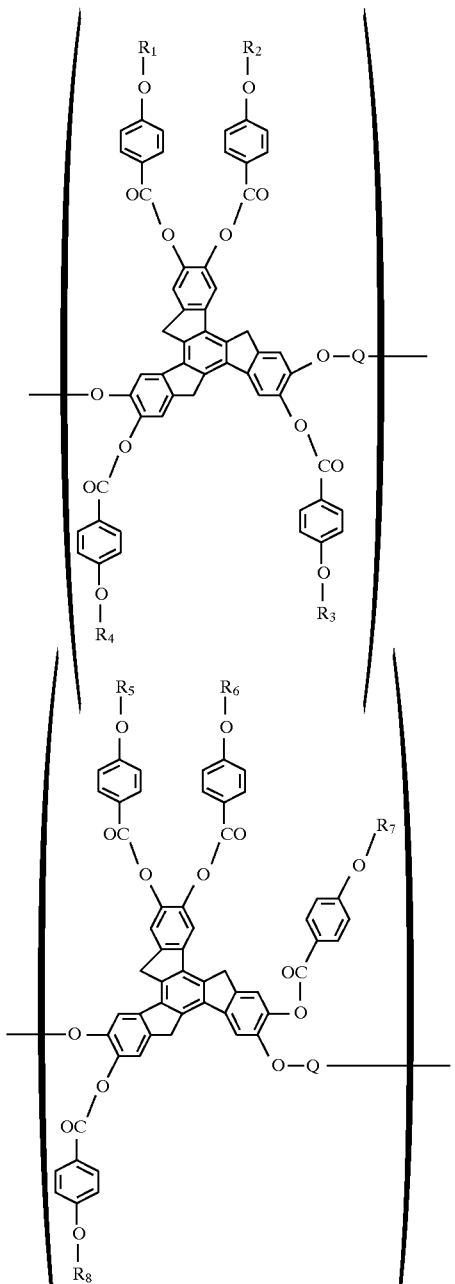

wherein $R_1, R_2, R_3, R_4, R_5, R_6, R_7$ and $R_8$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1, R_2, R_3, R_4, R_5, R_6, R_7$ and $R_8$ has an optically active substituent group or Q has at least one optically active substituent group selected from Examplification 2 at A in the above formulae, n is an integer of 1–18, preferably 3–14, and the average of 5,000 to 10,000.

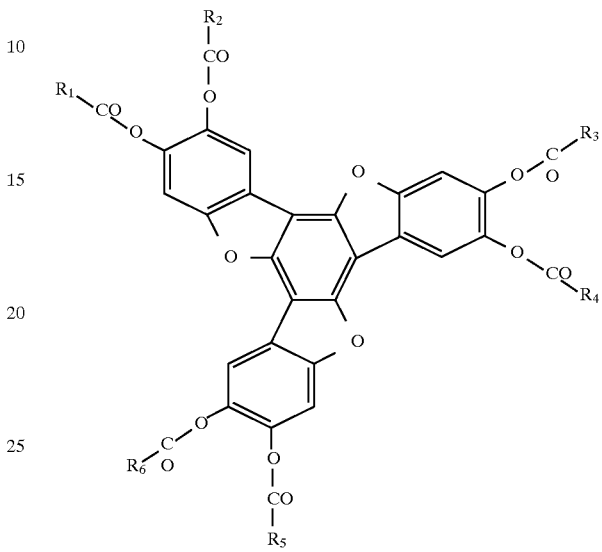

wherein $R_1, R_2, R_3, R_4, R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1, R_2, R_3, R_4, R_5$ and $R_6$ is an optically active substituent mentioned in Examplification 1, and n is an integer of 1–18, preferably 3–14.

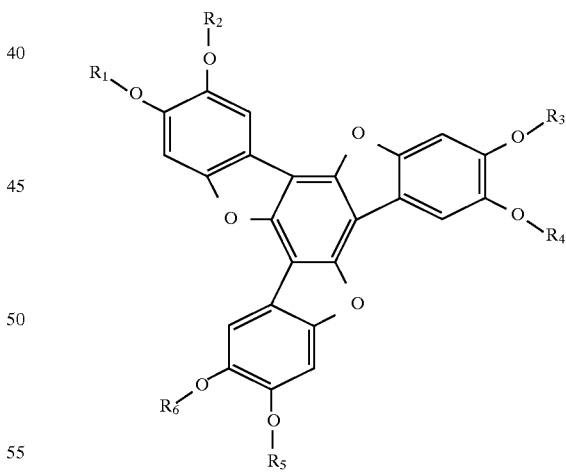

wherein $R_1, R_2, R_3, R_4, R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1, R_2, R_3, R_4, R_5$ and $R_6$ is an optically active substituent mentioned in Examplification 1, and n is an integer of 1–18, preferably 3–14.

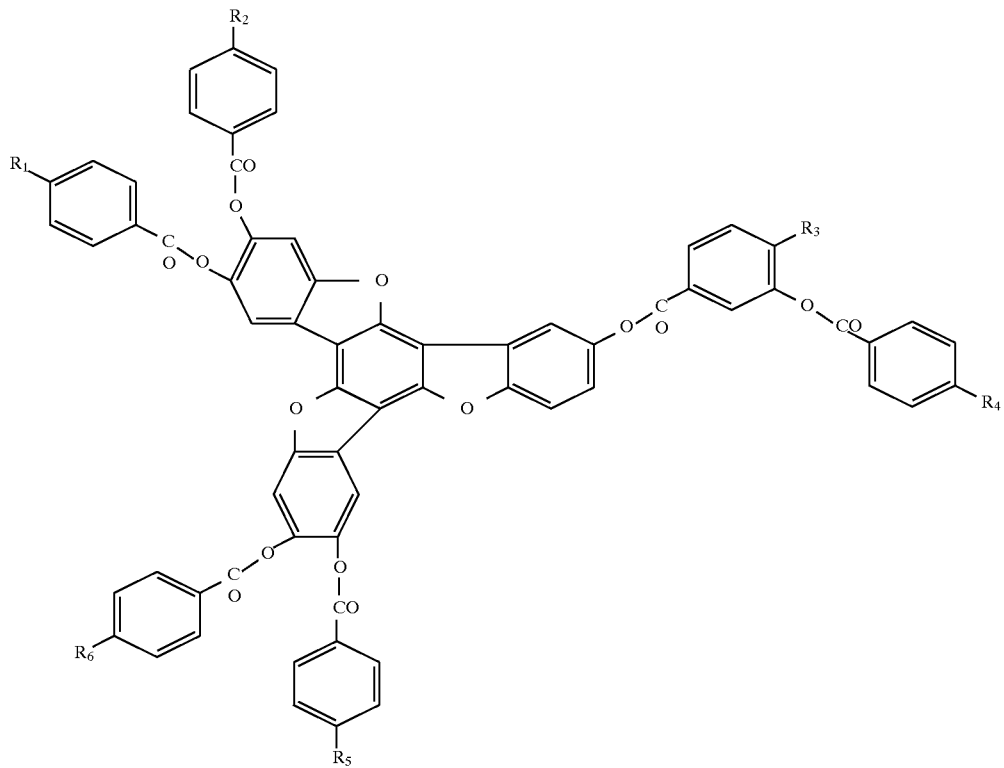

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

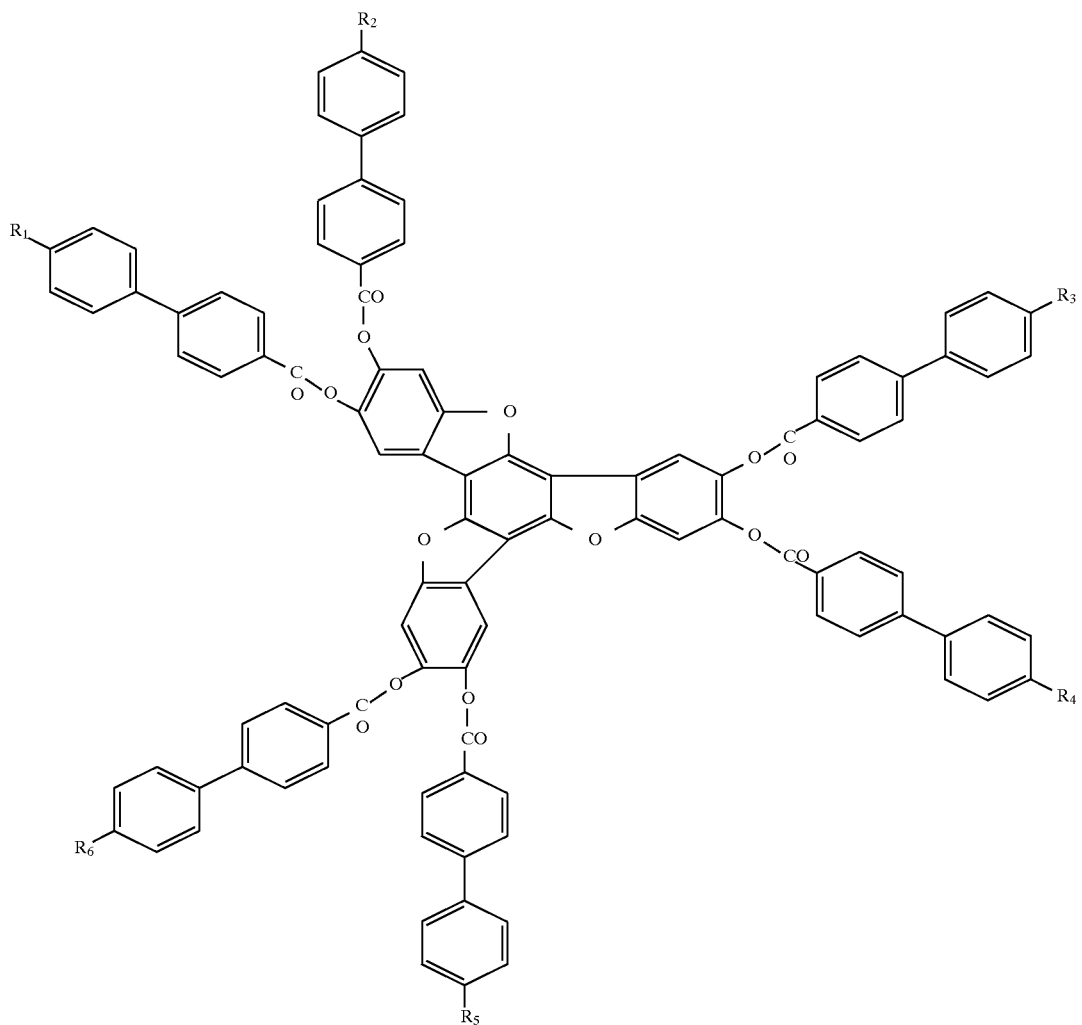

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

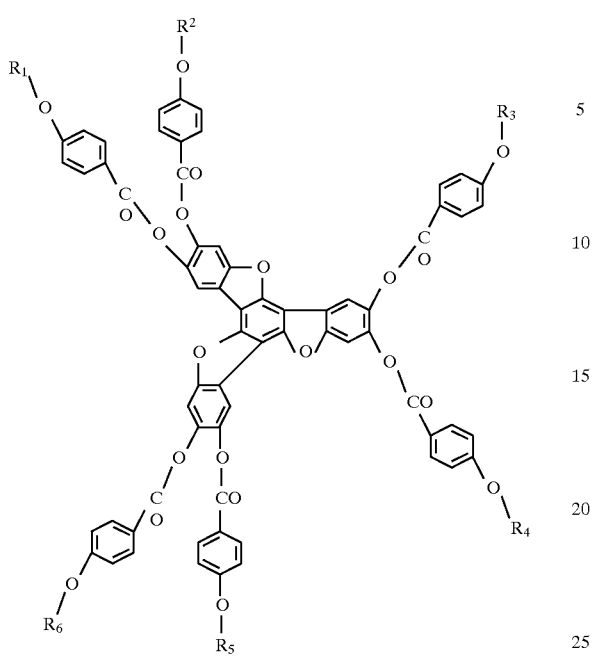

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

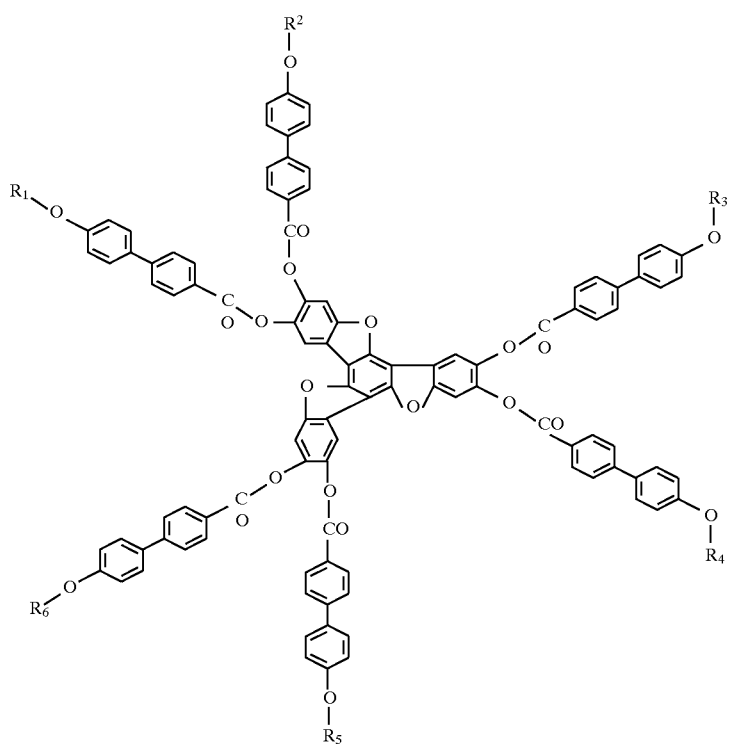

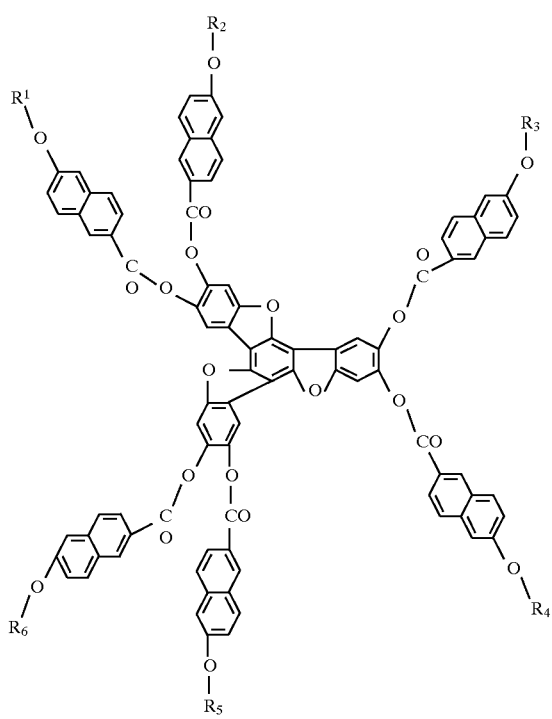

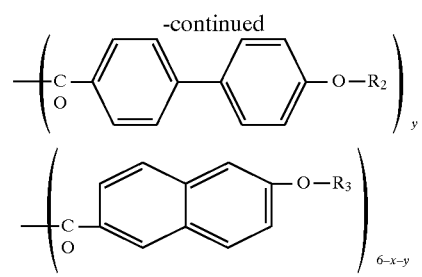

-continued wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, n is an integer of 1–18, preferably 3–14 and the numerals outside the parentheses mean molar composition ratio where X and Y are $0 \leq X \leq 6$, $0 \leq Y \leq 6$, $X+Y \leq 6$.

Composition represented by:

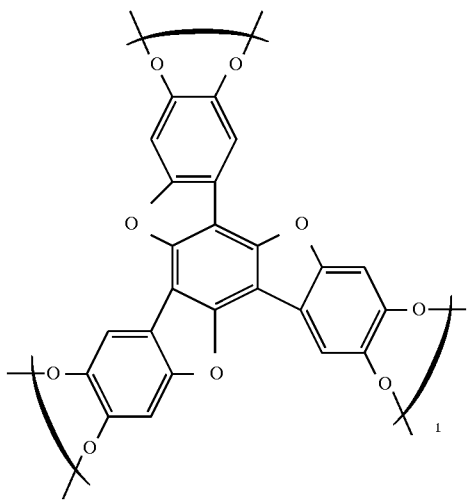

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

Composition represented by:

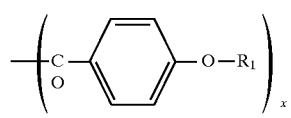

wherein $R_1$ and $R_2$ are independently a linear or branched alkyl group having the formula $C_nH_{2n+1}$ or a substituent group selected from the substituent groups mentioned in Examplification 1, in the case of a discotic liquid crystallline compound, at least one of $R_1$ and $R_2$ is an optically active substituent mentioned in Examplification 1, n is an integer of 1–18, preferably 3–14 and the numerals outside the parentheses means molar composition ratio where X is $0 \leq X \leq 6$.

Composition represented by:

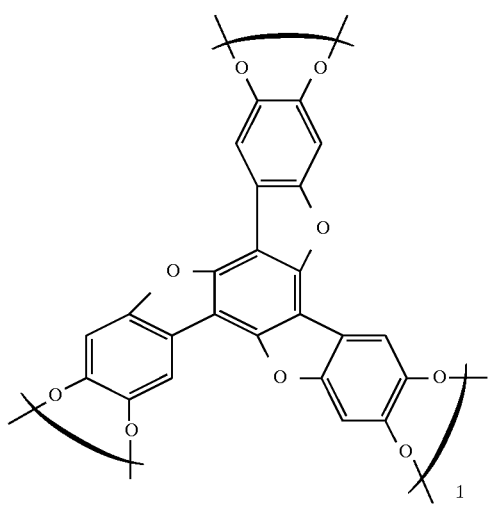

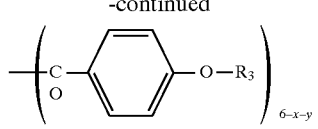

wherein $R_1$, $R_2$ and $R_3$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$ and $R_3$ is an optically active substituent mentioned in Examplification 1, n is an integer of 1–18, preferably 3–14 and the numerals outside the parentheses mean molar composition ratio where X and Y are $0 \leqq X \leqq 6$, $0 \leqq Y \leqq 6$, X+Y6.

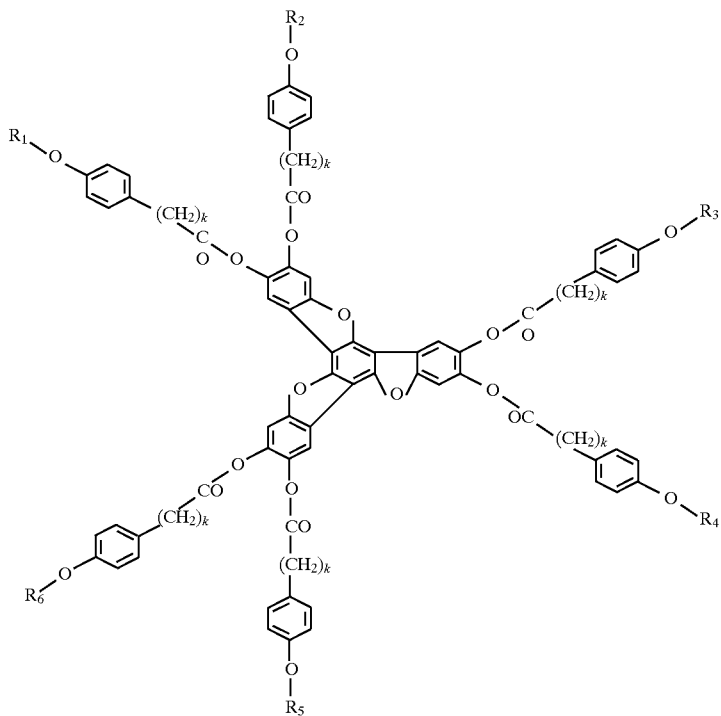

wherein $R_1$, $R_2$, $R_3$, $R_4$, $R_5$ and $R_6$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$, $R_5$ and $R_6$ is an optically active substituent mentioned in Examplification 1, and n is an integer of 1–18, preferably 3–14.

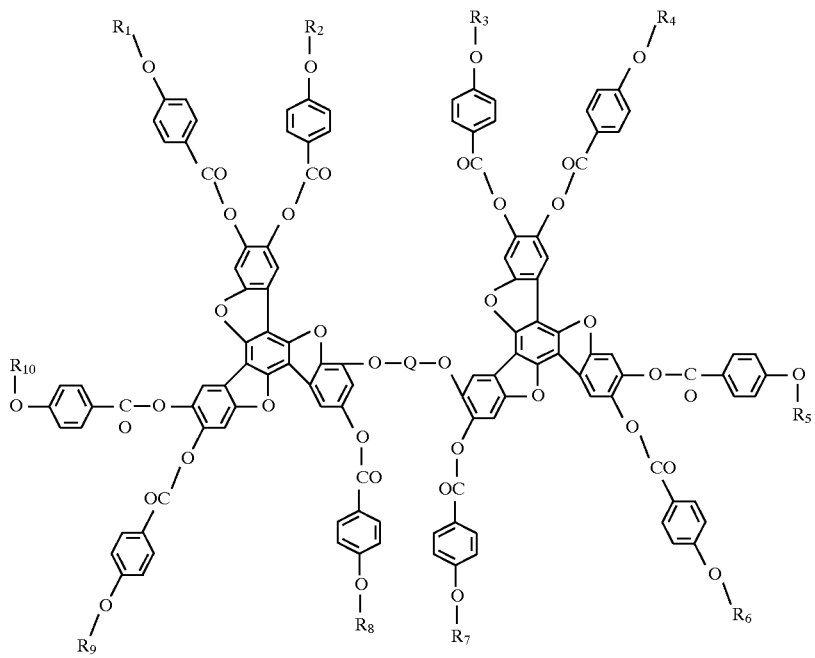

wherein $R_1$, $R_2$, $R_3$, $R_4$, $R_5$, $R_6$, $R_7$, $R_8$, $R_9$ and $R_{10}$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$, $R_8$, $R_9$ and $R_{10}$ has an optically active substituent group or Q has at least one optically active substituent group selected from Examplification 2 at A in the above formulae, n is an integer of 1–18, preferably 3–14, and the average of 3,000 to 10,000.

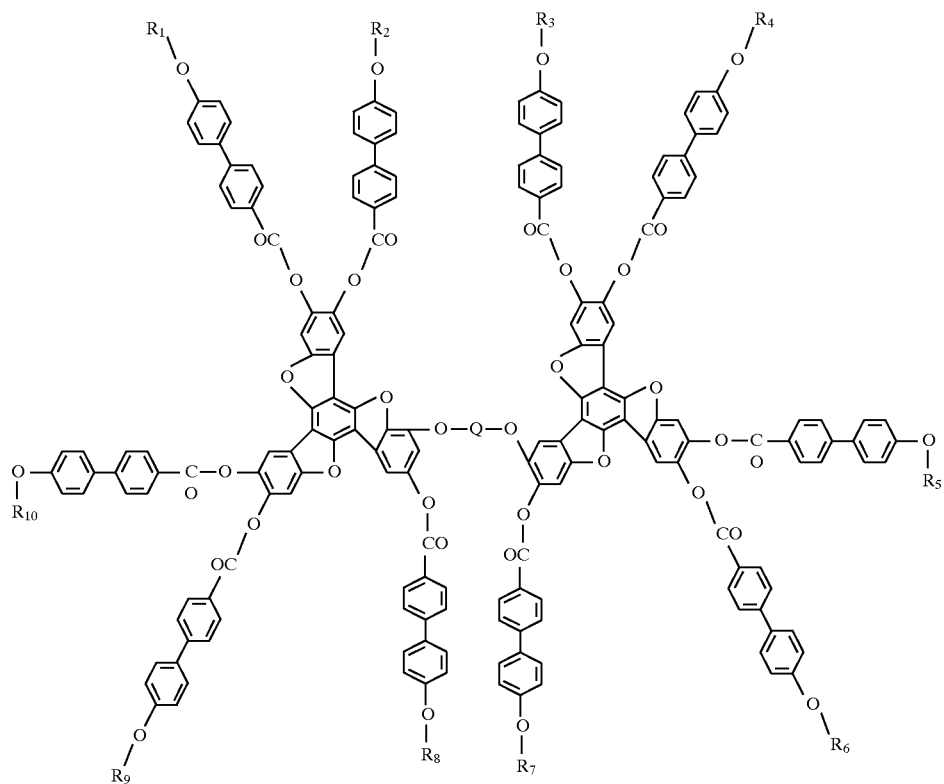

wherein $R_1$, $R_2$, $R_3$, $R_4$, $R_5$, $R_6$, $R_7$, $R_8$, $R_9$ and $R_{10}$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$, $R_8$, $R_9$, and $R_{10}$ has an optically active substituent group or Q has at least one optically active substituent group selected from Examplification 2 at A in the above formulae, n is an integer of 1–18, preferably 3–14, and the average of 3,000 to 10,000.

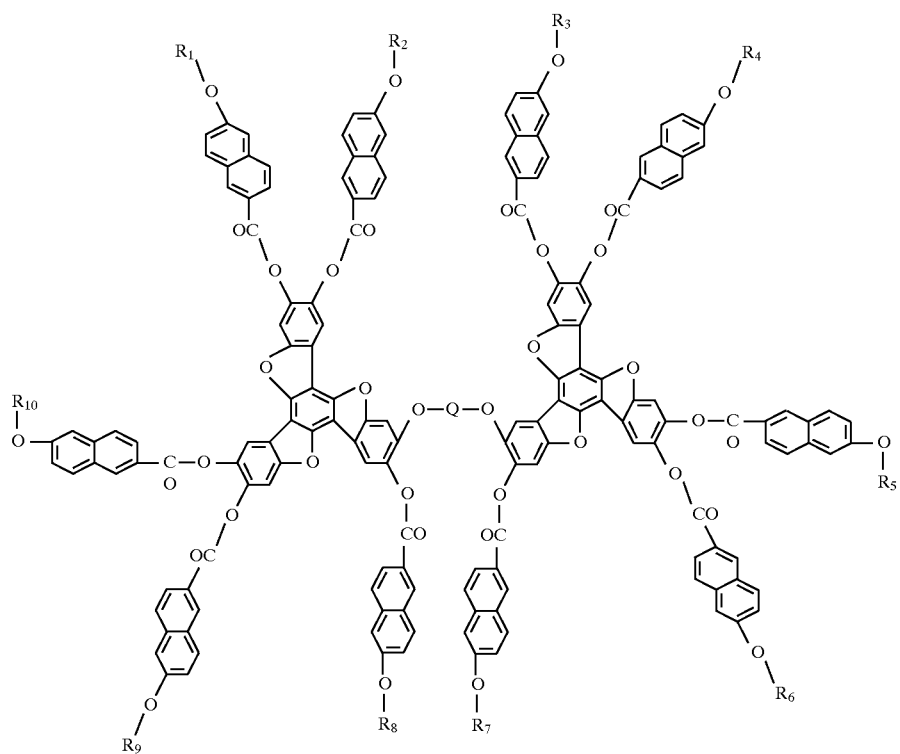

wherein $R_1$, $R_2$, $R_3$, $R_4$, $R_5$, $R_6$, $R_7$, $R_8$, $R_9$ and $R_{10}$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$, $R_8$, $R_9$ and $R_{10}$ has an optically active substituent group or Q has at least one optically active substituent group selected from Examplification 2 at A in the above formulae, n is an integer of 1–18, preferably 3–14, and the average of 3,000 to 10,000.

Composition represented by:

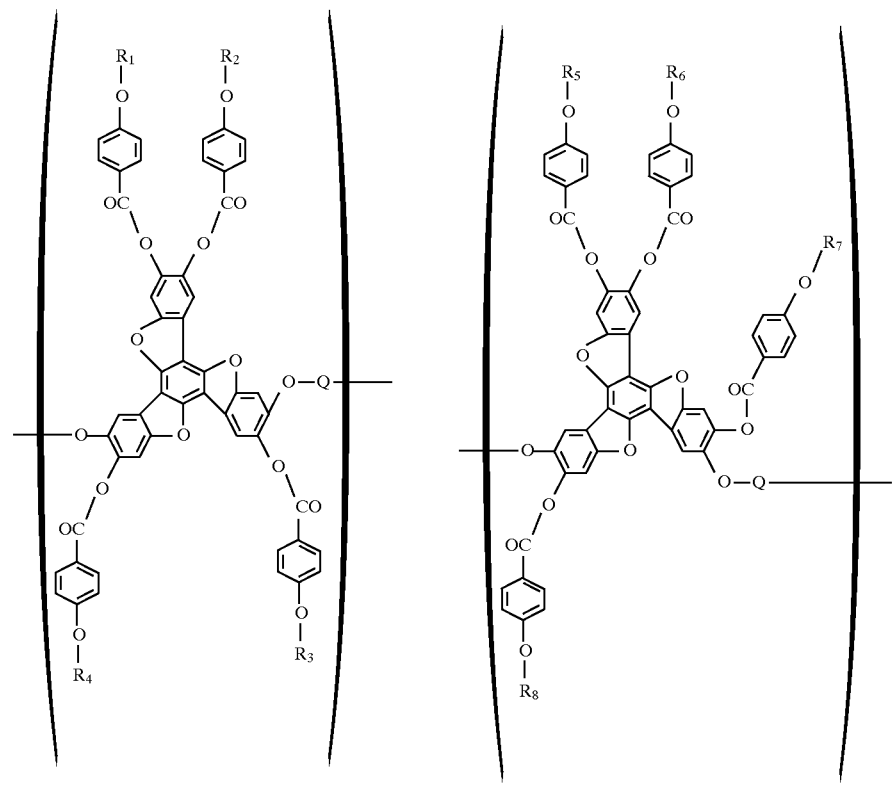

wherein $R_1$, $R_2$, $R_3$, $R_4$, $R_5$, $R_6$, $R_7$ and $R_8$ are independently a linear or branched alkyl group having the formula $C_nH_{2n+1}$ or a substituent group selected from the substituent groups mentioned in Examplification 1, Q is as defined above, in the case of a discotic liquid crystallline compound, at least one of $R_1$, $R_2$, $R_3$, $R_4$, $R_5$, $R_6$, $R_7$ and $R_8$ has an optically active substituent group or Q has at least one optically active substituent group selected from Examplification 2 at A in the above formulae, n is an integer of 1–18, preferably 3–14, and the average of 5,000 to 10,000.

Polymers such as polyacrylates, polymethacrylate and polysiloxane which have one or more compounds mentioned above at the side chain(s) can also be preferably used.

Examples thereof are as follows:

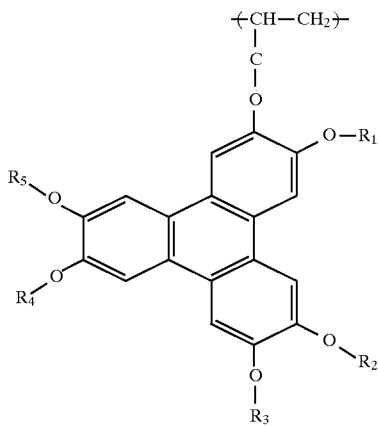

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

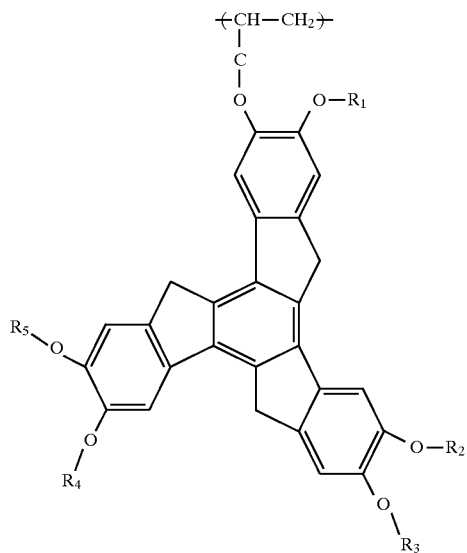

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

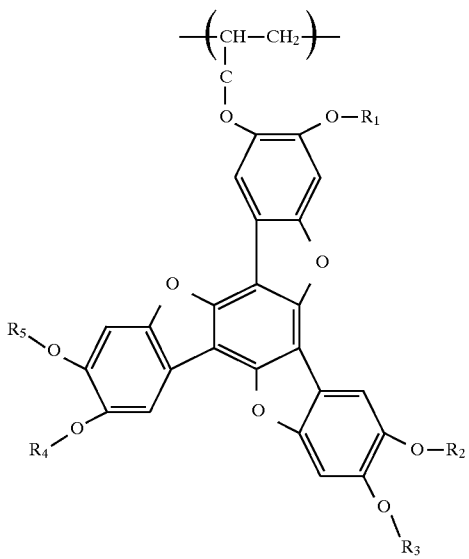

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

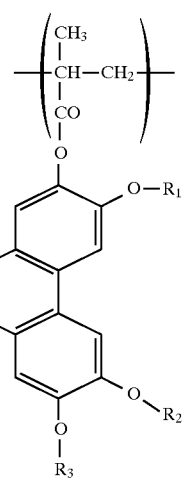

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

103

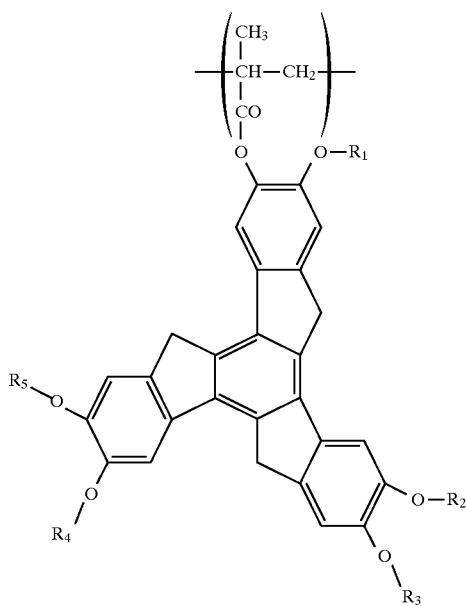

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

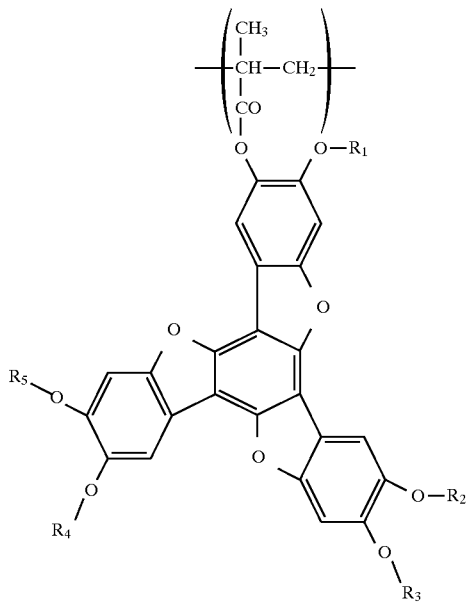

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$

104 is an optically active substituent mentioned in Examplification 1, n is an integer of 1–18, preferably 3–14.

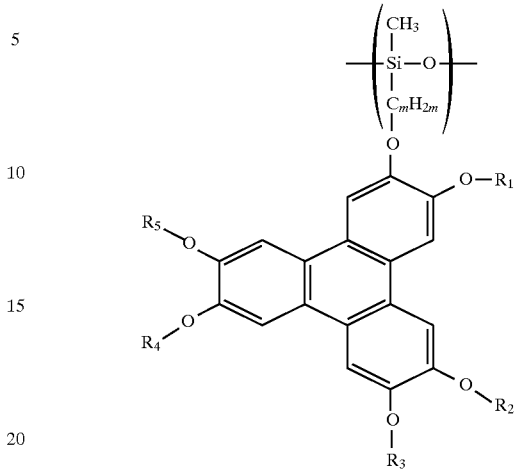

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

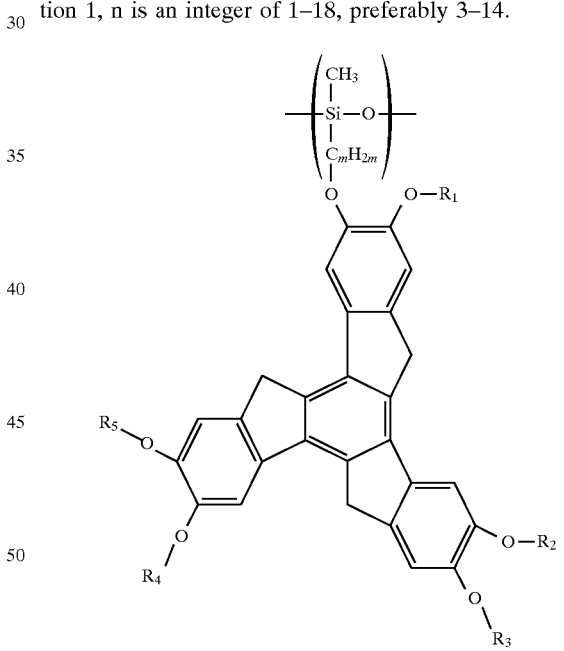

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

105

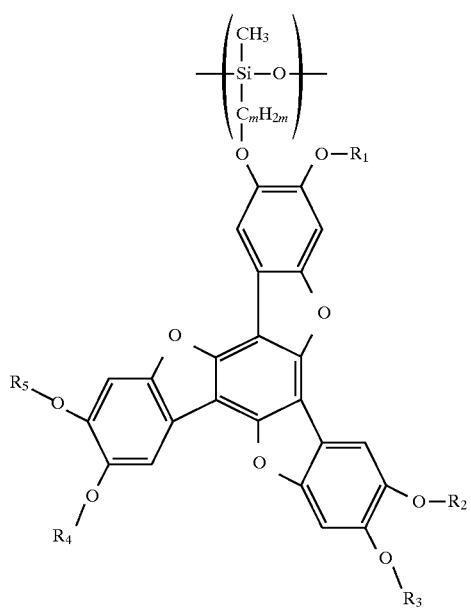

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

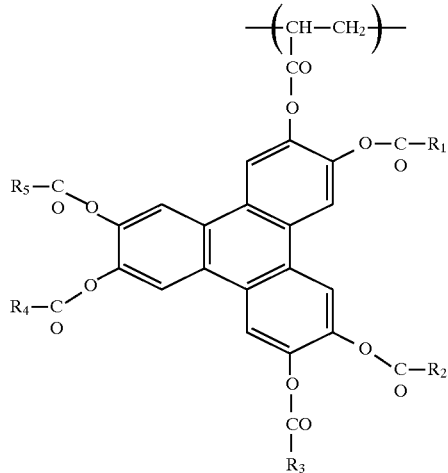

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

106

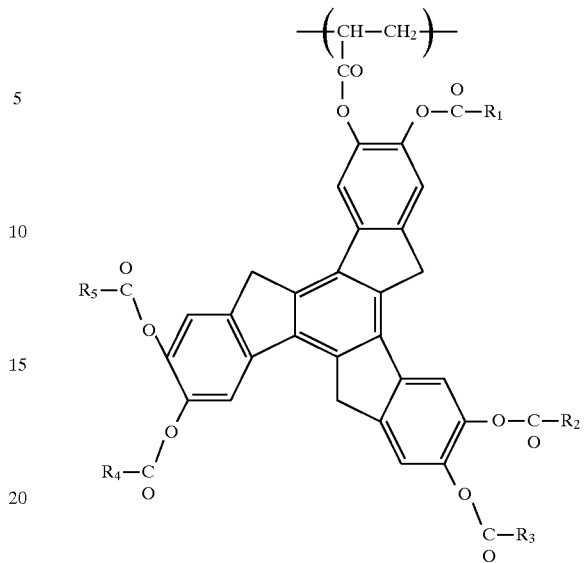

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

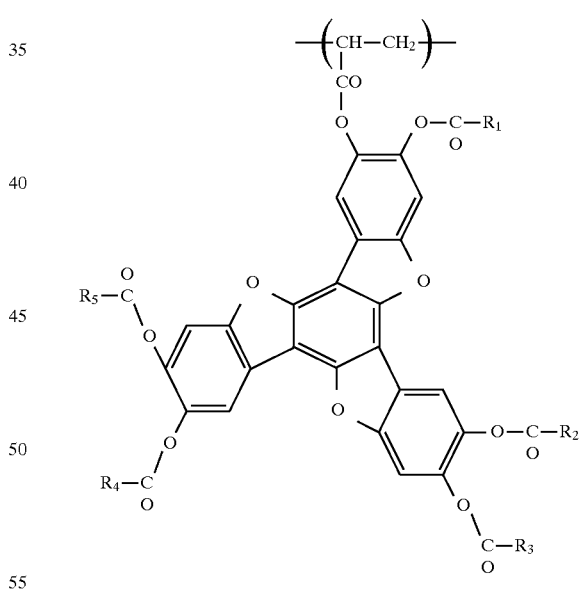

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

107

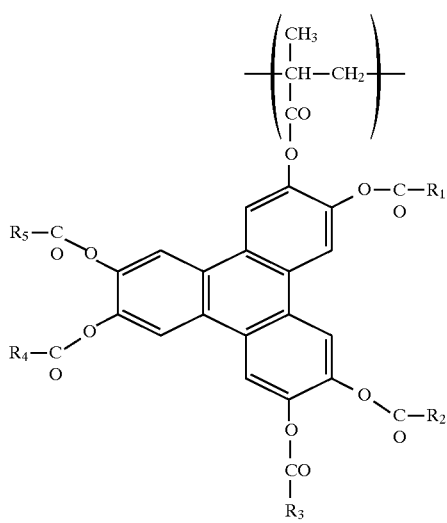

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

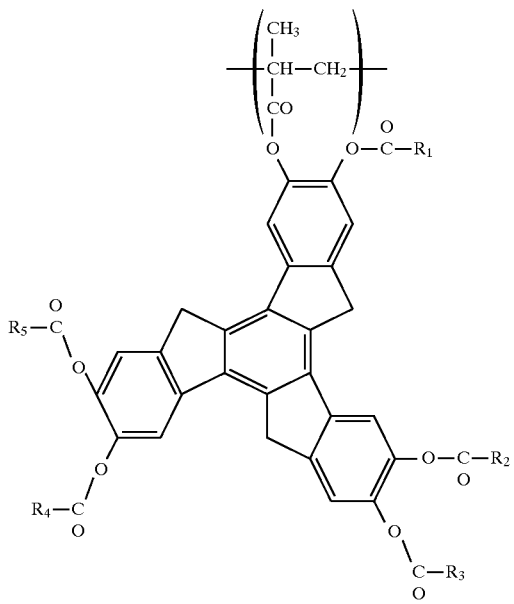

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

108

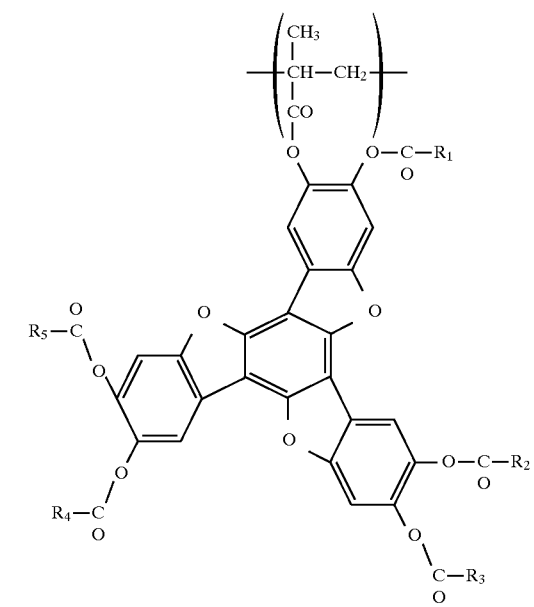

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

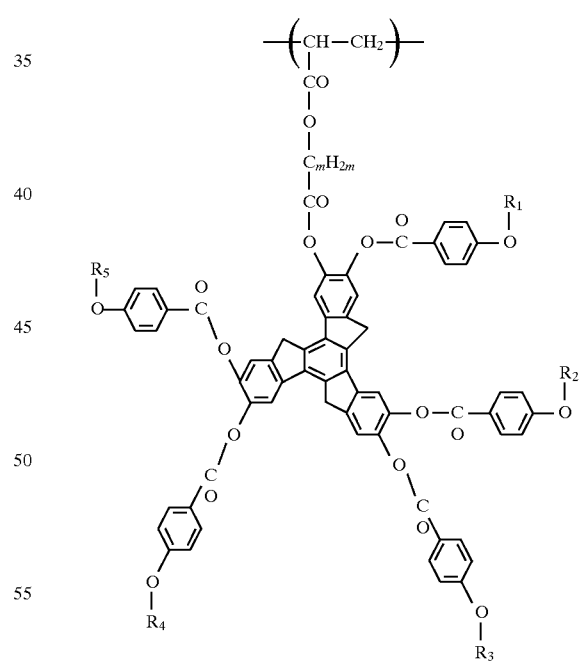

wherein $R_1$, $R_2$, $R_3$, $R_4$ and $R_5$ are independently a linear or branched alkyl group having the formula $C_nH_{2n+1}$ or a substituent group selected from the substituent groups mentioned in Examplification 1, in the case of a discotic liquid crystallline compound, at least one of $R_1$, $R_2$, $R_3$, $R_4$ and $R_5$ is an optically active substituent mentioned in Examplification 1, n is an integer of 1–18, preferably 3–14.

The above polymers range in average molecular weight usually from 5,000 to 100,000.

The structures shown above are typical examples of discotic liquid crystalline compouns and do not constitute any limitation on such compounds employable for the discotic liquid crystalline material. Any structures of discotic liquid crystalline compouns may be used each alone or as a mixture if only they have any of the foregoing properties.

In order to obtain a liquid crystalline optical film with twisted orientation fixed uniformly by using the discotic liquid crystalline material described above, it is desirable to use the following substrate and go through the following steps.

First, the discotic liquid crystalline material is applied onto an orienting substrate. It is preferable for the orienting substrate employable in the present invention to have anisotropy so that it can control the tilting direction of liquid crystal. If the orienting substrate used cannot control the tilting direction of liquid crystal at all, there will be obtained only a structure wherein the tilting direction of liquid crystal is disordered and it will be impossible to obtain a desired optical performance.

The following are examples of orienting substrates employable in the present invention and formed of materials having intra-plane anisotropy which materials are preferred.

Film substrates and uniaxially stretched film substrates, formed by using plastic materials such as polyimides, polyamide-imides, polyamides, polyether imides, polyether ether ketones, polyether ketones, polyketone sulfides, polyether sulfones, polysulfones, polyphenylene sulfides, polyethylene terephthalates, polyethylene naphthalates, polyacetals, polycarbonates, polyarylates, acrylic resins, polyvinyl alcohols, polypropylenes, cellulosic plastics, epoxy resins, and phenolic resins, as well as metallic substrates such as aluminum, iron and copper substrates having slit-like grooves formed in the surfaces thereof, and glass substrates such as alkali glass, borosilicate glass and flint glass substrates having slit-like etched surfaces.

The above substrates may have been subjected to a surface treatment such as a hydrophilicizing treatment or a hydrophobicizing treatment. Moreover, the above plastic film substrates may have been subjected to a rubbing treatment or may have a rubbing-treated plastic film, e.g. rubbing-treated polyimide film or polyvinyl alcohol film. Further, the substrates exemplified above may have an obliquely vapor-deposited film of silicon oxide.

As more concrete examples, mention may be made of substrates having rubbing-treated polyimide films, as well as polyether ether ketone substrates, polyether ketone substrates, polyether sulfone substrates, polyphenylene sulfide substrates, polyethylene terephthalate substrates, polyethylene naphthalate substrates, polyarylate substrates, and cellulosic plastic substrates, which have all been subjected to a rubbing treated.

The liquid crystalline optical film of the present invention is obtained by applying the foregoing discotic liquid crystalline material onto any of the substrates exemplified above and then subjecting the thus-coated substrate to steps for uniform orientation and for fixing.

The application of the discotic liquid crystalline material can be done by using a solution of the said material in any of various solvents or by using the said material in a melted state. From the standpoint of process it is desirable to adopt a solution applying method using the said solution.

Reference will now be made to the solution applying method. First, the discotic liquid crystalline material is dissolved in a solvent to prepare a solution of a predetermined concentration. In this case, the selection of a suitable depends on the liquid crystalline material used, the viscosity of the solution suitable for application, etc. But there usually is employed a solvent having a boiling point in the range of 30° to 300° C., preferably 60° to 250° C., at atmospheric pressure. Examples as follows:

Aromatic hydrocarbons such as benzene, toluene, xylene, tetralin, and methylnaphthalene;

Aromatic hydrocarbons such as benzene, toluene, xylene, tetralin, and methylnaphthalene;

Chain or cyclic aliphatic hydrocarbons such as hexane, cyclohexane, beptane, octane, nonane, and dcalin;

Ketones such as acetone, methyl ethyl ketone, and cyclohexanone;

Ethers such as tetrahydrofuran, dioxane, ethylene glycol dimethyl ether, ethylene glycol diethyl ether, and diethylene glycol diethyl ether;

Halogenated hydrocarbons such as methylene chloride, chloroform, dichloroethane, tetrachloroethane, carbon tetrachloride, trichloroethylene, tetrachloroethylene, and o-dichlorobenzene;

Amides such as dimethylformamide, dimethylacetamide, and N-methylpyrrolidone;

Alcohols such as methanol, ethanol, propanol, butanol, pentanol, hexanol, ethylene glycol, propylene glycol, methoxyethanol, ethoxyethanol, propoxyethanol, butoxyethanol, diethylene glycol, dipropylene glycol, diethylene glycol monomethyl ether, diethylene glycol monoethyl ether and hexyleneglycol;

Phenols such as phenol, p-chlorophenol, and cresol;

Carboxylic acid esters or lactones such as ethyl acetate, propyl acetate, butyl acetate, ethylene glycol diacetate, and Γ-butyrolactone;

Carbonic acid esters such as ethylane carbonate, acetate, propylane carbonate, dimethyl carbonate, and diethyl carbonate;

Sulfones such as dimethyl sulfoxide and sulfolane;

Nitriles such as acetonitrile and benzonitrile; Water; and Mixtures thereof.

A suitable concentration of the solution cannot be said sweepingly because it depends on the solubility of the liquid crystalline material used and the thickness of the resulting liquid crystalline optical film as a final product. But the solution is used at a concentration usually in the range of 1 to 60 wt%, preferably 3 to 40 wt%.

The solution of the discotic liquid crystalline material can be applied onto the orienting substrate, for example, by any of spin coating, roll coating, printing, curtain coating (die coating) and dipping/pulling-up methods.

After application of the solution, the solvent used is removed to form a layer of the liquid crystalline material having a uniform thickness on the substrate. Conditions for removing the solvent used are not specially limited if only the conditions adopted permit substantial removal of the solvent used and can prevent the layer of the liquid crystalline material from flowing or dropping. Usually, the solvent used is removed by air-drying at room temperature, drying over a hot plate, drying in a drying oven, or blowing of warm or hot air.

The solution applying and the following drying step aim at forming a layer of the discotic liquid crystalline material uniformly on the substrate, and usually the liquid crystalline material layer does not form the desired orientation yet. For forming the desired orientation it is desirable in the present invention to conduct the following heat treatment.

Heat treatment is performed at a temperature above the liquid crystal transition point of the discotic liquid crystalline material. More specifically, orientation is allowed to proceed in the state of liquid crystal of the discotic liquid crystalline material, or the same material is once heated to a higher temperature beyond the temperature range in which it forms a liquid crystal layer, and thereby assumes an isotropic liquid state, then the temperature is reduced to a level falling under the said temperature range. A suitable heat treatment temperature differs depending on the discotic liquid crystalline material used and so cannot be said sweepingly. But the heat treatment is conducted usually at a temperature in the range of 50° to 300° C., preferably 100° to 250° C.

The time required for sufficient orientation of liquid crystal cannot be determined sweepingly because it differs depending on the discotic liquid crystalline material used, but it is usually in the range of 5 seconds to 2 hours, preferably 10 seconds to 40 minutes, more preferably 20 seconds to 20 minutes. If the said time is shorter than 5 seconds, the temperature of the liquid crystalline material layer will not rise up to a predetermine level and hence orientation may be unsatisfactory. In the above heat treatment step, the orientation form of the discotic liquid crystalline material may be controlled, or the formation thereof may be accelerated, by the use of a magnetic field or an electric field for utilization of magnetic susceptibility anisotropy or dielectric anisotropy of the discotic liquid crystalline material. More particularly, under the application of a magnetic field, an aromatic ring usually exhibits diamagnetism, so that there is developed a force acting to cause the aromatic ring plane to become parallel with the magnetic field. On the other hand, under the application of an electric field there is developed a force acting to cause the dipole moment of molecule to become parallel with the electric field. By utilizing these forces and by appling a magnetic field or an electrid field in an arbitrary direction it is possible to control the orienting direction of the discotic liquid crystalline compounds molecules in the film interior and obtain a desired orientation form. In the case of applying a magnetic field, the intensity thereof is usually in the range from 0.1 KG to 10 KG, while in the case of applying an elecrtric field, the intensity thereof is usually in the range from 100 KV/m to 10 MV/m.

By subsequently cooling the twisted orientation of the descotic liquid crystal thus obtained, the orientation form is fixed without impairment to afford the liquid crystalline optical film of the present invention.

Generally, in the case where a crystal phase appears in the course of cooling, the orientation in the state of liquid crystal is destroyed with crystallization. The discotic liquid crystalline material used in the present invention has no crystal phase, or has a property such that even if it latently has a crystal phase, the crystal phase does not appear during cooling, or has a property such that although clear crystal transition point and liquid crystal transition point are not confirmed, there is no fluidity in the working temperature range of the liquid crystalline optical film, and the orientation form does not change even under application of an external field or an external force. Thus, the destruction of the orientation form caused by crystallization does not occur.

The liquid crystalline optical film of the present invention can suitably be obtained by cooling the discotic liquid crystalline material to a temperature below the liquid crystal transition point thereof. Cooling can be done merely by taking out the material from the heat treatment atmosphere into the atmosphere of a room temperature, whereby the orientation form obtained can be fixed uniformly. There may be adopted a forced cooling such as air cooling or water cooling, or a slow cooling. No special limitation is placed on the cooling rate, but a slow cooling over an extremely long period of time rather causes deterioration of productivity or may result in appearance of a latent crystal layer, and thus such a slow cooling is not desirable. The time required for cooling is usually not longer than 30 minutes, preferably not longer than 10 minutes.

The thickness of the liquid crystalline optical film after fixing of the orientation form differs depending on for what purpose the film is to be used, but preferably it is in the range of 10 nm to 100 $\mu$m, more preferably 100 nm to 50 $\mu$m. If the film thickness is smaller than 10 nm, it will be difficult to obtain a satisfactory optical performance due to small birefringence, and if the film thickness exceeds 100 $\mu$m, orientation defects are apt to occur during manufacture.

The liquid crystalline optical film of the present invention obtained by the above process possesses a unique orientation form and for this reason it exhibits an optial characteristic so far not attained. Utilizing this optical characteristic, the film can be used as a visual angle or color compensating means for a liquid crystal display or the like. In the case where the liquid crystalline optical film of the invention is disposed in a liquid crystal cell actually as a compensating film for a liquid crystal display, which film will hereinafter referred to simply as "compensating film", it is optional whether the film is to be used alone after separation of the orienting substrate from the film or as formed on the same substrate.

In the case where the film alone is to be used after separation from the orienting substrate, there may be adopted, for example, any of a method wherein the orienting substrate is separated mechanically at the interface with the film by using rolls or the like, a method wherein the laminate in question is dipped in a poor solvent for all structural materials and then the substrate is separated from the film mechanically, a method wherein the separation is performed by the application of ultrasonic wave in a poor solvent, a method wherein the separation is performed by utilizing the difference in thermal expansion coefficient between the orienting substrate and the film and thereby providing a temperature change, and a method wherein the orienting substrate itself or an orienting film on the substrate is dissolved off. Sine the releasability differs depending on the adherence between the discotic liquid crystalline material used and the orienting substrate used, there should be adopted a substrate releasing method most suitable for the system used.

In the case where the compensating film is usd as formed on the orienting substrate, the orienting substrate may be left as it is for use in a liquid crystal display if it is a member necessary for the liquid crystal display.

Further, the compensating film of the present invention obtained by fixing the orientation of the discotic liquid crystalline material on the orienting substrate may be separated from the substrate and transferred onto another substrate suitable for a desired optical use.

For example, when the orienting substrate used is necessary for obtaining a desired orientation form, but exerts an undersirable influence on a liquid crystal display, the substrate may be removed from the compensating film after orientation fixing and then the film may be transferred onto another substrate. To this end, there may be adopted the following method for example.

A substrate ("the second substrate" hereinafter) suitable for incorporation into a desired liquid crystal display and the compensating film on the orienting substrate are laminated together using an adhesive or a pressure-sensitive adhesive, then the orienting substrate is separated at the interface with the compensating film, allowing the compensating film to be transferred onto the second substrate suitable for the liquid crystal display.

The second substrate to be used for the transfer is not specially limited if only it has a moderate flatness, but a glass sheet and a transparent plastic film having optical isotropy are suitable. As examples of such plastic film are mentioned films of polymethacrylates, polystyrenes, polycarbonates, polyether sulfones, polyphenylene sulfides, polyarylates, amorphous polyolefins, triacetyl cellulose, and epoxy resins. Above all, polymethyl mathacrylate, polycarbonate, polyarylate, triacetyl cellulose and polyether sulfone films are preferred. Even an optically anisotropoic plastic film is employable if it is a member necessary for the liquid crystal display to which the compensating film of the invention is to be applied. As examples of such an optically anisotropic film there are mentioned phase contrast films and polarizing films obtained by stretching such plastic films as polycarbonate films and polystyrene films.

As a further example of the second substrate is mentioned a liquid crystal cell itself. The liquid crystal display cell usually comprises two upper and lower glass substrates each equipped with electrode. When the compensating film of the invention is transferred onto one or both of the upper and lower glass substrates, the incorporation of the compensating film is completed. Of course, the compensating film of the invention may be prepared by using as the orienting substrate a glass substrate which constitutes the display cell.

The adhesive or pressure-sensitive adhesive used in laminating the second substrate and the oriented liquid crystalline film of the invention is not specially limited if only it is of an optical grade. For example, there may be used one prepared by using an acrylic resin, an epoxy resin, an ethylene-vinyl acetate copolymer, or rubber.

The transfer of the compensating film onto the second substrate can be done by peeling the orienting substrate at the interface with the film after bonding of the second substrate to the film. Also in this case, as noted previously, the peeling of the orienting substrate can be done, for example, by mechanical method using rolls or the like, a method involving immersion of the laminate in a poor solvent for all structural materials and subsequent mechanical separation of the orienting substrate from the film, a method involving application of ultrasonic wave in a poor solvent, a method utilizing the different in thermal expansion coefficient between the orienting substrate and the optical film, or a method wherein the orienting substrate itself or an orienting film thereon is dissolved off. Since the releasability differs depending on the adherence between the discotic liquid crystalline material used and the orienting substrate used, there should be adopted a peeling method most suitable for the system used.

If required for the protection of film surface, a protective layer such as a transparent plastic film may be formed on the compensating film.

In order for the compensating film of the invention to exhibit a satisfactory optical performance it is necessary that the film thickness, twist angle, twist direction and refractive indexes in the three-dimensional directions of the film be matched in accordance with the display cell used. For example, the film thickness can be controlled by controlling the concentration of the solution to be applied onto the orienting substrate. The twist angle can be controlled by controlling the proportion of optically active groups in the liquid crystalline material. As to the twist direction, it can be controlled by suitably selecting an enantiomer of the optically active substance. Further, the refractive indexes in the three-dimensional directions of the film can be controlled by selecting a suitable kind of a discotic liquid crystalline material to be used to change the shape of an intrinsic refractive ellipose or by changing anchoring conditions such as rubbing conditions or by the application of an external field such as an electric field or a magnetic field during orientation to control the tilt angle of the discotic liquid crystal molecules in the film.

The liquid crystal display to be compensated by the compensating film constituted by the liquid crystalline optical film of the present invention is a liquid crystal display having optical anisotropy, preferably a liquid crystal display having optical anisotropy and wherein the liquid crystal of the liquid crystal cell has a twist structure with a twist angle in the range of 40 to 360 degrees, preferably 60 to 300 degrees. As to the kind of the liquid crystal display, no special limitation is imposed thereon, but as examples are mentioned liquid crystal displays having a twisted nematic liquid crystal orientation such as a simple matrix type or an active matrix type of a TN (twisted nematic) liquid crystal display or an STN (super twisted nematic) liquid crystal display. As to the type of display system, there are direct seeing type, projection type and reflection type with respect to each of such liquid crystal displays.

The twist angle which the compensating film constituted by the liquid crystalline optical film of the invention should possess is largely dependent on the structure of the liquid crystal cell to be compensated. Generally, as to liquid crystal cells having a twist, there exist two types of modes—Normally White (NW) and Normally Black (NB)—. For example, in the state of non-selection, namely in the state in which many of liquid crystal molecules in a liquid crystal cell face in the intra-surface direction and the intra-surface retardation is maximum, white color is displayed in the NW mode, while black color is displayed in the NB mode. At this time, the twist angle of the liquid crystal cell sensed by transmitted light becomes the largest. On the other hand, in the state of selection, namely in the state in which the many of liquid crystal molecules face in the substrate normal line direction and the intra-surface retardation is minimum, black color is displayed in the NW mode, while white color is displayed in the NB mode. At this time, the twist angle of the liquid crystal cell sensed by transmitted light becomes miniumu.

For example, therefore, even when compensation is to be made in a black display state, the degree of twist to be compensated by the compensating film differs greatly between the NW mode with minimum twist and the NB mode with maximum twist. However, it is to be noted that the compensating film constituted by the liquid crystal optical film of the present invention can easily effect even such a wide range of twist angle compensation by selecting a suitable kind of a discotic liquid crystalline material and/or by suitably adjusting the content of an optically active compound in the said material or the concentration of optical active substituent groups.

Reference will now be made to the position where the compensation film according to the invention is to be disposed. The position of the compensating film is not specially limited if only it is located between two polarizing plates of a liquid crystal display. One or plural such compensating films may be disposed. In practical use it is desirable to use one or two such compensating films. Even in the use of three or more such compensating films there is obtained a compensating effect, but it leads to an increase of cost so cannot be said so preferable. Further, the compensating film of the invention may be combined with a conventional optical film, for example a film having a negative or positive uniaxial refractive structure. However, it is the compensating film of the invention that plays the most important role in attaining a compensating effect such as visual angle compensation. No matter how conventional optical films and compensators alone may be combined, it is impossible to obtain such an outstanding compensating effect as that attained by the compensating film of the present invention.

A liquid crystal display provided with one or plural compensating films according to the present invention contributes greatly to remedying the conventional contrast and color tone problem based on visual angle. For example, when it is intended to enlarge the display area, it is possible to markedly diminish the difference in quality between the central portion and the marginal portion of the display.

Thus, the compensating film for a liquid crystal display constituted by the liquid crystalline optical film of the present invention can substantially diminish the influence of refractive index anisotropy and twist on the visual angle and color tone in the liquid crystal display and can thereby contribute to the attainment of high performance and large area of the liquid crystal display, thus proving to be of an extremely high industrial value.

[EXAMPLES]

The following examples are given to further illustrate the present invention, but it is to be noted that the invention is not limited thereto. In the following examples were used analyzing methods, which are as follows.

(Determining Chemical Structure)

Determined by using 1 H-NMR of 400 MHz (JNM-GX400, a product of Japan Electron Optics Laboratory Co., Ltd.).

(Observation with Optical Microscope)

Orthoscope observation and conoscope observation were conducted using a polarizing microscope BX-50 (a product of Olympus Optical Co., Ltd.). The indentification of liquid crystal phase was made by texture observation under heating on a Mettler hot stage (FP-80).

(Polarization Analysis)

Conducted by using an ellipsometer DVA-36VWLD (a product of Mizojiri Kogaku Kogyosho Co.).

(Measurement of Refractive Index)

Conducted by using an Abbe's refractometer Type-4T (a product of Atago K.K.).

(Measurement of Film Thickness)

Conducted mainly by using a high-precision thin film step measuring instrument ET-10 (a product of Kosaka Kenkyusho K.K.).

There also was adopted a method of determining the film thickness from both interference wave measurement (Nippon spectrum, ultraviolet, visible, near infrared spectrophotometer V-570) and refractive index data.

(Visual Angle Characteristic)

Evaluation of contrast characteristic and that of visual angle characteristic in front of a liquid crystal display were conducted by using a color luminance meter BM-7 (a product of Topcon Co.).

(Analyzing Orientation Form of Film)

The orientation form of a liquid crystalline optical film according to the present invention was analyzed by the combination of the following measurement with simulation analysis.

First, an apparent retardation was determined by observation under a polarizing microscope using a Berek compensator.

Refractive indexes near the film interfaces were determined using an Abbe's refractometer. In this case, the measurement of a refractive index near the film interface on the air interface side was conducted after applying an iodomethane saturated solution of sulfur as an intermediate solution onto film. The measurement of a refractive index near the film interface on the rubbing interface side as made with an Abbe's refractomer using as substrate a high refractive index glass (refractive index: 1.84) which had been subjected on a certain surface treatment. From the resulting refractive index values at the interfaces and refractive index anisotropy it was presumed and determined in what state molecules are oriented near the interfaces.

As to an apparent twist angle, it was measured by observation under a polarizing microscope. In the case where the retardation per pitch (a film thickness necessary for each director to rotate 360°) was much smaller than the wavelength of visible light as a measuring light, the twist angle was determined on the basis of an azimuth angle of an extinction axis from a rubbing axis in the state of crossed Nicols. The "extinction axis" as referred to herein does not indicate the extinction axis in the strict sense, but means a direction in which the intensity of transmitted light provides a minimum value, not required to be zero. The extinction axis faces in a direction corresponding to a turned direction of the rubbing axis by the said azimuth angle and lies on the same plane as the rubbing axis. In this connection, when there is formed such a twisted orientation as structure A (FIG. 4) or structure B (FIG. 5), the extinction axis appears at an angle of approximately half of the actual twist angle.

In the case where such a twisted orientation as structure C (FIG. 6), structure D (FIG. 7) or structure E (FIG. 8), the relation between the extinction axis and the actual twist angle differs depending on in which of a large tilt angle portion and a small tilt angle portion the twist is more conspicuous. When the twist is conspicuous in the small tilt angle portion, namely in a portion of less influence on retardation, and is not so conspicuous in the large tilt angle portion, the actual twist angle and the azimuth angle of the extinction axis become almost equal to each other. On the contrary, when the twist is not so conspicuous in the small tilt angle portion and is conspicuous in the large tilt angle portion, the twist angle becomes about twice as large as the azimuth angle of the extinction axis. In which of the large tilt angle and small tilt angle areas the twist is more conspicuous can be judged by preparing various samples different in the concentration of optically active substituent gorups, then measuring respective apparent retardations and observing changes in the apparent retardation according to concentrations of optically active substituents. More particularly, when twist is more conspicuous in a large tilt angle portion, retardations are averaged in the film thickness direction and become small because the intra-surface anisotropy is cancelled by the twist. Conversely, when twist is more conspicuous in a small tilt angle portion, there will be little change in retardation caused by the twist. From the results thus obtained it is possible to judge in which area the twist is conspicuous.

In the case where the retardation per pitch was approximately equal to or larger than the wavelength of visible light as a measuring light, the twist angle was determined by making the rubbing axis and the lower polarizing plate axis coincident with each other and changing the angle of the upper polarizing plate axis. In this case, even by using the waveguide method it is possible to determine twist angle and retardation.

For more accurate analysis of retardation, twist angle and orientation form in the film interior there was conducted a polarization analysis of exit light while the incidence angle, azimuth angle and elliptic ratio of incident polarization were varied. Detailed analysis was made by collating the results obtained with the results of calculation based on simulation according to Berreman's 4×4 matrix method [D. W. Berreman, Phys. Revc. Lett., 28, 1683 (1972)] or Jones extension matrix method [P. Yeh, J. Opt. Soc. Am., 72, 507 (1982)].

Preparation of Discotic Liquid Crystalline Compound

Optical purities of optically active compounds used in the following preparation of liquid crystalline compounds are all not lower than 99%.

(Preparation 1)

5 mmol of 2,3,6,7,10,11-hexaacetoxytriphenylene and 30 mmol of 4-((R)-1-methylheptyloxy)benzoic acid were stirred vigorously in a nitrogen atmosphere within a glass flask and in this state there was performed a deacetation reaction at 250° C. for 8 hours to afford hexakis ((R)-1-methylheptyloxybenzoyloxy) triphenylene (liquid crystal compound 1).

(Preparation 2)

40 mmol of 3,4-bis((R)-(2-methylbutoxy))benzoic acid chloride prepared from both 3,4-bis((R)-(2-methylbutoxy))benzoic acid and thionyl chloride and 5 mmol of 1,2,5,6,8,9,12,13-octahydroxydibenzo[fg,op]naphthacene were mixed together in 200 ml of pyridine and were allowed to react at room temperature for 4 hours and at 100° C. for 8 hours. Then, the solvent was distilled off under a reduced pressure by means of an evaporator. Thereafter, 200 ml of 1N hydrochloric acid was added and extraction was performed with two 200 ml of portions of ethyl acetate. The organic layer was washed with saturated aqueous sodium bicarbonate and then with saturated aqueous sodium chloride, thereafter dried with anhydrous magnesium sulfate. The solvent was distilled off, followed by purification by flash-column chromatography to yield octakis(bis((R)-(2-methylbutoxy)benzoyl)dibenzo[fg,op]naphthacene (liquid crystalline compound 2).

(Preparation 3)

Using 5.5 mmol of 2,3,6,7,10,11-hexaacetoxytruxene 1 mmol of 1,3,5-triacetoxybenzene and 30 mmol of 4-((R)-1-methylheptyloxy)cinnamic acid, the same operations as in Preparation 1 were conducted to afford (liquid crystalline compound 3).

(Preparation 4)

Using 5 mmol of 2,3,6,7,10,11-hexaacetoxytriphenylene, 15 mmol of 6-hexyloxy-2-naphthoic acid and 15 mmol of 4-pentyloxybenzoic acid, the same operations as in Preparation 1 were conducted to afford (liquid crystalline compound 4) not having any optically active group.

(Preparation 5)

Using 5 mmol of 1,2,5,6,8,9,12,13-octaacetoxydibenzo[fg, op]naphthacene, 8-mmol of 4'-heptyloxy[1,1'-biphenyl]-4-carboxylic acid, 30 mmol of 4-hexyloxybenzoic acid, and 2 mmol of stearic acid, the same operations as in Preparation 1 were conducted to afford (liquid crystalline compound 5) not having any optically active group.

(Preparation 6)

Using 5 mmol of 2,3,6,7,10,11-hexaacetoxytriphenylene, 3 mmol of 4-((R)-1-methylheptyloxy)benzoic acid, 15 mmol of 4-heptyloxybenzoic acid, and 12 mmol of 4-butoxybenzoic acid, the same operations as in Preparation 1 were conducted to afford (liquid crystalline compound 7).

(Preparation 7)

5 mmol of 2,3,6,7,10,11-hexaacetoxytriphenylene, 27 mmol of 3,4-bis(pentyloxy)benzoic acid and 1.5 mmol of 4,4'-(CR)-3-methylhexane-1,6-diylbis(oxy))bisbenzoic acid which is a bifunctional side cchain component, the same operations as in Preparation I were conducted to afford (liquid crystalline compound 7).

(Preparation 8)

Using 5 mmol of 2,3,6,7,10,11-hexaacetoxytriphenylene, 10 mmol of 4-((-)-methyloxy)benzoic acid and 20 mmol of 4-hexyloxyphenylbenzoic acid, the same operations as in Preparation 1 were conducted to afford (liquid crystalline compound 8).

(Preparation 9)

5 mmol of 2,3,6,7,10,11-hexaacetoxytriphenylene, and 30 mmol of 4-((s)-1-methylheptyloxy)benzoic acid were stirred vigorously in a nitrogen atmosphere within a glass flask and in this state there was performed a deacetation reaction at 250° C. for 8 hours to yield hexakis ((SR)-methylheptyloxybenzoyloxy)triphenylene (liquid crystalline compound 9).

(Preparation 10)

Using 5 mmol of 2,3,6,7,10,11-hexaacetoxytriphenylene, 17.5 mmol of 4-butoxybenzoic acid and 12.5 mmol of 4-heptyloxybenzoic acid, the same operations as in Preparation 1 were performed to yield (liquid crystalline compound 10) not having any optically active substituent group.

(Preparation 11)

8 parts of the liquid crystalline compound 4 and 2 parts of the liquid crystalline compound 10 were mixed together to yield (liquid crystalline compound 11) not having any optically active substituent group.

Example 1

3 parts of the liquid crystalline compound 2 and 7 parts of the liquid crystalline compound 5 were mixed together to prepare a solution of a discotic liquid crystalline material having an optically active substituent group concentration of 30 mol% in phenol/tetrachloroethane (60/40 weight ratio) in such a manner as to give a liquid crystalline material concentration of 10 wt%. Then, using a screen printer, the solution was cast onto a high refractive glass substrate having a size of 150 mm×230 mm, a thickness of 1 mm, and having a film formed by sputtering of $SiO_2$ on the surface, then dried, heat-treated ata 230° C. for 30 minutes and thereafter cooled to afford a tansparent, liquid crystalline optical film 1 having a fixed, uniform monodomain structure.

As a result of measurement according to the wave guide method involving polarization analysis, the twist angle and retardation of the film were found to be −240° (right-hand twist) and 817 nm, respectively. Refractive indexes of the film near the glass substrate interface were 1.66 in the direction perpendicular to the sputtering direction and 1.56 in the sputtering direction. Refractive indexes of the film near the air interface were 1.66 in a −240° twisted direction with respect to the direction perpendicular to the sputtering direction and 1.56 in the direction perpendicular thereto. Since the results obtained are almost coincident with the refractive index anisotropy inherent in the liquid crystalline material, it turned out that the tilt angle of molecules ain the vicinity of both interfaces was approximately 90° . From these measurement results and the results of more detailed analysis it turned out that an average tilt angle of the film was about 90° and that there was formed such an orientation form as the structure A of FIG. 4. Using the film as a compensating film, the glass substrate surface was laminated to the upper substrate of a liquid crystal cell to fabricate a liquid crystal display, which was then evaluated for visual angle characteristic.

Figure 10:
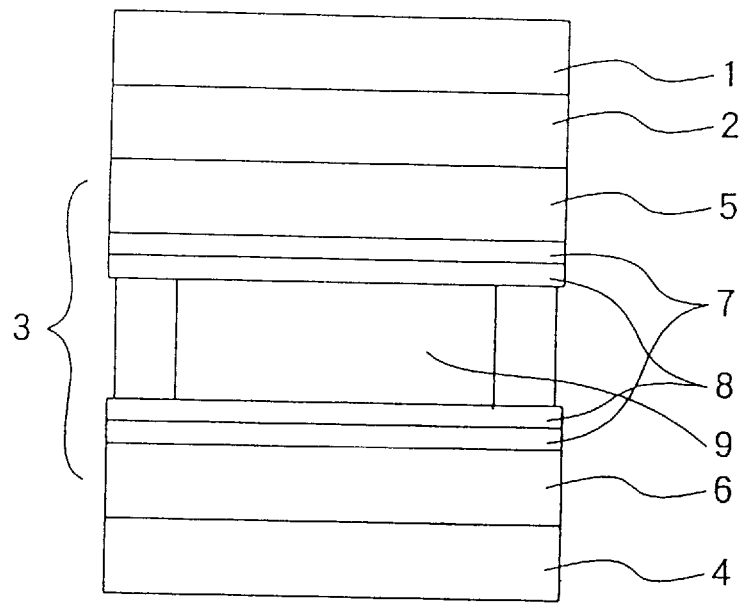
FIG. 10 is a construction diagram of the liquid crystal display obtained in Example 1, in which
1: upper polarizing plate
2: compensating film (film 1)
3: liquid crystal cell
4: lower polarizing plate
5: upper substrate of the liquid crystal cell
6: lower substrate of the liquid crystal cell
7: transparent electrode
8: orienting film
9: nematic liquid crystal
Figure 11:
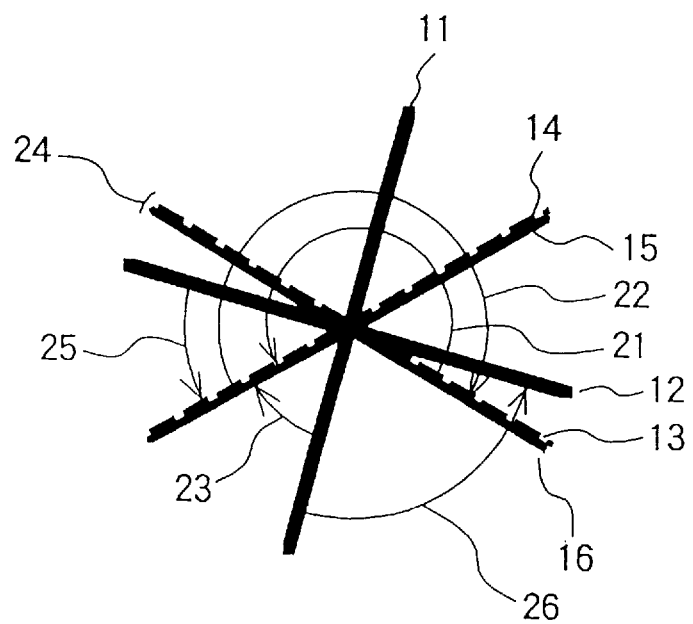
FIG. 11 illustrates an axial arrangement of components of the liquid crystal display obtained in Example 1, in which
11: absorption axis of the upper polarizing plate
12: absorption axis of the lower polarizing plate
13: orientation direction of liquid crystal in the upper substrate of the liquid crystal cell
14: orientation direction of liquid crystal in the lower substrate of the liquid crystal cell
15: orientation direction of liquid crystal molecules in the compensating film on the side where the compensating film and the upper polarizing plate are in contact with each other
16: orientation direction of liquid crystal molecules in the compensating film on the side where the compensating film and the liquid crystal cell are in contact with each other
21: twist angle of the liquid crystal cell determined from 13 and 14
22: twist angle of the compensating film determined from 15 and 16
23: angle between 11 and 15
24: angle between 13 and 16
25: angle between 12 and 14
26: angle between 11 and 12

The liquid crystal display thus obtained, as shown in FIG. 10, comprises an upper polarizing plate 1, the compensating film, indicated at 2, a liquid crystal cell, a lower substrate 6 of the liquid crystal cell, a transparent electrode 7, an orienting film 8, and a nematic liquid crystal 9. FIG. 11 illustrates an axial arrangement of these components. As in the same figure, if an absorption axis of the upper polaraizing plate is 11, that of the lower polarizing plate 12, the orientation direction of liquid crystal in the upper substrate of the liquid crystal cell is 13, the orientation direction of liquid crystal in the lower substrate of the liquid crystal cell is 14, the orientation direction of liquid crystal molecules in the compensating film on the side where the compensating film is in contact with the upper polarizing plate is 15, the orientation direction of liquid crystal molecules in the compensating film on the side where the compensating film is in contact with the liquid crystal cell is 16, the twist angle of the liquid crystal cell determined from 13 and 14 is 21, the twist angle of the compensating film determined from 15 and 16 is 22, the angle between 11 and 15 is 23, the angle between 13 and 16 is 24, the angle between 12 and 14 is 25, and the angle between 11 and 12 is 26, then the angles 21, 22, 23, 24, 25 and 26 are set at 240°, −240°, 45°, 0°, 45° and 90°, respectively. As the nematic liquid crystal 9 was used one obtained by adding a chiral dopant CB-15 (a product of BDH Co.) to a liquid crystal ZLI-2293 (a product of Merck Co.). The cell used had a cell gap of 6.2 $\mu$m, and a polyimide film was used as the orienting film 8, allowing a homogeneous orientation to take place at a pretilt angle of about 3°.

Figure 13:
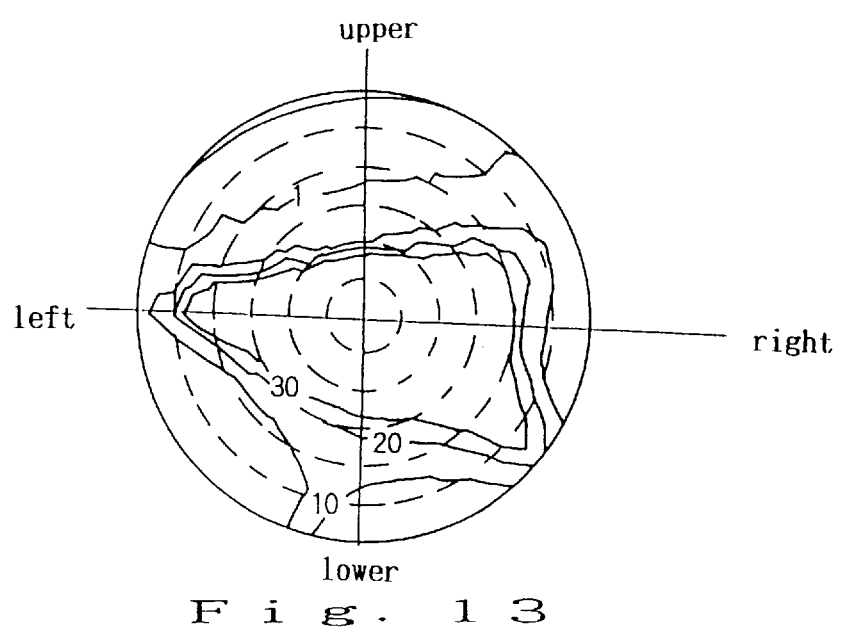
FIG. 13 illustrates a visual angle characteristic using the compensating film prepared in Example 1.

A drive voltage of 1/240 duty, 1/15 bias and 100 Hz frame frequency was applied to the liquid crystal display, and a visual angle characteristic was evaluated at a drive voltage which provided the maximum contrast when the liquid crystal display was observed from the front. FIG. 13 shows a visual angle characteristic of the liquid crystal display. When this visual angle characteristic is compared with that of a liquid crystal display using a conventional compensating film, it is seen that there is a right-and-left extent of not less than 20 degrees at an equicontrast curve of 30:1. Also in the vertical direction there is recognized a characteristic equal or even superior to the conventional product. It is seen that the visual angle characteristic is expanded as a whole.

Example 2

4 parts of the liquid crystalline compound 1, 4 parts of the liquid crystalline compound 3, 17 parts of the liquid crystalline compound 4 and 5 parts of the liquid crystalline compound 7 were mixed together to prepare a solution of a discotic liquid crystalline material (concentration of optically active substituent groups: 2.0 mol%) in phenol/tetrachloroethane (60/40 weight ratio) so as to give a liquid crystalline material concentration of 10 wt%. The solution was then applied by a spin coating method onto a glass substrate having a size of 50 mm×50 mm, a thickness of 1 mm, and having a film formed by sputtering of $SiO_2$ on the surface, then dried, heat-treated at 240° C. for 20 minutes while a magnetic field of 2 KG was applied in the direction parallel to the substrate, and subsequently cooled to fix a uniform monodomain structure, thereby affording a tansparent liquid crystalline optical film 2. From measurement results obtained by the waveguide method it turned out that the twist angle and retardation of the film were −120° (right-hand twist) and 410 nm, respectively. Further, as a result of refractive index measurement conducted in the same way as in Example 1, tilt angles at both interfaces were found to be approximately 90° at the glass substrate surface and approximately 80° at the air interface.

To check the orientation form of the film in more detail there was prepared a film for comparison purpose by performing the same operations as in the above experiment with the exception that the magnetic field was not used. As to the tilt angle at both interfaces and retardation of the comparative film, the values obtained were approximately 90° and 510 nm, respectively. The retardation of the film prepared above under the application of a magnetic field was as small as 410 nm despite the other conditions were almost the same. From this fact it was suggested that the tilt angle of liquid crystal molecules increased in the interior of the film of this Example had such a structure of FIG. 7 (structure D) though tilt angles at the upper and lower surfaces were somewhat different from each other. A more detailed polarization analysis showed that the film of this Example had such an orientation form as illustrated in FIG. 7 (structure D).

Figure 14:
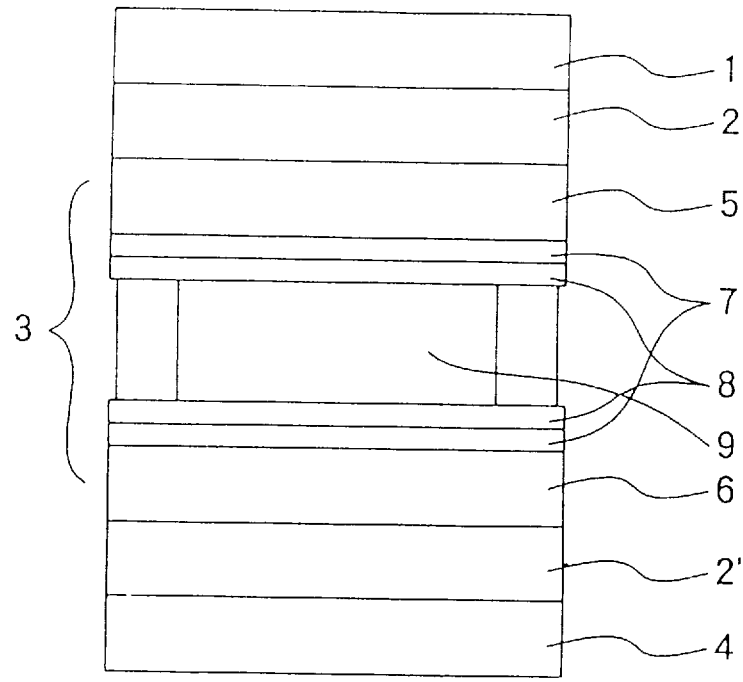
FIG. 14 is a construction diagram of the liquid crystal display obtained in Example 2, in which
1: upper polarizing plate
2: upper compensating film (film 2)
2': lower compensating film (film 3)
3: liquid crystal cell
4: lower polarizing plate 5: upper substrate of the liquid crystal cell
6: lower substrate of the liquid crystal cell
7: transparent electrode
8: orienting film
9: nematic liquid crystal
Figure 15:
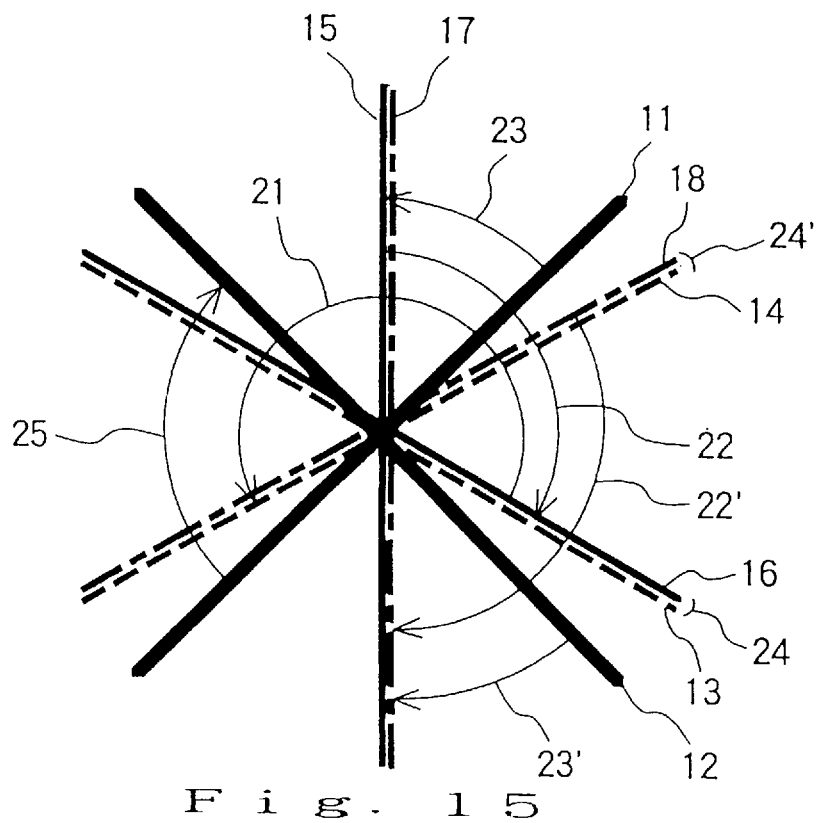
FIG. 15 illustrates an axial arrangement of the liquid crystal display obtained in Example 2, in which 11: absorption axis of the upper polarizing plate
12: absorption axis of the lower polarizing plate
13: orientation direction of liquid crystal in the upper substrate of the liquid crystal cell
14: orientation direction of liquid crystal in the lower substrate of the liquid crystal cell
15: orientation direction of liquid crystal molecules in the upper compensating film on the side where the upper compensating film and the upper polarizing plate are in contact with each other
16: orientation direction of liquid crystal molecules in the upper compensating film on the side where the upper compensating film and the liquid crystal cell are in contact with each other
17: orientation direction of liquid crystal molecules in the lower compensating film on the side where the lower compensating film and the lower polarizing plate are in contact with each other
18: orientation direction of liquid crystal molecules in the lower compensating film on the side where the lower compensating film and the liquid crystal cell are in contact with each other
21: twist angle of the liquid crystal cell determined from 13 and 14
22: twist angle of the compensating film determined from 15 and 16
23: angle between 11 and 15
23': angle between 12 and 17
24: angle between 13 and 16
24': angle between 14 and 18
25: angle between 11 and 12

Next, using the film of this Example as a compensating film, the glass substrate and a liquid crystal cell were laminated together so that a glass substrate surface and a cell substrate were in contact with each other at each of both upper and lower surfaces of the liquid crystal cell, and the resultant liquid crystal display was evaluated for visual angle characteristic. As shown in FIG. 14, the liquid crystal display comprises an upper polarizing plate 1, an upper compensating film 2, a liquid crystal cell 3, a lower compensating film 2', a lower polarizing plate 4, an upper substrate 5 of the liquid crystal cell, a lower substrate 6 of the same cell, a transparent electrode 7, an orienting film 3, and a nematic liquid crystal 9. FIG. 15 is illustrates an axial arrangement of these components. As in the same figure, if an absorption axis of the upper polarizing plate is 11, an absorption axis of the lower polarizing plate is 12, the orientation direction of liquid crystal in the upper substrate of the liquid crystal cell is 13, the orientation direction of liquid crystal in the lower substrate of the liquid crystal cell is 14, the orientation direction of liquid crystal molecules in the upper compensating film on the side where the compensating film and the upper polarizing plate are in contact with each other is 15, the orientation direction of liquid crystal molecules in the upper compensating film on the side where the upper compensating film and the liquid crystal cell are in contact with each other is 16, the orientation direction of liquid crystal molecules in the lower compensating film on the side where the lower compensating film and the lower polarizing plate are in contact with each other is 17, the orientation direction of liquid crystal molecules in the lower compensating film on the side where the lower compensating film and the liquid crystal cell are in contact with each other is 18, the twist angle of the liquid crystal cell determined from 13 and 14 is 21, the twist angle of the compensating film determined from 15 and 16 is 22, the twist angle of the compensating film determined from 17 and 18 is 22', the angle between 11 and 15 is 23, the angle between 13 and 16 is 24, the angle between 12 and 17 is 23', the angle between 14 and 18 is 24', and the angle between 11 and 12 is 25, then the angles 21, 22, 22', 23, 23', 24 and 25 are set at 240°, −120°, −120°,45°, 45°, 0° and 90°, respectively. As the nematic liquid crystal 9 was used one obtained by adding a chiral dopant CB-15 (a product of BDH Co.) to a liquid crystal ZLI-2293 (a product of Merck Co.). The cell used had a cell gap of 6.2 $\mu$m, and a polyimide film was used as the orienting film 8, allowing a homogeneous orientation to take place at a pretilt angle of about 3°.

Figure 12:
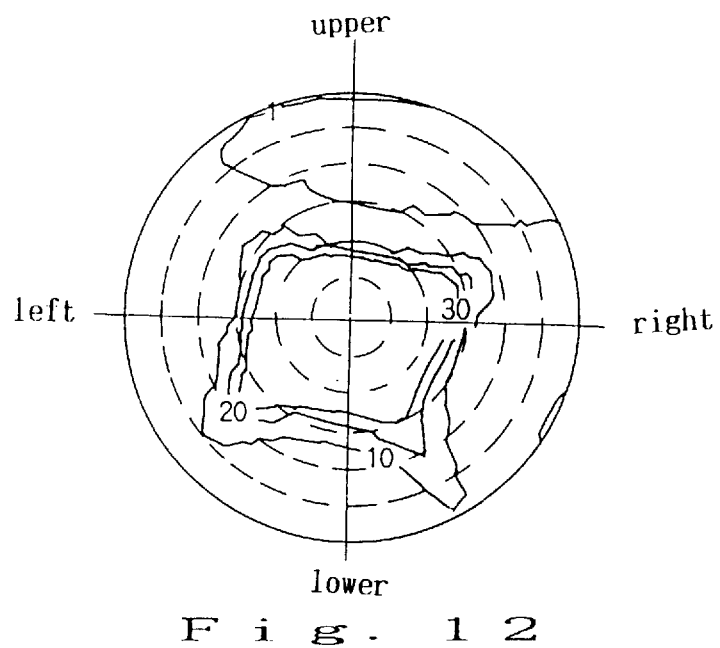
FIG. 12 illustrates a visual angle characteristic using a conventional compensating film.
Figure 16:
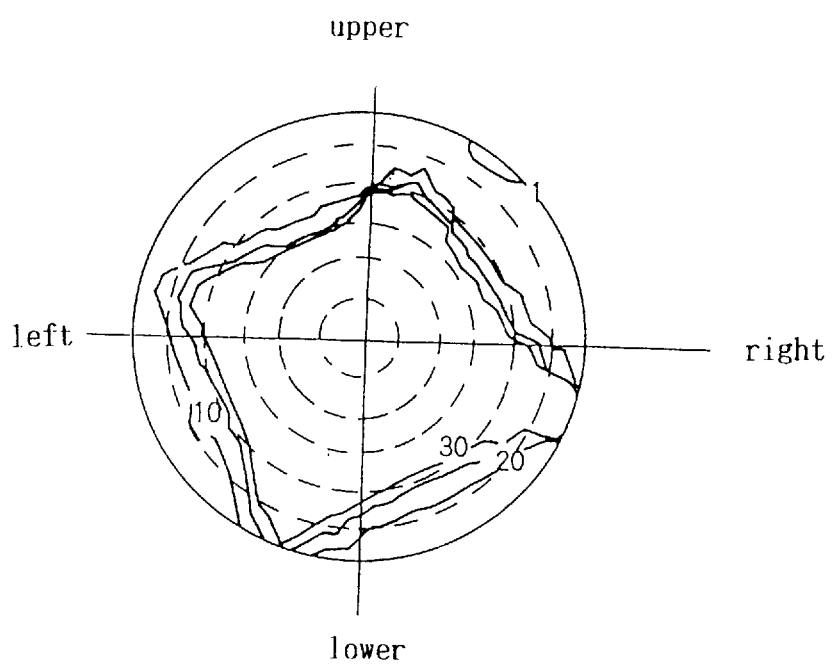
FIG. 16 illustrates a visual angle characteristic obtained by using the compensating film prepared in Example 2.

A drive voltage of 1/240 duty, 1/15 bias and 100 Hz frame frequency was applied to the liquid crystal display, and a visual angle characteristic was evaluated at a drive voltage which provided the maximum contrast when the liquid crystal display was observed from the front. The result of the evaluation is as shown in FIG. 16. When this is compared with the visual angle characteristic obtained by using a conventional compensating film which is shown in FIG. 12, it is seen that there is an extent of not less than 30 degrees in both vertical and transverse directons at an equicontrast curve of 30:1. It is also seen that in the liquid crystal display obtained in this Example, the area of 1:1 or less in contrast ratio, namely inversion area, which was obsrved conventional product, is decreased markedly and the visual angle characteristic is expanded to a large extent.

Example 3

20 parts of the liquid crystalline compound 4, 0.5 parts of the liquid crystalline compound 6, and 0.5 parts of the liquid crystalline compound 8 were dissolved in chloroform to prepare a solution of a discotic liquid crystalline material (concentration of optically active substituent groups: 1.0 mol%) having a concentration of the liquid crystalline material 8 wt%. The solution was then applied onto a glass substrate of 15 cm×15 cm, having a polyimide film which had been subjected to a rubbing treatment, by a spin coating method. Then, the glass substrate with the solution applied thereto was dried on a hot plate of 45° C., heat-treated in an oven at 220° C. for 15 minutes, and thereafter taken out into an atmosphere held at room temperature for cooling, to afford a tansparent, 1.1 μm thick, liquid crystalline optical film 3 on the substrate.

As a result of refractive index measurement at both interfaces and polarization analysis conducted in the same way as in Examples 1 and 2 it turned out that the orientation form of the film had such twist structure and hybrid structure as shown in FIG. 8 (structure E) wherein the director direction changes in the film thickness direction. When the film was seen from the front, retardation, in appearance, was 30 nm and the angles between the directors of liquid crystal and the film normal line were about 90° at the air interface and about 0° at the rubbed polimide glass substrate interface. In appearance, moreover, the twist was right-hand 12°, and lag axes were in a direction perpendicular to the rubbing direction at the rubbed polyimide glass interface and in a direction turned 12° from that direction on the air interface side.

Figure 17A:
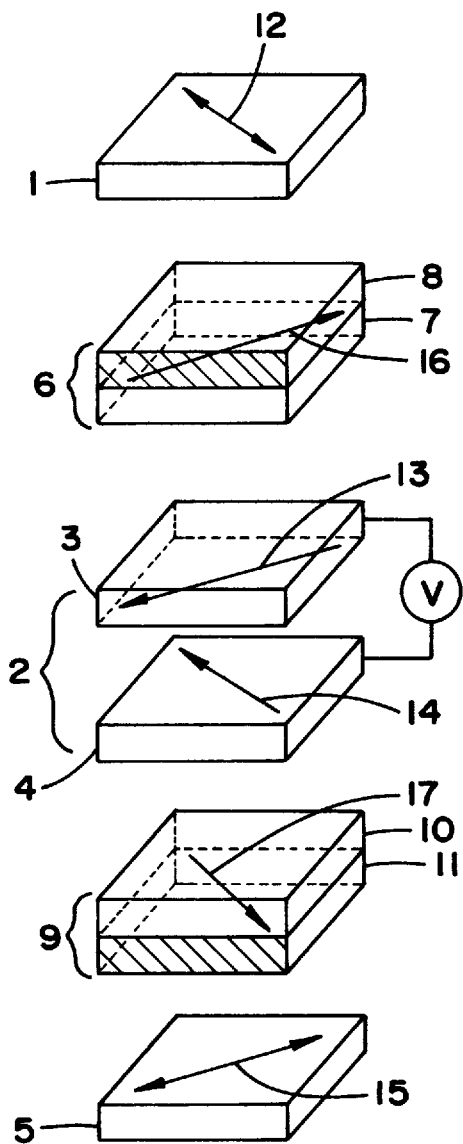
FIG. 17(a) is a perspective view of the liquid crystal display obtained in Example 3, and (b) illustrates an axial arrangement of components of the liquid crystal display in which 1: upper polarizing plate
2: TN liquid crystal cell
3: upper electrode substrate having a rubbing-treated polyimide film
4: lower electrode substrate having a rubbing-treated polyimide film
5: lower polarizing plate
6: compensating film on a transparent substrate
7: compensating film (film 3)
8: substrate (glass substrate having a rubbing-treated polyimide film
9: compensating film on a transparent substrate
10: compensating film (film 3)
11: substrate (glass substrate having a rubbing-treated polyimide film
12: transmission axis of the upper polarizing plate
13: rubbing direction of the upper electrode substrate
14: rubbing direction of the lower electrode substrate
15: transmission axis of the lower polarizing plate
16: substrate rubbing direction
17: substrate rubbing direction FIG. 18 illustrates a visual angle characteristic obtained in Example 3 (an equicontrast curve of contrast 30), in which (a) is without compensator (without members 6 and 9 in FIG. 14), and
(b) is with compensator.
Figure 17B:
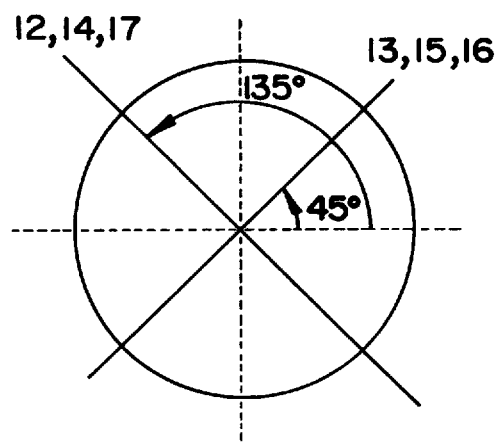
Figure 18A:
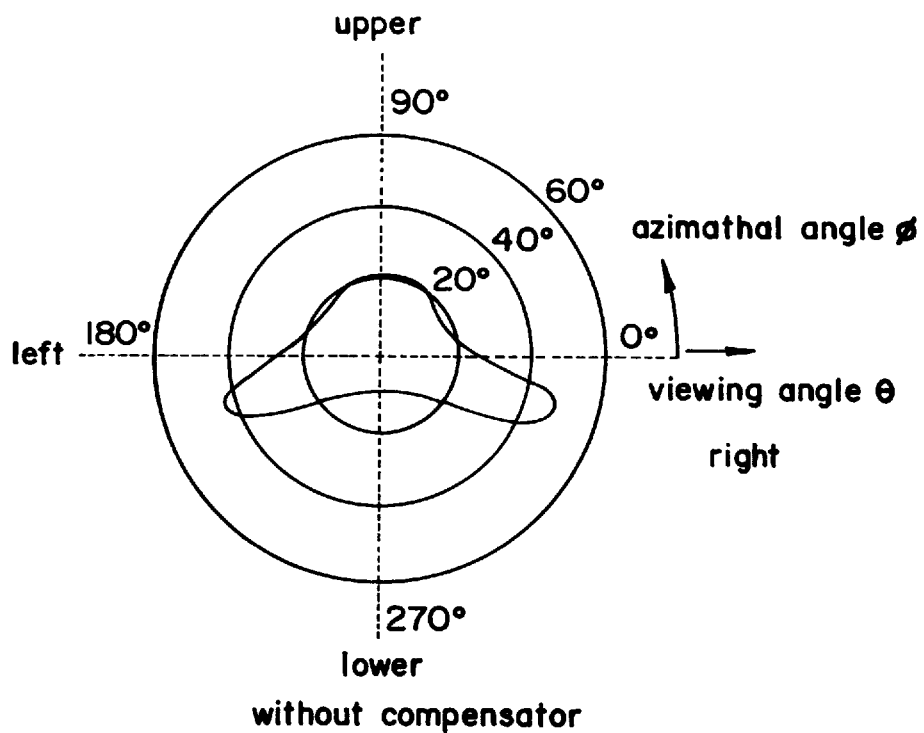
Figure 18B:
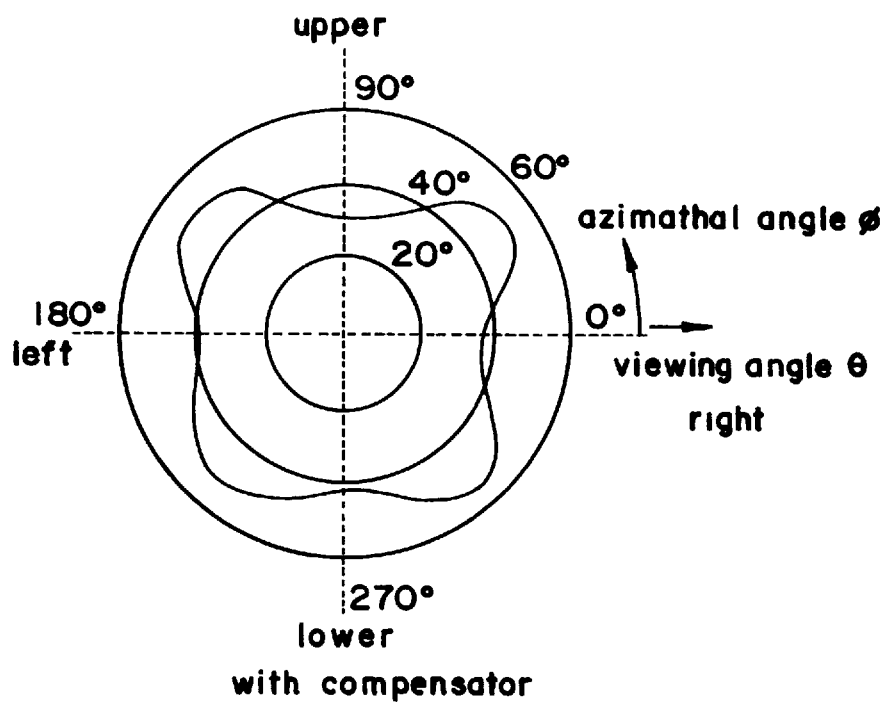

Then, using two sheets of the film and using such a construction as illustrated in FIG. 17(*a*) and (*b*), there was checked a viewing angle compensating effect for a TN liquid crystal cell at NW mode. The TN liquid crystal cell was fabricated by first putting two ITO electrode substrates each having a rubbing-treated polyimide film one upon the other so as to be orthogonal to each other in the respective rubbing directions and form a gap of 4.7 μm and then sandwitching therebetween a liquid crystal ZLI-3771 (a product of Merck Co.) with a small amount of CB-15 (a product of BDH Co.) incorporated therein. The liquid crystal cell thus fabricated had a left-hand twist of 90° and a retardation of 490 nm in the absence of voltage. As a result of binary display using drive voltages of 2 V and 6 V a large extent of visula angle could be confirmed by the use of the film obtained in this Example, as shown in FIG. 18.

Example 4

20 parts of the liquid crystalline compound 4, 1 part of the liquid crystalline compound 6, and 0.5 part of the liquid crystalline compound 8 were dissolved in butyl cellosolve to prepare a solution of a discotic liquid crystalline material (concentration of optically active substituent groups: 1.3 mol%) having a liquid crystalline material concentration of 30 wt%. Then, using a roll coater, the solution was applied 10 cm onto a rubbing-treated 25 cm wide polyimide film (obtained by rubbing a 100 m thick "kapton" film of Du Pont), then dried with hot air at 70° C., heat-treated ata 250° C. for 2 minutes and thereafter cooled to fix the liquid crystal phase. In this way there was obtained a 4.1 μm thick, liquid crystalline, optical film 4 on the rubbing-treated polyimide film.

Next, since the polyimide film lacks transparency and involves a problem in its application to display, the liquid crystalline optical film was transferred onto a polyether sulfone of an optical grade through a pressure-sensitive adhesive. The transfer was effected by laminating the polyether sulfone which had been treated for pressure-sensitive adhesion and the film 4 on the rubbing-treated polyimide film to each other in such a manner that the pressure-sensitive adhesive layer and the film 4 came into contact with each other and subsequently peeling the rubbing-treated polyimide film.

As a result of such refractive index measuremnt at both interfaces and polarization analysis as in the previous Examples it turned out that the film 4 on the polyether sulfone having the pressure-sensitive adhesive layer had such twist structure and hybrid structure as shown in FIG. 8 (structure E) wherein the director direction changes in the film thickness direction. When the film was seen from the front, retardation, in appearance, was 240 nm and the angles betweenthe directors of liquid crystal and the film normal line were about 30° at the air interface and about 90° at the pressure-sensitive adhesive layer interface. In appearance, moreover, the twist was right-hand, 45°, and a lag axis, at the air interface, was in a direction perpendicular to the direction corresponding to the rubbing direction of the rubbing-treated polyimide film before peeling, while at the pressure-sensitive adhesive layer interface it was in a direction turned 45° from that direction.

Figure 20:
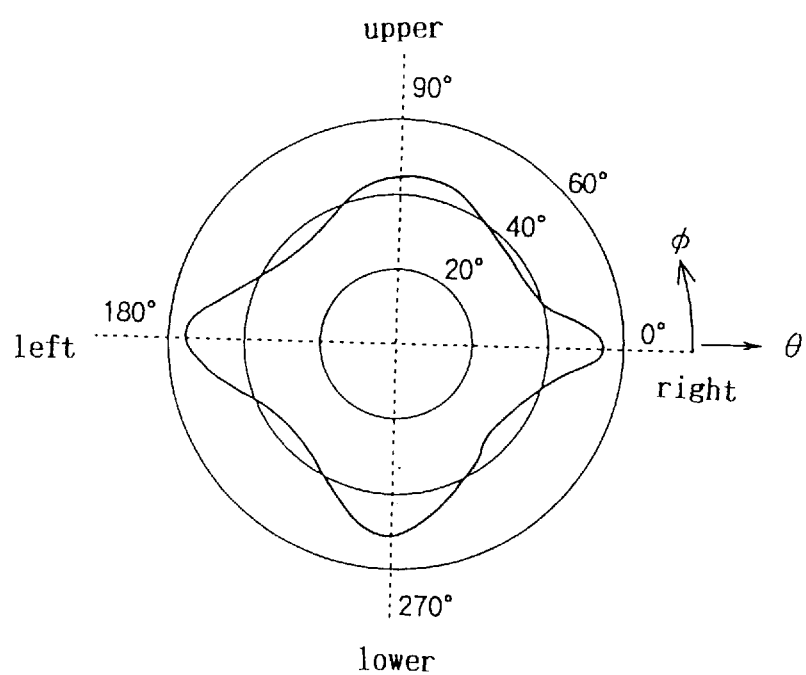
FIG. 20 illustrates a visual angle characteristic obtained in Example 4 (an equicontrast curve of contrast 30)

Then, using two sheets of the film thus formed and making such an arrangement as in FIG. 19 for the TN cell used in Example 3, there was prepared a liquid crystal display of the normally black mode. When a binary display was made at drive voltages of 2 V and 6 V, there were obtained a complete black display free of coloration at 2 V and a white display at 6 V. Further, there was obtained such a wide visual angle of display as shown in FIG. 20.

Example 5

The liquid crystalline compounds 1 and 11 were mixed together so as to give optically active substituent concentrations of 0.25, 0.5, 0.75, 1.0, 1.5, 2.0, 2.5, 3.0, 4.0 and 5.0 to prepare 15% solutions of discotic liquid crystalline material respectively having the said substituent concentrations in butyl cellosolve. The solutions of the ten concentrations were then each applied onto a glass plate having a rubbing-treated polyimide film on the surface thereof so as to give film thicknesses of 0.8 μm, 1.0 μm and 1.4 μm after heat treatment by a spin coating method. After subsequent drying at 80° C. for 30 minutes, heat treatment was conducted at 220° C. for 15 minutes to afford a liquid crystalline optical film. All of the films prepared in this way were highly transparent and had a monodomain structure.

The films were then checked for retardation by a method using a Berek compensator. As a result, their retardations were bout 30 nm, about 35 nm and about 50 nm at film thicknesses of 0.8 m, 1.0 m and 1.4 m, respectively. There was recognized no significatn change based on the difference in the optically active substituent concentration. From this fact, it was presumed that the twist was conspicuous mainly in a small tilt angle portion, while in a large tilt angle portion the twist was not so conspicuous. Thus, it turned out that the twist angle was almost equal to the azimuth angle of extinction axis.

Figure 21:
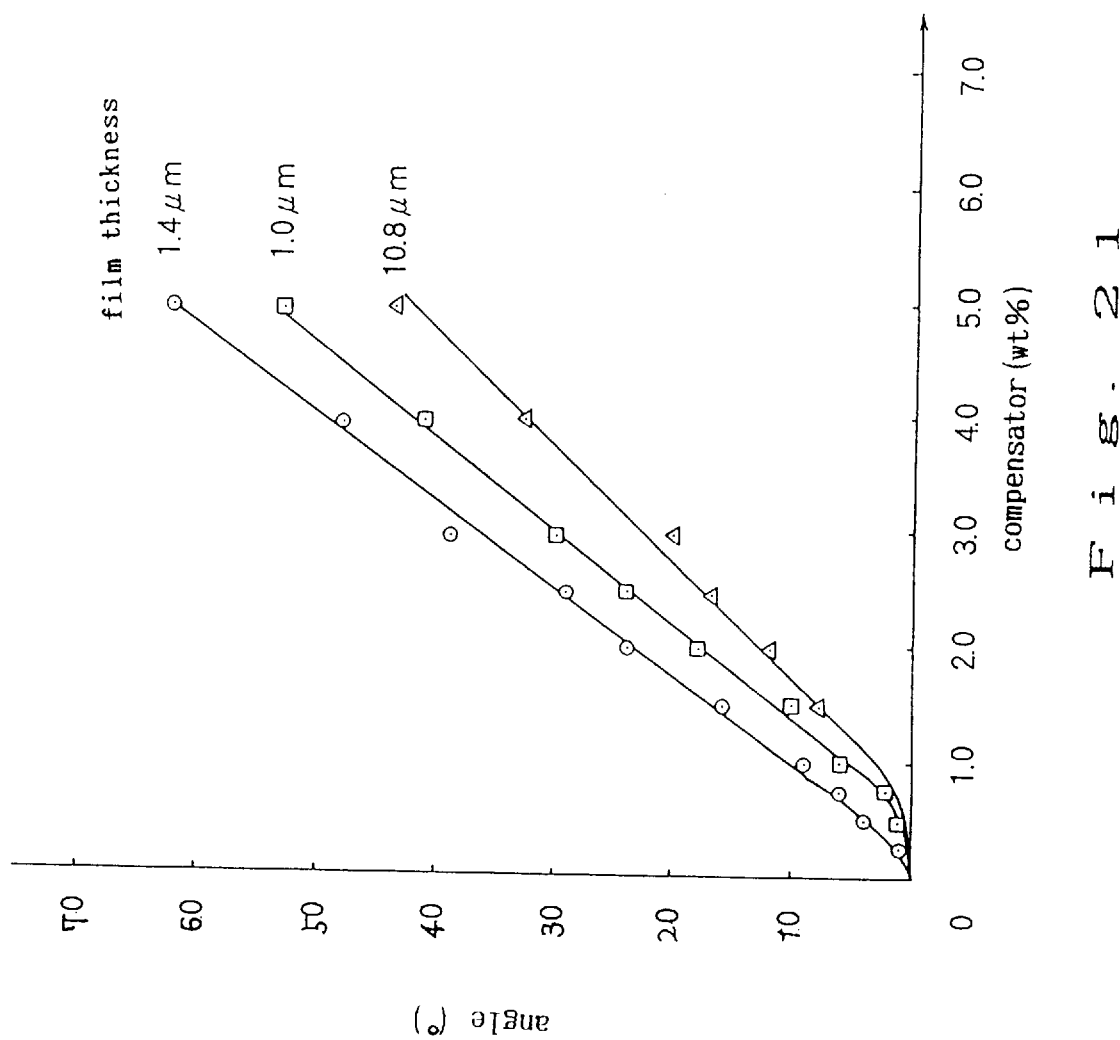
FIG. 21 illustrates a relation between the concentration of optically active substituent groups and an apparent twist angle.

With respect to each of the films, thickness was determined by the interference method, and twist angle was determined by measuring the azimuth of extinction axis relative to the rubbing axis. FIG. 21 shows a relation between the concentration of optically active substituent groups and an apparent twist angle. From the same figure it is seen that the twist angle increases as the said concentration and film thickness increase. All the twist were right-hand twist.

Substituting the liquid crystalline compound 1 by the liquid crystalline compound 9 as an enantiomer thereof, there were prepared 15% solutions of ten kinds of liquid crystalline materials having different concentrations of optically active substituent groups in butyl cellosolve, and the same experiment as above was conducted. The results obtained were almost the same as above except that the direction of twist was left-hand.

The refractive indexes on the glass surface side of the films prepared above were all about 1.66 in both rubbing direction and a direction perpendicular to the rubbing direction, with anisotropy not recognized. This indicates that the tilt angle of each film is approximately 0°. On the other hand, the refractive indexes at the air interface of the films were all about 1.66 in a direction turned by the twist angle of each film and about 1.56 in a direction perpendicular thereto, and as a result of detailed analysis the tilt angle of each film at the said interface was found to be approximately 90°. Thus, it is evident that all the films have such a twist orientation as FIG. 8 (structure E).

Figure 22A:
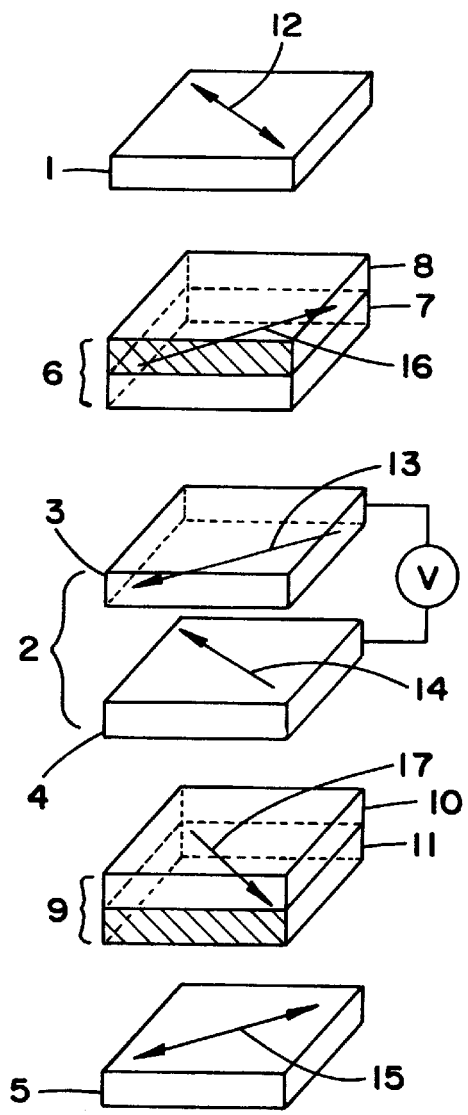
FIG. 22(a) is a perspective view of the liquid crystal display obtained in Example 5, and (b) illustrates an axial arrangement of components of the liquid crystal display in which 1: upper polarizing plate
2: TN liquid crystal cell
3: upper electrode substrate having a rubbing-treated polyimide film
4: lower electrode substrate having a rubbing-treated polyimide film
5: lower polarizing plate
6: compensating film on a transparent substrate
7: compensating film
8: transparent substrate (glass substrate having a rubbing-treated polyimide film)
9: compensating film on a transparent substrate
10: compensating film
11: transparent substrate (glass substrate having a rubbing-treated polyimide film)
12: transmission axis of the upper polarizing plate 13: rubbing direction of the upper electrode substrate 14: rubbing direction of the lower electrode substrate 15: transmission axis of the lower polarizing plate 16: compensating film extinction axis 17: compensating film extinction axis.
Figure 22B:
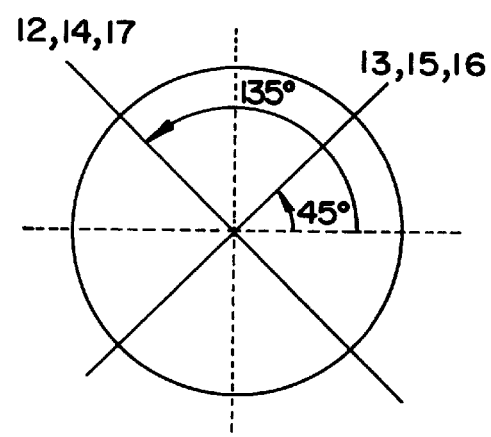
Figure 23:
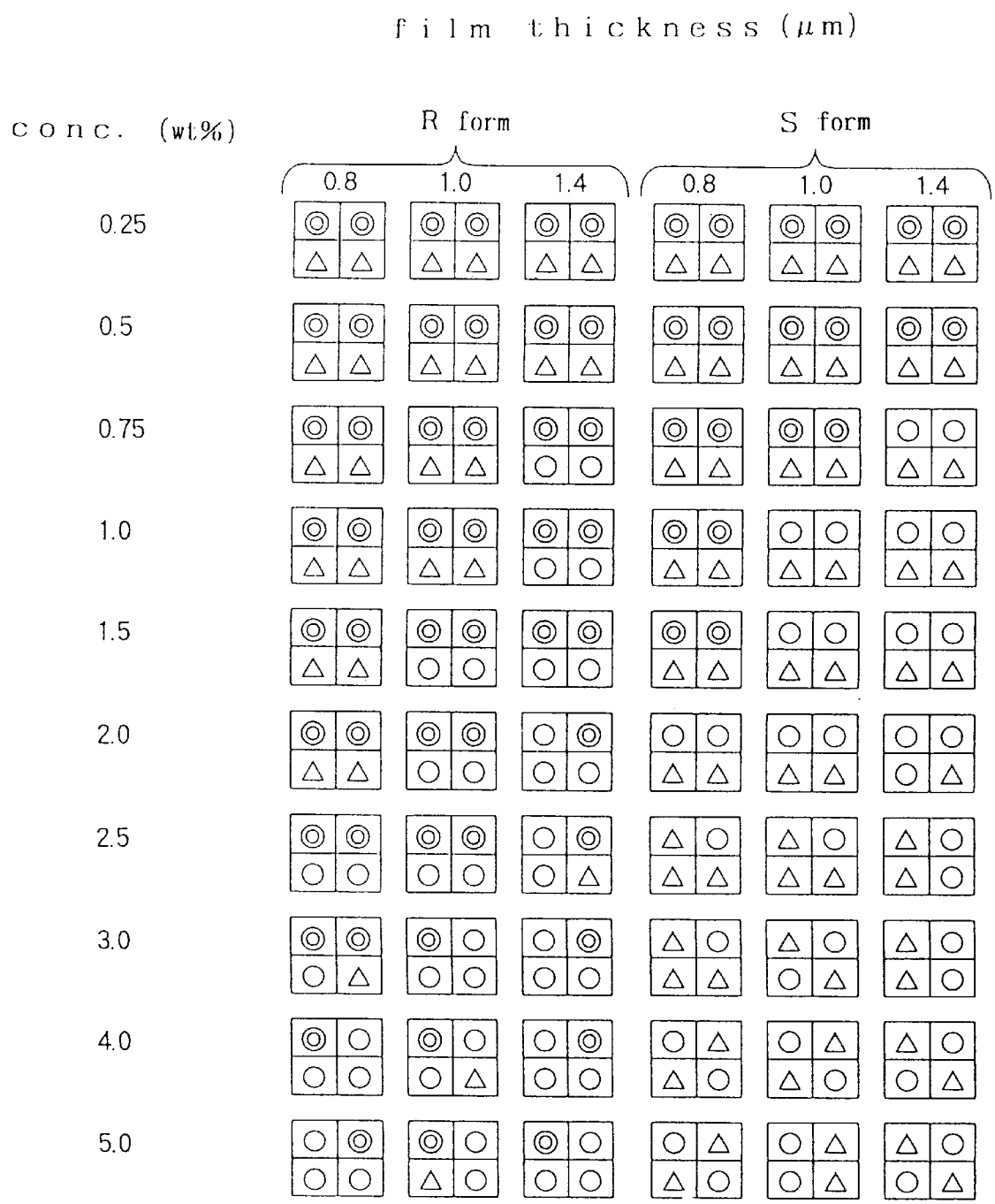
FIG. 23 illustrates a visual angle improving effects obtained in Example 5.

Using these liquid crystalline optical films each two sheets as compensating films, there was realized such a construction as illustrated in FIG. 22(a) and (b) and a visual angle improving effect for a TN liquid crystal display of NW mode was checked. How to fabricate and drive TN cell was the same as in Example 3. The results obtained are as shown in FIG. 23. In the same figure, the ⊙ mark indicates a direction in which the visual angle improving effect was outstanding, the ○ mark indicates that the said effect was recognized, and the Δ mark indicates that the said effect was little recognized. As to the four squares as one unit, the left upper square means an upward direction, the right upper square means a downward direction, the left lower square means a leftward direction, and the right lower square means a rightward direction.

[EFFECT OF THE INVENTION]

The liquid crystalline optical film according to the present invention has fixed, unique orientation form based on the discotic liquid crystalline material used and possesses optical characteristics not attained so far.

Besides, the compensating film for a liquid crystal display constituted by the liquid crystalline optical film of the present invention makes it possible to diminish the influence of the refractive index anisotropy inherent in the liquid crystal display and twist upon the visual angle and color tone, whereby it is considered contributable to the attainment of high performance and larger display area of the liquid crystal display. Thus, the compensating film according to the present invention is of an extremely high industrial value.

What is claimed is:

1. A liquid crystalline optical film having a fixed orientation form in the state of liquid crystal, characterized in that said film is formed of a discotic liquid crystalline material and that the orientation form of the discotic liquid crystal is a twisted orientation.

2. A liquid crystalline optical film as set forth in claim 1, wherein said discotic liquid crystalline material contains at least one kind of an optically active compound.

3. A liquid crystalline optical film as set forth in claim 2, wherein said optically active compound is an optically active, discotic liquid crystalline compound.

4. A liquid crystalline optical film as set forth in claim 1, wherein said discotic liquid crystalline material is constituted of at least one optically active, discotic liquid crystalline compound.

5. A liquid crystalline optical film as set forth in claim 1, wherein the orientation form is fixed in a state that the angle between directors of the discotic liquid crystal and the line normal to the film plane varies in the film thickness direction.

6. A liquid crystalline optical film as set forth in claim 1, wherein the angle between directors of the discotic liquid crystal and the line normal to the film plane differs between the upper surface and the lower surface of the film.

7. A compensating film for a liquid crystal display comprising the liquid crystalline optical film of claim 1.

8. A liquid crystal display having the compensating film of claim 7 in a singular or plural number.

9. The liquid crystalline optical film of claim 1 wherein said twisted orientation has an apparent twist angle which is measured by introducing polarized light into said optical film and analyzing the transmitted light.

* * * * *